US012791651B2

(12) United States Patent
Peterson et al.

(10) Patent No.: US 12,791,651 B2
(45) Date of Patent: Nov. 10, 2026

(54) RECEPTION OF SIGNALS FOR RANGING, TIMING, AND DATA TRANSFER

(71) Applicant: Microchip Technology Incorporated, Chandler, AZ (US)

(72) Inventors: Benjamin Peterson, Waterford, CT (US); Jeremy Dean Warriner, Longmont, CO (US); Richard Stuart Foster, Louisville, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 602 days.

(21) Appl. No.: 17/660,017

(22) Filed: Apr. 20, 2022

(65) Prior Publication Data

US 2022/0244338 A1 Aug. 4, 2022

Related U.S. Application Data

(63) Continuation-in-part of application No. 17/447,392, filed on Sep. 10, 2021, now Pat. No. 12,174,284.

(60) Provisional application No. 63/262,728, filed on Oct. 19, 2021, provisional application No. 63/262,729, filed on Oct. 19, 2021, provisional application No. 63/198,476, filed on Oct. 21, 2020.

(51) Int. Cl.
*G01S 1/24* (2006.01)

(52) U.S. Cl.
CPC .................................... *G01S 1/245* (2013.01)

(58) Field of Classification Search
CPC ....... G01S 1/042–0428; G01S 1/24–28; G01S 1/045; G01S 1/685
See application file for complete search history.

(56) References Cited

U.S. PATENT DOCUMENTS 3,870,999 A 3/1975 Mathews et al.
4,275,398 A 6/1981 Parker
4,594,594 A 6/1986 Fukuhara
(Continued)

FOREIGN PATENT DOCUMENTS

CN 1035181 A 8/1989
CN 102365560 A 2/2012
(Continued)

OTHER PUBLICATIONS

A. Helwig et al., "eLoran System Definition and Signal Specification Tutorial", International Loran Association (ILA-40)—Nov. 2011, https://www.ursanav.com/wp-content/uploads/UrsaNav-ILA-40-eLoran-Signal-Specification-Tutorial.pdf (Year: 2011).*
(Continued)

*Primary Examiner* — Cassi J Galt
(74) *Attorney, Agent, or Firm* — TraskBritt

(57) ABSTRACT

A device is disclosed. In one or more examples, the device may include an antenna to receive a signal comprising a ranging signal and a data signal. The signal may encode timing information for one or more of positioning, navigation, and timing. The signal may include a first pulse having a first start time and a second pulse having a second start time. The second start time may be an integer number of inter-pulse intervals plus an encoding delay after the first start time. The encoding delay may encode data. The device may include a processor to obtain the data responsive to the encoding delay.

22 Claims, 28 Drawing Sheets

200

204

| Pulse Groups (202) | Pulses | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 1 | R | R | T | R | D | R | R | T | R | D | R | R | D |
| 2 | R | R | T | R | D | R | R | T | R | D | R | R | D |
| 3 | R | R | T | R | D | R | R | T | R | D | R | R | D |
| 4 | R | R | T | R | D | R | R | T | R | D | R | R | D |
| 5 | R | R | T | R | D | R | R | T | R | D | R | R | D |
| 6 | R | R | T | R | D | R | R | T | R | D | R | R | D |
| 7 | R | R | T | R | D | R | R | T | R | D | R | R | D |
| 8 | R | R | T | R | D | R | R | T | R | D | R | R | D |
| 9 | R | R | T | R | D | R | R | T | R | D | R | R | D |
| 10 | R | R | T | R | D | R | R | T | R | D | R | R | D |

206
R = 80 Ranging Pulses
T = 20 Time-Message PPM Pulses
D = 30 Data-Message PPM Pulses

(56) References Cited

U.S. PATENT DOCUMENTS

| | | | | |
|---|---|---|---|---|
| 4,791,422 | A | 12/1988 | Goddard | |
| 10,778,362 | B2 | 9/2020 | Mason | |
| 2009/0232197 | A1 * | 9/2009 | Mimura | H04B 1/7174 375/239 |
| 2011/0279366 | A1 | 11/2011 | Lohbihler | |
| 2018/0356529 | A1 | 12/2018 | Lee et al. | |
| 2019/0377055 | A1 | 12/2019 | Offermans et al. | |
| 2020/0204283 | A1 | 6/2020 | Mason | |
| 2020/0326419 | A1 | 10/2020 | Parsche et al. | |

FOREIGN PATENT DOCUMENTS

| | | | |
|---|---|---|---|
| CN | 103718058 | A | 4/2014 |
| EP | 0315377 | A2 | 5/1989 |
| RU | 2158933 | C1 | 11/2000 |
| WO | 2018/044834 | A1 | 3/2018 |
| WO | 2022/087553 | A1 | 4/2022 |

OTHER PUBLICATIONS

P. F. Swaszek, G. Johnson, R. Shalaev and R. Hartnett, "Loran phase codes, revisited," 2008 IEEE/ION Position, Location and Navigation Symposium, Monterey, CA, USA, 2008, pp. 800-809 (Year: 2008).*

International Search Report for International Application No. PCT/US2022/071826, mailed Jul. 25, 2022, 5 pages.

International Search Report for International Application No. PCT/US2022/071827, mailed Jul. 25, 2022, 6 pages.

International Search Report for International Application No. PCT/US2022/071828, mailed Jul. 29, 2022, 5 pages.

International Search Report for International Application No. PCT/US2022/071829, mailed Aug. 3, 2022, 6 pages.

International Written Opinion for International Application No. PCT/US2022/071826, mailed Jul. 25, 2022, 7 pages.

International Written Opinion for International Application No. PCT/US2022/071827, mailed Jul. 25, 2022, 9 pages.

International Written Opinion for International Application No. PCT/US2022/071828, mailed Jul. 29, 2022, 7 pages.

International Written Opinion for International Application No. PCT/US2022/071829, mailed Aug. 3, 2022, 8 pages.

Lo et al., "Assessing the Loran Cycle Confidence Algorithm," Proceedings of the International Loran Association 35th Annual Meeting, Groton, CT, (Oct. 2006), 19 pages.

Lo et al., "Broadcasting Data from an SBAS Reference Network over Low Rate Broadcast Channels", (2000), pp. 199-209.

Lo et al., "Defining Primary, Secondary, Additional Secondary Factors for RTCM Minimum Performance Specifications (MPS)," (2009), 9 pages.

Lo et al., "Enhanced Loran," (No Date), 70 pages.

Lo et al., "Loran Coverage Availability Simulation Tool," (2008), 11 pages.

Lo et al., "Loran Data Modulation: A Primer," IEEE Aerospace and Electronic Systems Magazine, vol. 22, Issue 9, (Sep. 2007), pp. 31-51.

Lo et al., "Loran Data Modulation: Extensions and Examples," IEEE Transactions on Aerospace and Electronic Systems, vol. 43, Issue 2, (Apr. 2007), pp. 628-644.

Lo et al., "Proving the Integrity of the Weighted Sum Squared Error (WSSE) Loran Cycle Confidence Algorithm," Annual of Navigation, vol. 54 (2007), pp. 277-291.

Lo et al., "Using Loran for Broadcast of Integrity Information for Modernized Global Navigation Satellite Systems (GNSS)," (2008), 10 pages.

Petersen et al., "Enhanced Loran-C Data Channel Project", International Symposium on Integration of Loran-C/Eurofix Andegnos/Galileo, XP002224777, (Mar. 22, 2000) pp. 1-13, p. 7, left-hand-column, first paragraph.

Peterson et al., "Differential LORAN-C," (2004), 21 pages.

Peterson et al., "High Speed Loran-C Data Communications—Flight Test Results", Proceedings of the ION-GPS 2001, Salt Lake City, Sep. 2001, pp. 1919-1932.

Peterson et al., "High Speed Loran-C Data Communications", Proceedings of the 2nd International Symposium on Integration of Loran-C/Eurofix and Egnos/Galileo, Bonn, Germany, Feb. 2001, pp. 135-157.

Peterson et al., "Improving Loran Coverage with Low Power Transmitters," Journal of Navigation, vol. 63, (2010), pp. 23-38.

Peterson et al., "Integrating Loran and GNSS for Safety of Life Applications," Proceedings of the 21st International Technical Meeting of the Satellite Division of The Institute of Navigation, (2008), pp. 1619-1630.

Peterson et al., "WAAS messages via LORAN Data Communications-Technical progress towards going operational", Proceedings of Institute of Navigation National Technical Meeting, San Diego, CA, Jan. 2002, pp. 138-145.

First Office Action and Search Report of Chinese Patent Application No. 202180071304.5, issued Aug. 1, 2025, 21 pages with English translation.

Rejection Decision of Chinese Patent Application No. 202180071304.5, issued Feb. 11, 2026, 14 pages with English translation.

First Office Action and Search Report of Chinese Patent Application No. 202280060669.2, issued Sep. 1, 2026, 32 pages with English translation.

* cited by examiner

200

204

| Pulse Groups (202) | Pulses 1 | 2 | 3 | 4 | 5 | 6 | 7 | 8 | 9 | 10 | 11 | 12 | 13 |
|---|---|---|---|---|---|---|---|---|---|---|---|---|---|
| 1 | R | R | T | R | D | R | R | T | R | D | R | R | D |
| 2 | R | R | T | R | D | R | R | T | R | D | R | R | D |
| 3 | R | R | T | R | D | R | R | T | R | D | R | R | D |
| 4 | R | R | T | R | D | R | R | T | R | D | R | R | D |
| 5 | R | R | T | R | D | R | R | T | R | D | R | R | D |
| 6 | R | R | T | R | D | R | R | T | R | D | R | R | D |
| 7 | R | R | T | R | D | R | R | T | R | D | R | R | D |
| 8 | R | R | T | R | D | R | R | T | R | D | R | R | D |
| 9 | R | R | T | R | D | R | R | T | R | D | R | R | D |
| 10 | R | R | T | R | D | R | R | T | R | D | R | R | D |

206

R = 80 Ranging Pulses
T = 20 Time-Message PPM Pulses
D = 30 Data-Message PPM Pulses

*FIG. 2*

RECEPTION OF SIGNALS FOR RANGING, TIMING, AND DATA TRANSFER

CROSS-REFERENCE TO RELATED APPLICATIONS

This application claims priority to U.S. Provisional Patent Application Ser. No. 63/262,728, filed Oct. 19, 2021. This application also claims priority to U.S. Provisional Patent Application Ser. No. 63/262,729, filed Oct. 19, 2021. This application is also a continuation-in-part to U.S. patent application Ser. No. 17/447,392, filed Sep. 10, 2021, now U.S. Pat. No. 12,174,284, issued Dec. 24, 2024, which claims priority to U.S. Provisional Patent Application Ser. No. 63/198,476, filed Oct. 21, 2020. This application is being filed on the same day as a first U.S. Patent Application for "TRANSMISSION OF SIGNALS FOR RANGING, TIMING, AND DATA TRANSFER," by Benjamin Peterson, Jeremy Warriner, and Richard Foster, a second U.S. Patent Application for "TRANSMISSION OF SIGNALS FOR RANGING, TIMING, AND DATA TRANSFER," by Benjamin Peterson, Jeremy Warriner, and Richard Foster, a second U.S. Patent Application for "RECEPTION OF SIGNALS FOR RANGING, TIMING, AND DATA TRANSFER," by Benjamin Peterson, Jeremy Warriner, and Richard Foster, and a third U.S. Patent Application for "RECEPTION OF SIGNALS FOR RANGING, TIMING, AND DATA TRANSFER," by Benjamin Peterson, Jeremy Warriner, and Richard Foster. The disclosure of each of which is hereby incorporated herein in its entirety by this reference.

BACKGROUND

Transmitters of radio waves (e.g., ground based radio waves) are sometimes used to broadcast signals for positioning, navigation, or timing. An example system for transmitting such signals is Long-Range Navigation (LORAN) and variations thereon.

BRIEF DESCRIPTION OF THE DRAWINGS

The purpose and advantages of the examples of the present disclosure will be apparent to one of skill in the art from the detailed description in conjunction with the following appended drawings.

FIG. 2 illustrates a pulse-ordering scheme according to one or more examples.

DETAILED DESCRIPTION

Figure 1A:
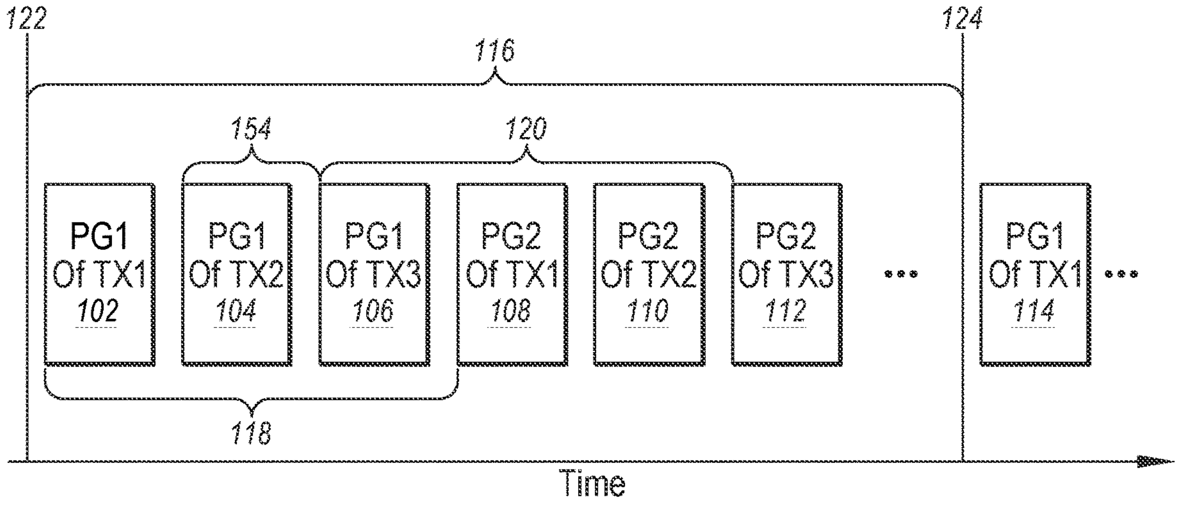
FIG. 1A illustrates example pulse groups of an example epoch according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms “exemplary,” “by example,” and “for example,” means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a collection of signals, wherein the collection may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to the examples.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as “first,” “second,” and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term “substantially” in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Long Range Navigation (LORAN or just “Loran”) signals, developed in the 1950’s, are ranging signals of broadcast radio frequency (RF) groundwaves at low frequencies, typically between 90 and 110 kilohertz (kHz), that can be used for positioning, navigation, and/or timing (“PNT”). Such ranging signals can travel more than 1,000 miles, through air, structures, earth, and water and can be up to 10,000 times more powerful than, as a non-limiting example, Global Positioning System (GPS) signals. Loran technology (and more specifically, an intermediate technology called “Loran-C”) was upgraded in the 1990’s resulting in enhanced Loran (“eLoran”) navigation systems. Among other things, eLoran navigation systems include transmitter sites synchronized to Coordinated Universal Time (UTC), use of Time of Transmission (TOT) control rather than System Area Monitor (SAM) control used by Loran navigation systems, addition of a Loran Data Channel (LDC) to a ranging signal to provide time, improved positioning accuracy, and increased integrity.

A typical broadcast of an eLoran-type ranging signal is a pulse train of eLoran-type pulses of oscillating signals (e.g., pulses of oscillating signals having an envelope associated with eLoran). A pulse envelope of each pulse in the pulse train includes a leading edge that begins at a first point of rest (i.e., zero or negligible energy of the oscillating signal) and rises until it reaches a point of maximum amplitude (the "peak" of the pulse), and a tail edge that begins at the peak and falls until it reaches a second point of rest. In a standard eLoran pulse, a portion of the pulse defined substantially during part of the leading edge is used for phase tracking (in standard eLoran, typically the sixth zero crossing by the oscillating signal) to encode timing information into a pulse and more specifically for PNT. A receiver may use a positioning technique (including, as non-limiting examples, multilateration position estimation, or hyperbolic position estimation calculations) to recover PNT information based on received eLoran-type ranging signals. Additionally, in some cases eLoran signals may be used to encode data.

Transmitters in a standard eLoran configuration known to the inventors of this disclosure may be located hundreds and sometimes over a thousand miles apart. Each transmitter may stand hundreds of feet tall (e.g., 625 feet above local ground level).

Notwithstanding the opportunities in eLoran, funding for implementation of an eLoran navigation system was reduced in the United States of America in favor of GPS systems in the 2010's and, only several transmitter towers remain standing today.

The inventors of this disclosure appreciate, generally, an over-dependence on GPS for PNT. The availability of inexpensive GPS jammers and signal spoofers raises vulnerability concerns, especially for critical infrastructure, key resources, and safety-of-life applications. Accordingly, there is recognition by industry and government entities of a need for a complement/back-up navigation system for GPS—if not, in some environments or for some applications, a replacement.

To provide a suitable backup or replacement for GPS, the inventors of this disclosure appreciate a need for: access control for eLoran PNT services; support for different levels of PNT service; increased data transfer rate (as compared to conventional eLoran) to provide additional, one-way (i.e., unidirectional) communication capability; and improved immunity to jamming and spoofing attacks.

One or more examples relate, generally, to encoding data in encoding delays between certain pulses of a pulse group. For example, a pulse group may include thirteen pulses. The pulses may, nominally, be separated, in time, by a nominal inter-pulse interval. Certain ones of the pulses may be separated from a preceding pulse by the nominal inter-pulse interval plus or minus an encoding delay. The encoding delay may be used to encode data. For example, a duration of the encoding delay may be selected to encode one or more bits of data.

Additionally or alternatively, one or more examples relate, generally, to encoding information indicative of a specific transmitter in a pulse group of a ranging signal. More specifically, one or more examples relate to encoding information indicative of a transmitter in an inter-pulse interval of the pulse group.

Additionally or alternatively, one or more examples relate, generally, to arranging information transmissions to decrease the impact of burst errors at a receiver, and in various examples more specifically, according to an algorithm selected to improve the efficacy of forward error correction (FEC) techniques including those that use Reed-Solomon FEC blocks for error correction.

Additionally or alternatively, one or more examples relate, generally, to transmitting ranging signals according to a pulse-phase-signature schedule known to certain recipients of the signal. As a non-limiting example, transmitting ranging signals according to the pulse-phase-signature schedule may counter, at least partially, attempts to spoof a ranging signal.

Additionally or alternatively, one or more examples relate to delaying transmission of ranging signals according to a dithering schedule such that recipients of the ranging signals may be limited in their ability to use the ranging signals without the dithering schedule. For example, PNT information calculated based on delayed ranging signals may be inaccurate. And, in contrast, a receiver in possession of the dithering schedule may be able to correct for the delays.

One or more examples relate generally to decoding data encoded in encoding delays between certain pulses of a pulse group. For example, a pulse group may include thirteen pulses. The pulses may, nominally, be separated, in time, by a nominal inter-pulse interval. Certain ones of the pulses may be separated from a preceding pulse by the nominal inter-pulse interval plus or minus an encoding delay. The encoding delay may be used to encode data. For example, a duration of the encoding delay may be selected to encode one or more bits of data. One or more examples may relate generally to decoding the data encoded in the encoding delay.

Additionally or alternatively, one or more examples may relate, generally, to decoding information from a pulse group of a ranging signal. The information may be indicative of a specific transmitter, e.g., the transmitter that transmitted the ranging signal. Thus, one or more examples may relate to identifying a transmitter responsive to information encoded in the pulse groups. More specifically, one or more examples may relate to identifying a transmitter responsive to an inter-pulse interval (e.g., a nominal inter-pulse interval) of a pulse group. Identifying the transmitter may aid in calculating PNT information. Additionally or alternatively, identifying the transmitter may be useful in validating the ranging signals.

Additionally or alternatively, one or more examples relate to identifying pulses of epochs according to a pulse-ordering scheme. The pulses may be ordered in an epoch of the ranging signal according to the pulse ordering scheme to, among other things, decrease the impact of burst errors.

Additionally or alternatively, one or more examples relate to validating a ranging signal by comparing phases of pulses of the ranging signal to a pulse-phase signature. Validating the ranging signal may, at least partially, counter against attempts to spoof ranging signals.

Additionally or alternatively, one or more examples relate to correcting delays added to ranging signals. For example, ranging signals may have been delayed according to a dithering schedule. One or more examples relate to calculating times of transmission of such ranging signals that account for the delay. For example, one or more examples may use the dithering schedule to correct for delays in ranging signals that were added to the ranging signals according to the dithering schedule.

While examples may be discussed herein in the context of eLoran PNT systems, a person having ordinary skill in the art will appreciate that this is just an example of an environment in which disclosed examples may be deployed and implemented; and use with other environments does not exceed the scope of this disclosure.

As used herein, the term "ranging signal" means a signal provided (e.g., broadcast) by a transmitter that may be useable to determine PNT information. Additionally, as used herein a "ranging signal" may be used for transmission of data including time information and/or a message. Additionally or alternatively, a "data signal" may be used for transmission of data including time information and/or a message. A ranging signal may include ranging pulses to be used to determine range and/or position information. A ranging signal and/or a data signal may include data pulses to transmit data, and/or timing pulses to transmit time information. As used herein the terms "ranging pulse" and like terms may refer to pulses that may be used for determining range and/or position information. As used herein the terms "data pulse" and "data-message pulse" may refer to pulses that may encode data. As used herein the terms "time pulse," "timing pulse," "time-message pulse," and "timing-message pulse" may refer to pulses that may encode timing information.

As used herein, the term "pulse group" means two or more pulses generated by a same transmitter within the same group repetition interval.

As used herein, "inter-pulse interval" means a duration of time defined between the start (i.e., starting time) of successive pulses of a pulse group.

As used herein, "group repetition interval" means a duration of time defined between the start (i.e., starting time) of successive pulse groups from the same transmitter.

As used herein, the terms "broadcast cycle" and "epoch" refer to two or more pulse groups not necessarily generated by a same transmitter. In some instances, the term "broadcast cycled" may be used as a shorthand to refer to the duration of a broadcast cycle. A number of pulse groups per broadcast cycle will typically be defined in a specification. As a non-limiting example, in an eLoran-based system, the number of pulse groups per broadcast cycle may be defined based on a number of desired bits for a message. In such a case, the number of pulse groups per broadcast cycle is based on the number of pulse groups for a desired number of bits for a message.

FIG. 1A illustrates example pulse groups of an example epoch 116 of a ranging signal according to one or more examples. For example, FIG. 1A illustrates two pulse groups (PGs) of three different transmitters (TXs) in epoch 116. More specifically, FIG. 1A illustrates a first pulse group of a first transmitter, PG1 of TX1 102, a first pulse group of a second transmitter, PG1 of TX2 104, a first pulse group of a third transmitter PG1 of TX3 106, a second pulse group of the first transmitter, PG2 of TX1 108, a second pulse group of the second transmitter, PG2 of TX2 110, and a second pulse group of the third transmitter, PG2 of TX3 112. Additionally, FIG. 1A illustrates a first pulse group of a second epoch 124, PG1 of TX1 114. Although epoch 116 is illustrated as including two pulse groups from each of three transmitters, an epoch may include any number of pulse groups from any number of transmitters.

A duration of an epoch 116 generally corresponds to a time during which pulse groups (e.g., PG1 of TX1 102, PG1 of TX2 104, PG1 of TX3 106, PG2 of TX1 108, PG2 of TX2 110, PG2 of TX3 112, and additional pulse groups (e.g., from the first, second, and third transmitters)) may be/are transmitted. The duration of an epoch, such as epoch 116, may be related to a desired number of pulse groups per epoch, and a number of transmitters per geographical area or group of transmitters (which may be referred to in the art as a "chain"). As illustrated by FIG. 1A, epoch 116 is defined by a "beginning" at a start 122 of epoch 116 (or by a nominal start time as discussed below) and an "ending" at a start of a second epoch 124 (or by a nominal start of a next epoch as discussed below). An end of an epoch corresponds to a start of a subsequent epoch, and so on and so forth.

FIG. 1A illustrates two example group repetition intervals: TX1 group repetition interval 118 is defined between the start of a first pulse group of a first transmitter (e.g., PG1 of TX1 102) and the start of a second pulse group of the first transmitter (e.g., PG2 of TX1 108). TX3 group repetition interval 120 is defined between the start of a first pulse group of a third transmitter (e.g., PG1 of TX3 106) and the start of a second pulse group of the third transmitter (e.g., PG2 of TX3 112).

FIG. 1A illustrates one inter-pulse-group interval 154, i.e., a duration of time between the start of a pulse group and the start of an immediately following pulse group, which may be of a different transmitter. For example, inter-pulse-group interval 154 is the duration of time between the start of PG1 of TX2 and the start of PG1 of TX3.

Notably, any suitable markers may be used to define a group repetition interval or a nominal inter-pulse-group interval without exceeding the scope of this disclosure, such as peaks, beginning of leading edges, pre-specified zero crossings, or combinations thereof, without limitation. As non-limiting examples, peaks of first or last pulses of the respective pulse groups, a beginning of a leading edge of the first or last pulses of the respective pulse groups, pre-specified zero-crossings of oscillating signals of the first or last pulses of the respective pulse groups, and combinations thereof, may be used to define the group repetition interval or the nominal inter-pulse-group interval. Unless otherwise stated, the marker used to define intervals in examples is the beginning of the leading edge of the pulses of interest. In some cases, an end of a tail edge may not be used as a marker because the tail may ring out.

Figure 1B:
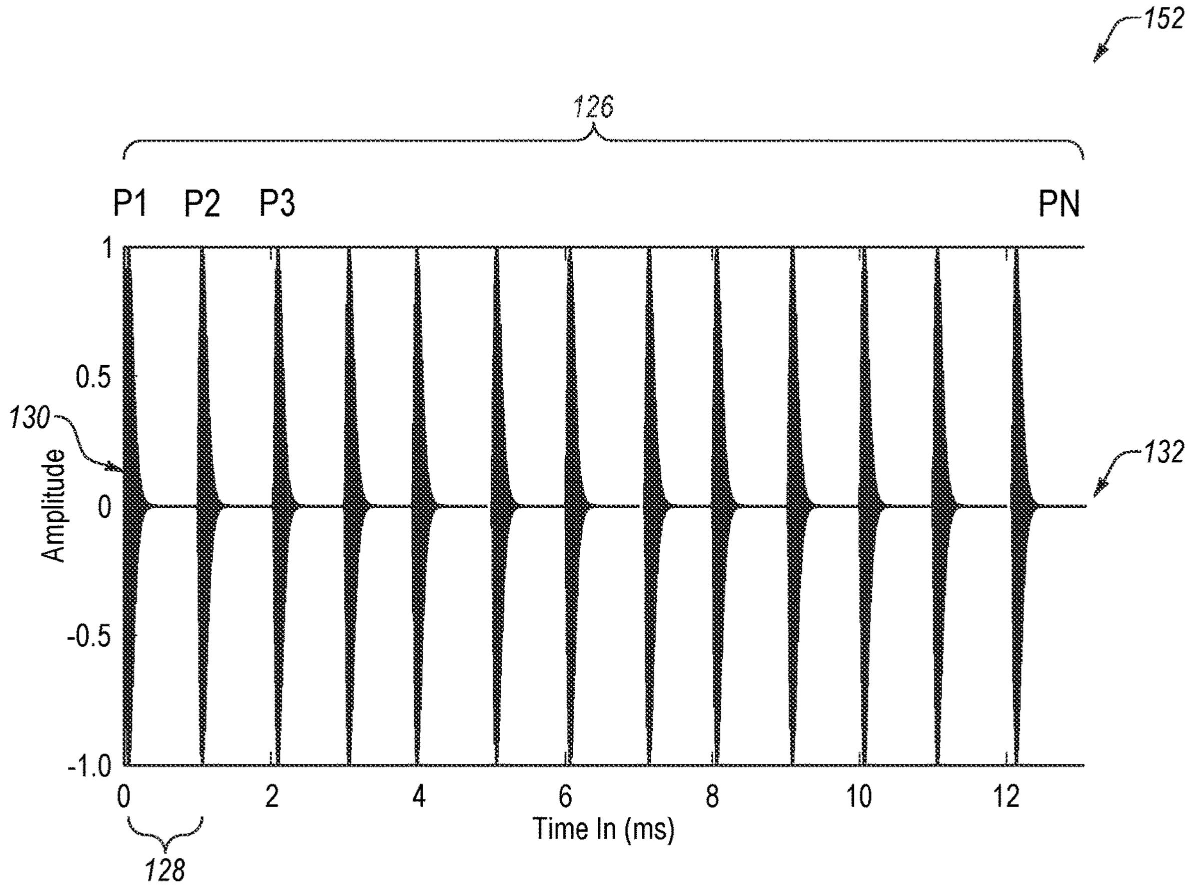
FIG. 1B illustrates example pulses within an example pulse group according to one or more examples.

FIG. 1B illustrates pulses P1 to PN of a pulse group 152 of a ranging signal, in accordance with one or more examples. In one or more examples, the respective inter-pulse intervals utilized by various transmitters may be different and so a respective inter-pulse interval may be used to identify a transmitter that transmitted a respective pulse group. Inter-pulse interval 128 encodes a transmitter identifier into pulse group 152.

FIG. 1B illustrates pulses that may be part of any of the pulse groups discussed herein, such as illustrated in FIG. 1A, without limitation. This disclosure is not limited to the shapes of the pulse envelopes of P1 to PN illustrated by FIG. 1B. Use of other shapes of pulse envelopes, such as the shape of the pulse envelope depicted by FIG. 1C, without limitation, are specifically contemplated and do not exceed the scope of this disclosure.

FIG. 1B illustrates an inter-pulse interval 128 (e.g., a nominal inter-pulse interval) defined between two consecutive pulses of pulse group 152 (e.g., between P1 and P2). Notably, any suitable markers may be used to define inter-pulse interval 128 without exceeding the scope of this disclosure, as non-limiting examples, starting times, peaks, an end of a tail edge, a beginning of a leading edge, pre-specified zero-crossings of oscillating signals, and combinations thereof.

In various examples, a respective inter-pulse interval 128 of a first transmitter (e.g., TX1) may be different than a respective inter-pulse interval 128 of another transmitter (e.g., TX3). For example, the duration of an inter-pulse interval 128 may be indicative of the transmitter from which the pulse group emanated. For example, a respective inter-pulse interval 128 of TX1 may be unique (or unique within a geographical region) to TX1. And, a respective inter-pulse interval 128 of TX3 may be unique (or unique within a geographical region) to TX3. Thus, an inter-pulse interval of a pulse group may be indicative of the transmitter from which the pulse group emanated. Thus, in various examples, a transmitter may be configured to transmit pulses (e.g., within a pulse group) separated by an inter-pulse interval 128 that is indicative of the transmitter.

FIG. 1B illustrates a pulse-group duration 126, which is a duration of time defined between the start of the first pulse of a pulse group (e.g., start 130 of pulse group 152) and the start of the first pulse of a next pulse group (not illustrated in FIG. 1B) (e.g., end 132 of pulse group 152).

In various examples, a pre-specified nominal inter-pulse interval may be known to a transmitter and a receiver, and an offset from the pre-specified nominal inter-pulse interval may be used to encode and decode a transmitter identifier. An offset from the pre-specified nominal inter-pulse interval may be referred to as an "encoding delay."

Figure 1C:
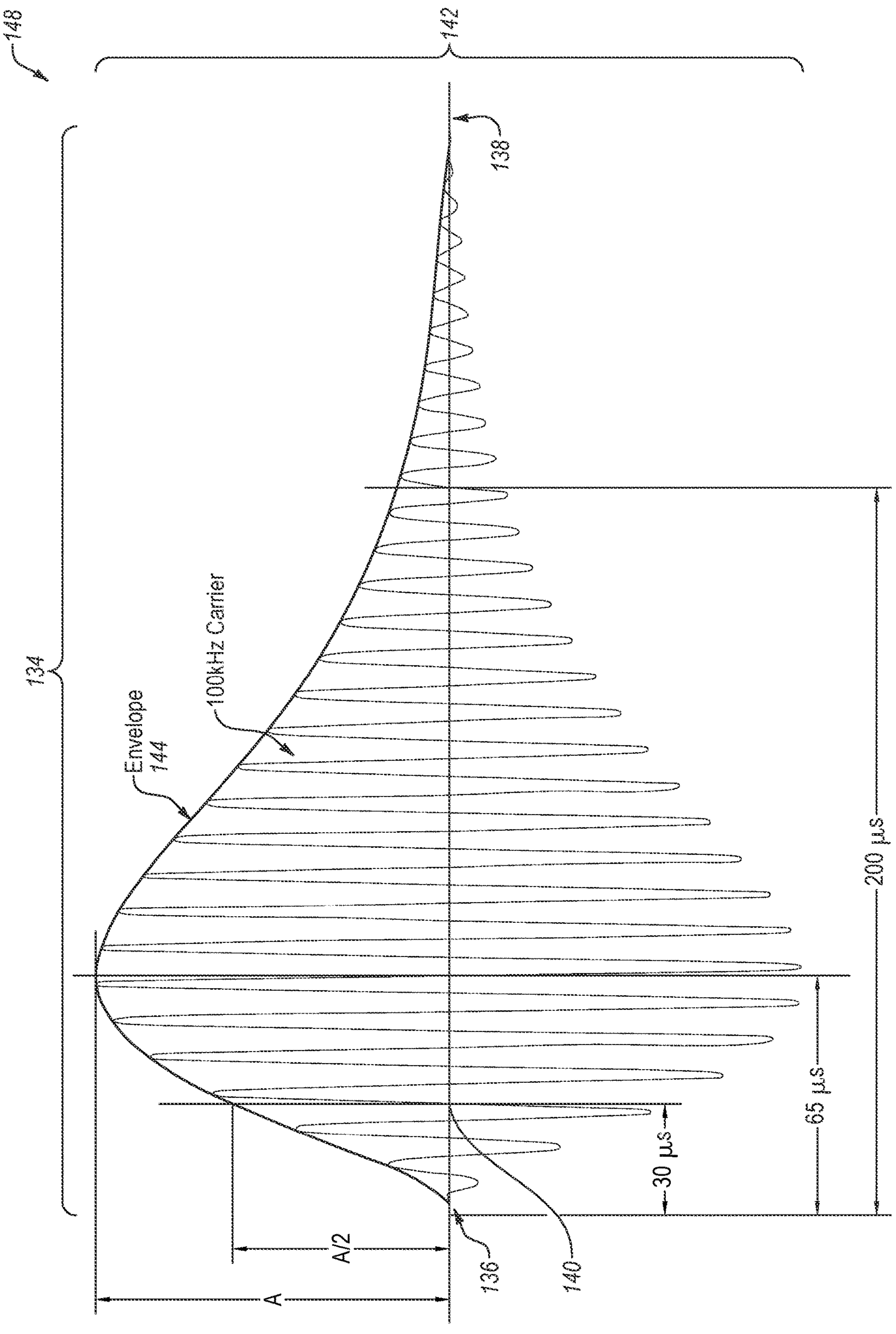
FIG. 1C illustrates an example pulse according to one or more examples.

FIG. 1C illustrates an example pulse 148 according to one or more examples. Pulse 148 happens to be the standard eLoran pulse. Pulse 148 may be encoded with timing information, e.g., a point in the pulse may be indicative of a timing event. As a non-limiting example, the sixth zero crossing (e.g., zero crossing 140) may be used by a receiver as an indication of a timing event e.g., for positioning, navigation, or timing for a positioning technique (including, as non-limiting examples, multilateration or hyperbolic position estimation calculations). Additionally, the position of pulse 148 within a pulse group may encode data. As a non-limiting example, the pulse 148 may be pulse-position modulated to encode data. Additional description regarding encoding data with pulse-position modulation is given in FIG. 1D.

FIG. 1C further illustrates pulse start point 136, which may be a point in time at which pulse 148 starts, e.g., moves from a point of rest either positive or negative. FIG. 1C also illustrates pulse end point 138, which may be the point in time at which pulse 148 ends, e.g., returns to a stable point of rest. Together, pulse start point 136 and pulse end point 138 define a pulse duration 134 of pulse 148. Because transmissions after a certain point in pulse 148 may include ringing, pulse end point 138 may be a defined duration of time after pulse start point 136. For example, pulses generally may have a defined duration of 300 μs. Thus, pulse end point 138 may be 300 μs after pulse start point whether pulse 148 has returned to a stable point of rest or not.

FIG. 1C further illustrates pulse amplitude 142, which may be the amplitude of pulse 148 from a negative peak value to a positive peak value. Additionally, FIG. 1C illustrates pulse envelope 144, which may be an amplitude envelope in which the oscillations of pulse 148 fit.

In FIG. 1C, indications of time durations are given as examples and are not limiting. For example, the sixth zero crossing 140 may occur around 30 μs after pulse start point 136 and a peak amplitude may occur around 65 μs after pulse start point 136. The oscillations of pulse 148 may be of a 100 kHz carrier.

Pulses may be binary phase coded with Phase Codes (each pulse's carrier is either +1 or −1) to aid with signal acquisition. Further detail regarding binary phase coding of pulses is given with regard to FIGS. 8A-8C.

Figure 1D:
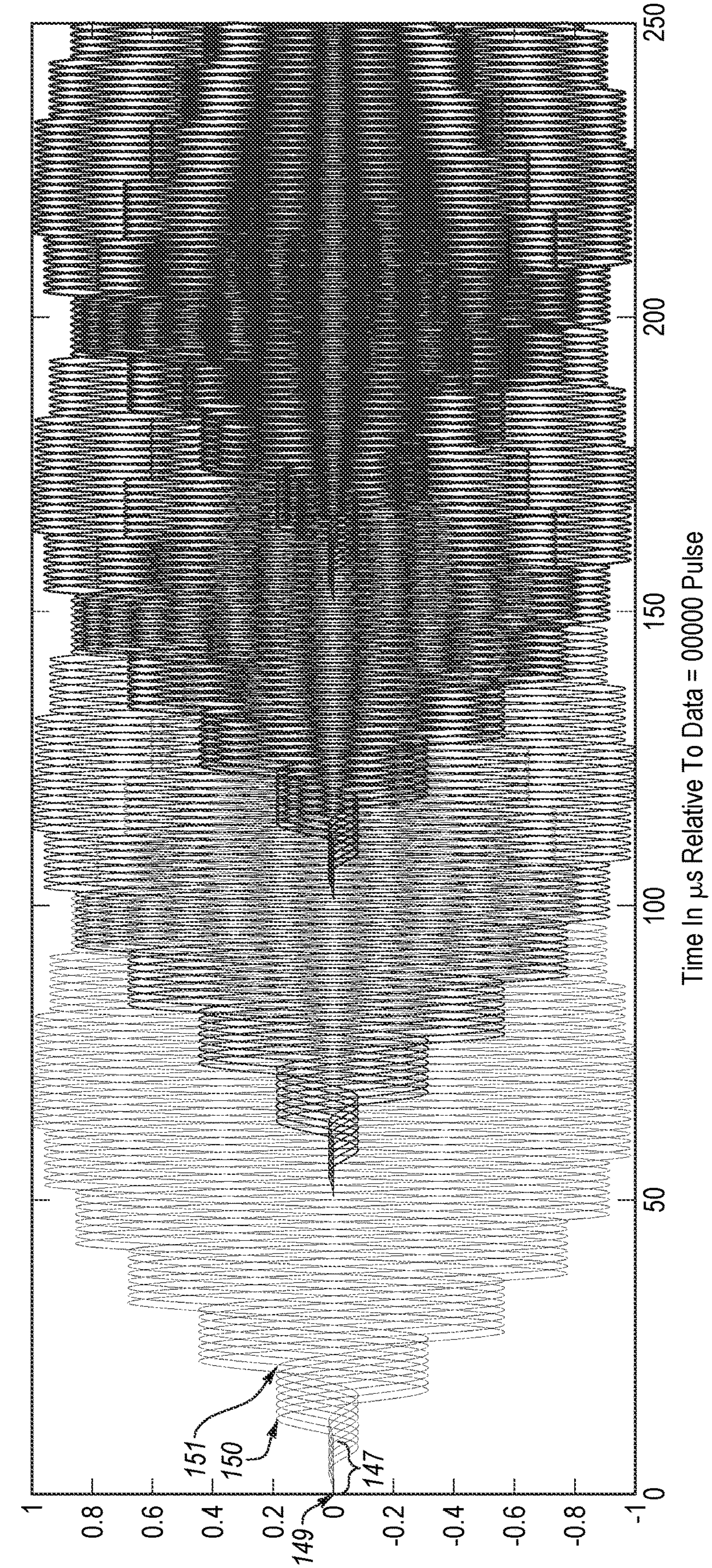
FIG. 1D illustrates thirty-two example pulses exhibiting respective encoding delays, which encode respective symbols according to one or more examples.

FIG. 1D illustrates thirty-two example pulses exhibiting respective encoding delays, which encode respective symbols according to one or more examples. For example, FIG. 1D illustrates pulse positions over time of the 32 example pulses, which encode symbols of a ranging signal that are pulse-position modulated. In the present disclosure the term "pulse position" may refer to a start time of the pulse relative to a nominal start time for the pulse. For example, FIG. 1D illustrates 32 pulses, each having a different position relative to a nominal pulse start time 149, or in other words, each having started with a different encoding delay relative to the nominal pulse start time 149. For example, FIG. 1D illustrates a first example pulse 150 representing a first symbol e.g., having an encoding delay of zero, or in other words, starting at nominal pulse start time 149. FIG. 1D also illustrates a second example pulse 151 representing a second symbol e.g., having an encoding delay 147, or in other words, starting at nominal pulse start time 149 plus encoding delay 147. FIG. 1D also illustrates thirty other pulses (not labeled) illustrating thirty other symbols having thirty other respective encoding delays. In a ranging signal, one pulse may be transmitted at a time. So, a ranging signal may include one of the thirty-two pulses illustrated in FIG. 1D as each pulse in a pulse group.

Pulses of pulse groups may begin at respective nominal pulse start time or at the respective nominal pulse start time plus respective encoding delays. For example, a first pulse of a pulse group may begin at a nominal first-pulse start time (e.g., at a beginning of a pulse group (e.g., at 130 of FIG. 1B)). A second pulse of the pulse group may begin at a nominal second-pulse start time (which may be an inter-pulse interval after the nominal first-pulse start time e.g., at 132 of FIG. 1B). Alternatively, the second pulse may begin at the nominal second-pulse start time plus a first encoding delay. The second pulse may encode data based on the start time of the second pulse relative to the nominal second-pulse start time (i.e., based on the first encoding delay).

A third pulse of the pulse group may begin at a nominal third-pulse start time (which may be an inter-pulse interval after the nominal second-pulse start time or two inter-pulse intervals after the nominal first-pulse start time). The third pulse may begin at the nominal third-pulse start time whether the second pulse began at the nominal second-pulse start time or at the nominal second-pulse start time plus the first encoding delay. Alternatively, the third pulse may begin at the nominal third-pulse start time plus a second encoding delay. The third pulse may encode data based on the start time of the third pulse relative to the nominal third-pulse start time (i.e., based on the second encoding delay).

In some examples, the first pulse of a pulse group may begin at the nominal first-pulse start time such that other pulse of the pulse group may be measured against the nominal first-pulse start time. In such examples, each of the subsequent pulses of the pulse group may begin an integer number of inter-pulse intervals later or an integer number of inter-pulse intervals plus a respective encoding delay later.

Table 1 documents examples of possible encoding delays of pulses (e.g., offsets in time from nominal start times of a pulse) for 32 symbols. Thus a single data pulse may encode one of the 32 symbols. The encoding of one of 32 symbols may provide for 5 bits of data per pulse. The number of symbols was chosen as an example and is not limiting. Likewise, the delays between start times illustrated in FIG. 1D are given as examples and are not limiting.

As a non-limiting example, Table 1 lists the pulse positions for the 32 states, the 5-bit representation, and the corresponding time delay relative to a nominal start time in microseconds.

TABLE 1

32 State Pulse Positions.

| State | Bit representation | Delay in μsec relative to a nominal start time |
|---|---|---|
| 1 | 00000 | 0.0 |
| 2 | 00001 | 1.25 |
| 3 | 00010 | 2.5 |
| 4 | 00010 | 3.75 |
| 5 | 00100 | 5.0 |
| 6 | 00101 | 6.25 |
| 7 | 00110 | 7.5 |
| 8 | 00111 | 8.75 |
| 9 | 01000 | 50.625 |
| 10 | 01001 | 51.875 |
| 11 | 01010 | 53.125 |
| 12 | 01011 | 54.375 |
| 13 | 01100 | 55.625 |
| 14 | 01101 | 56.875 |
| 15 | 01110 | 58.125 |
| 16 | 01111 | 59.375 |
| 17 | 10000 | 101.25 |
| 18 | 10001 | 102.5 |
| 19 | 10010 | 103.75 |
| 20 | 10011 | 105.0 |
| 21 | 10100 | 106.25 |
| 22 | 10101 | 107.5 |
| 23 | 10110 | 108.75 |
| 24 | 10111 | 110.0 |
| 25 | 11000 | 151.875 |
| 26 | 11001 | 153.125 |
| 27 | 11010 | 154.375 |
| 28 | 11011 | 155.625 |
| 29 | 11100 | 156.875 |
| 30 | 11101 | 158.125 |
| 31 | 11110 | 159.375 |
| 32 | 11111 | 160.625 |

Skywave interference may be multi-path interference i.e., a receiver may receive multiple instances of the ranging signal each of the multiple instances having traversed a different path between the transmitter and the receiver. The multiple instances of the ranging signal may constructively and/or destructively interfere with each other. The nominal start time may be advanced by a fixed amount of time relative to a super-nominal start time to reduce the amount of skywave interference on the leading edge of the pulse that follow. The super-nominal start time may be a nominal start time in the absence of alterations to account for skywave interference.

Figure 1E:
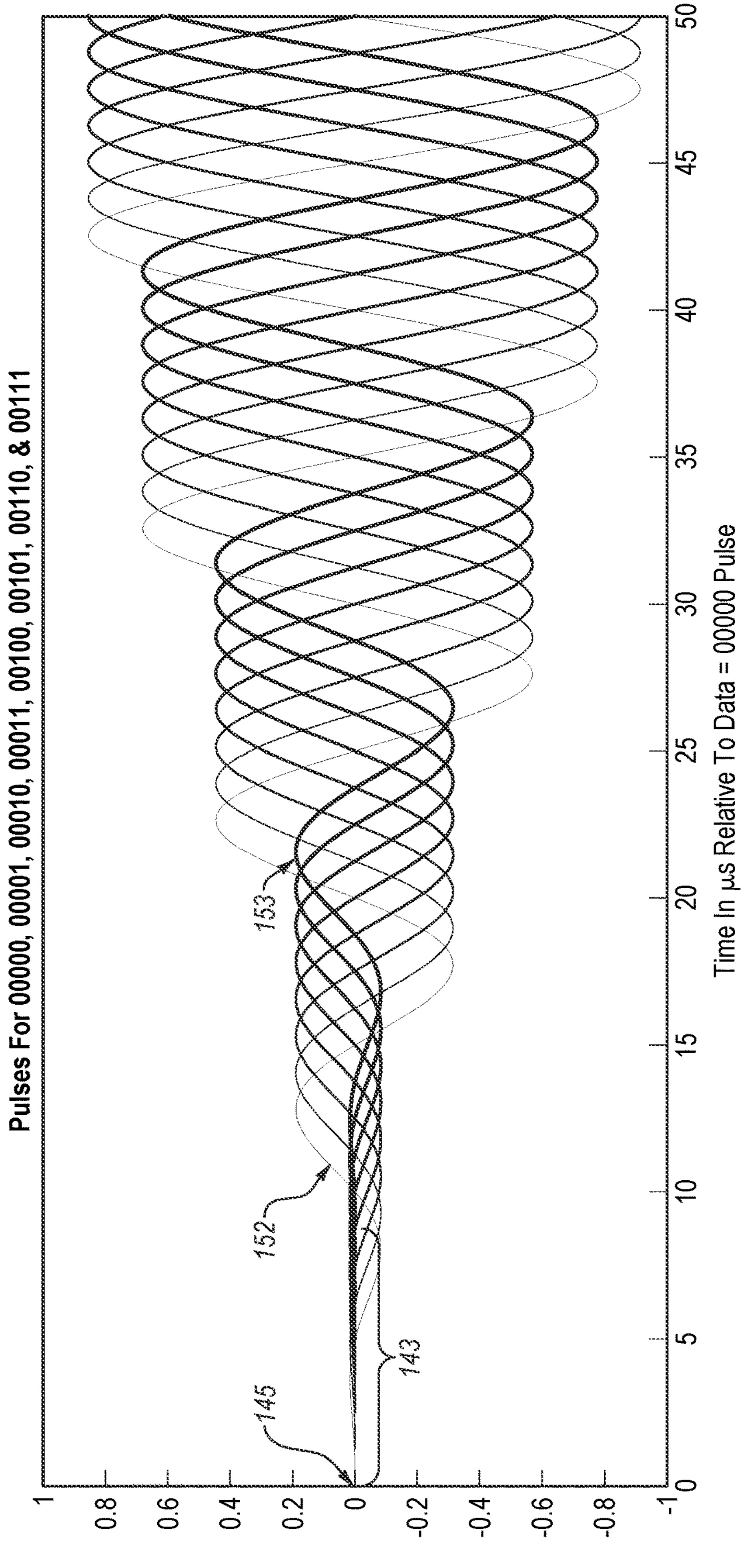
FIG. 1E illustrates eight example symbols according to one or more examples.

FIG. 1E illustrates eight example pulse positions according to one or more examples. FIG. 1E may be a magnified view of a portion of FIG. 1D, for example, FIG. 1E may be a magnified view of the first 50 μs of FIG. 1D. As illustrated in FIG. 1E, the eight example pulse positions are delayed over time relative to one another. The eight example pulse positions of FIG. 1E may be the first eight example symbols of a ranging signal. For example, FIG. 1E illustrates a first pulse 152 representing a first symbol and a second pulse 153 representing a second symbol. The first pulse 152 may start at the nominal pulse start time 145. The second pulse 153 may start at the nominal pulse start time 145 plus an encoding delay 143. The time scale illustrated in FIG. 1E and the time delay between symbols illustrated in FIG. 1E are given as examples. In a ranging signal, one pulse may be transmitted at a time. So, a ranging signal may include one of the eight pulses illustrated in FIG. 1E as each pulse in a pulse group.

Figure 1F:
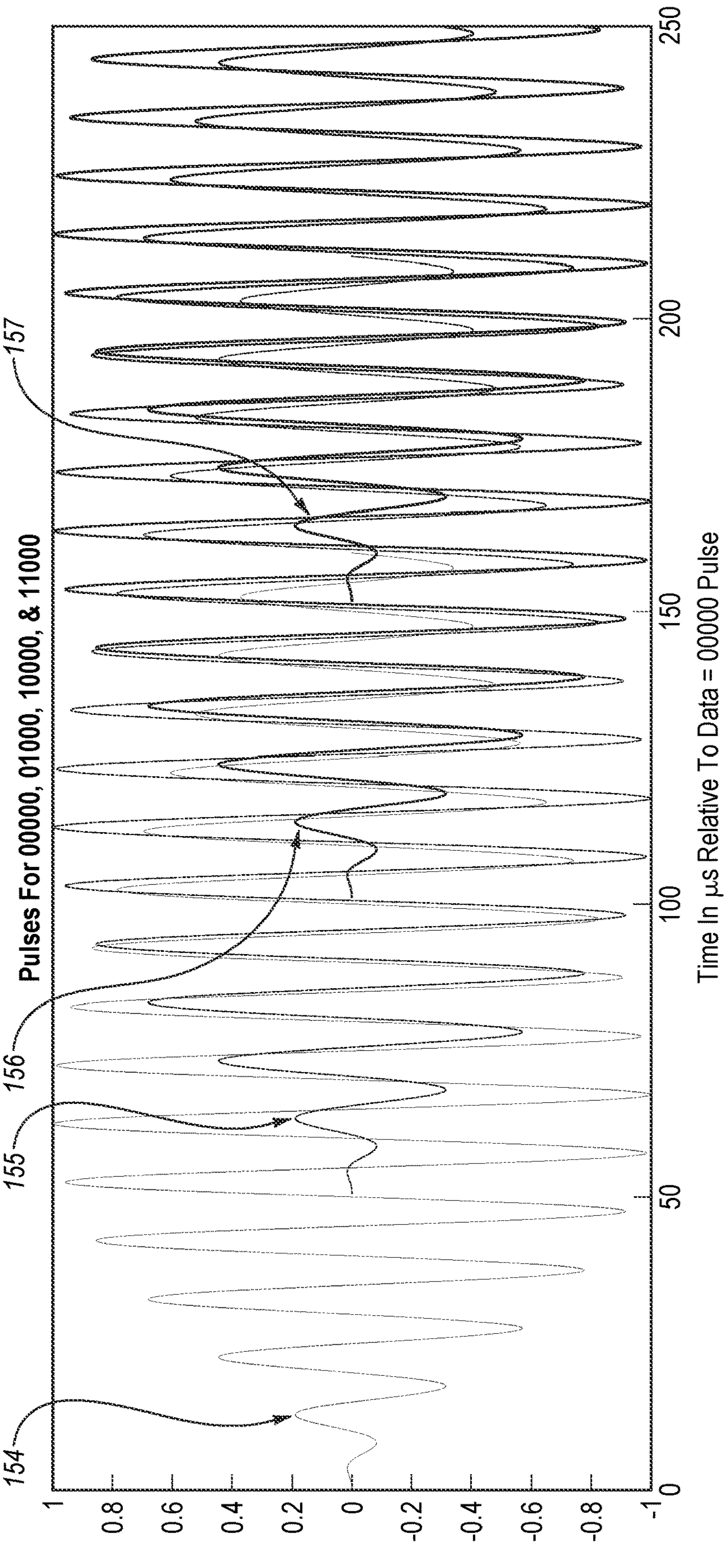
FIG. 1F illustrates four example symbols according to one or more examples.

FIG. 1F illustrates four example symbols according to one or more examples. For example, FIG. 1F illustrates the pulse position over time of the example symbols 1, 9, 17, and 25 of a signal according to one or more examples. For example, FIG. 1F illustrates the pulse representing a first symbol 154, a ninth symbol 155, a seventeenth symbol 156, and a twenty-fifth symbol 157. The four examples symbols of FIG. 1F may be examples of four of the thirty-two symbols illustrated in FIG. 1D. The time scale illustrated in FIG. 1F and the time delay between symbols illustrated in FIG. 1F are given as examples.

Figure 1G:
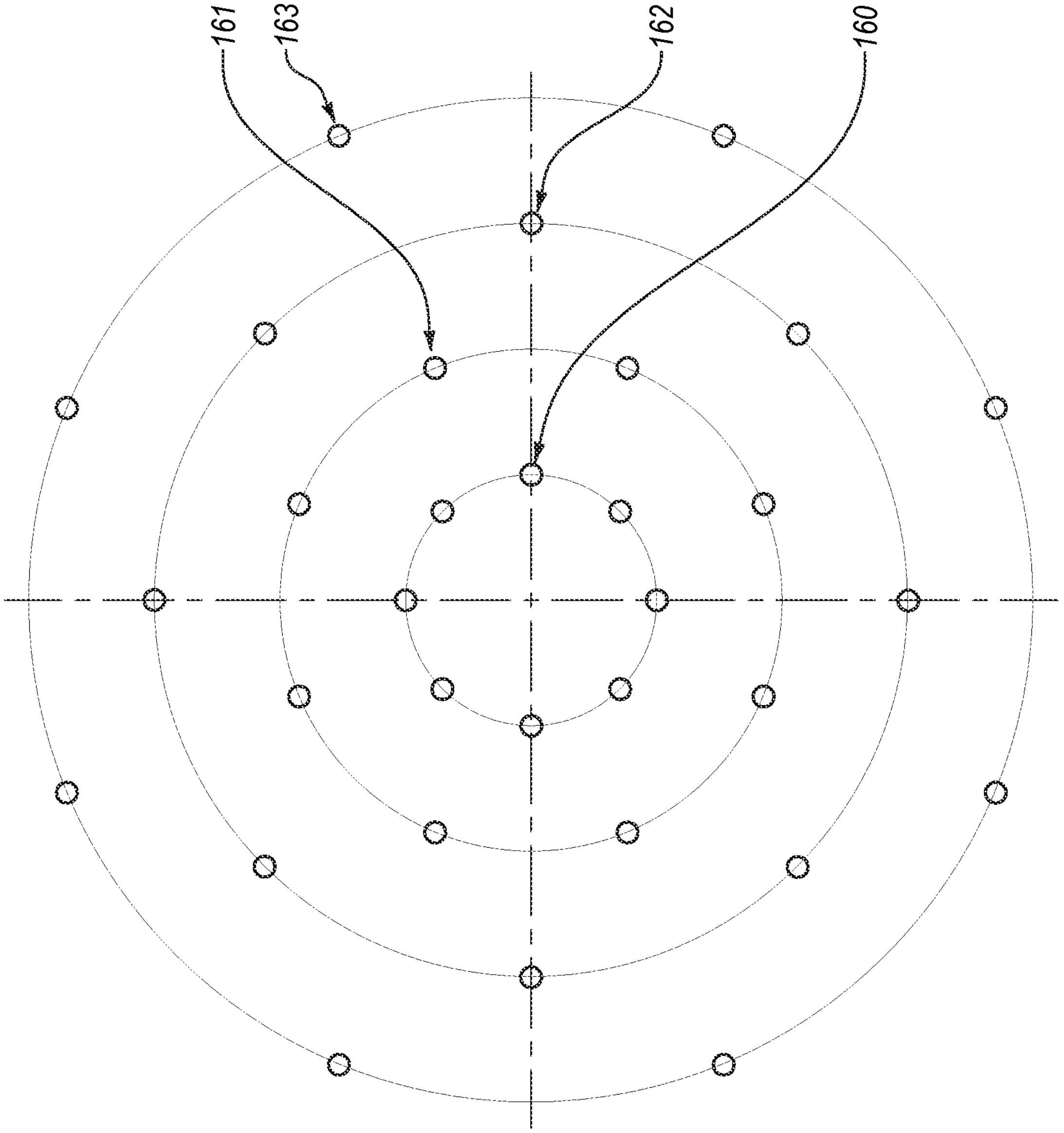
FIG. 1G illustrates the start times and phases of thirty-two example symbols in a polar plot according to one or more examples.

FIG. 1G illustrates the start times and phases of thirty-two example symbols in a polar plot according to one or more examples. For example, FIG. 1G illustrates the polar plot of all 32 symbols where angle is phase and radius is delay. For example, because the pulses are periodic, the pulses can be considered as having a delay in either or both of time and phase. Thus, a pulse can be described as being delayed by a time (e.g., as illustrated FIG. 1G by the radius) and a phase (e.g., as illustrated in FIG. 1G by angle). For example, FIG. 1G illustrates the pulse representing symbol a first symbol 160, an eighth symbol 161, a sixteenth symbol 162, and a twenty-fourth symbol 163.

FIG. 2 illustrates a pulse-ordering scheme 200 according to one or more examples. For example, FIG. 2 includes one example arrangement of types of pulse 206 of pulses assigned to respective pulse time slots 204 in pulse groups of an epoch to illustrate how different types of pulses (e.g., ranging pulses, pulse-position-modulated time-message pulses, and pulse-position-modulated data-message pulses, without limitation) may be arranged in pulse groups 202 in an epoch. Varying the arrangement of types of pulse within an epoch may decrease the impact of burst errors on data transmission, and more specifically, improve performance of forward error correction (FEC) techniques. Pulse-ordering schemes may be chosen according to any suitable algorithm, as a non-limiting example, an algorithm that improves performance of Reed-Solomon type of FEC blocks.

FIG. 2 illustrates three different types of data that may be encoded in pulses (e.g., by applying pulse-position modulation (PPM) or another modulation technique to a portion of the pulses, without limitation) of a ranging signal, in accordance with one or more examples. As a non-limiting example, FIG. 2 illustrates ranging pulses ("R"), time-message PPM pulses ("T"), and data-message PPM pulses ("D"). Use of fewer types of pulses or other types of pulses, additionally or alternatively to those discussed herein, does not exceed the scope of this disclosure.

The ranging pulses are used, generally, to extract the time of arrival of the pulse. A receiver may use the time of arrival of the pulse to determine a range (e.g., a distance from the receiver to the transmitter), which may be used to determine a location of the receiver.

Time-message pulses may collectively encode timing information (e.g., by pulse-position modulation of each of the pulses). As a non-limiting example, a transmitter may be configured to keep a count of epochs, e.g., as an "epoch number" and may transmit the epoch number encoded in the time-message pulses of each epoch. The time-message pulses may, additionally or alternatively, include one or more error-correction bits, e.g., according to a Reed-Solomon error-correction scheme. Further, the time-message pulses may include leap-second information (e.g., a leap-second count and/or a leap-second flag) and/or transmitter-clock status information (e.g., transmitter-clock status bits).

As an example of encoding timing information, the epoch number may be a 32-bit number and 20 time-message pulses of an epoch may collectively encode the epoch number, the one or more error-correction bits, the leap-second information, and the transmitter-clock status information. Each time-message pulse may encode 5 bits (e.g., each pulse may encode one of the 32 symbols described with regard to FIG. 1D and Table 1). Of the 100 bits (e.g., of 20 pulses carrying five encoding each) 32 may be used to encode the epoch number, six may be used to encode the leap-second information, two may be used to encode the transmitter-clock status information, and 60 may be used to encode the error-correction bits.

Data-message pulses may collectively encode a data message (e.g., by pulse-position modulation of each of the pulses, without limitation). Data-message pulses may communicate a message, e.g., from a system operator of an eLoran system to user of an eLoran receiver. Non-limiting examples of information transmitted via data-message pulses include differential corrections, almanac information for transmitters and differential monitors, or messages, including, as non-limiting examples, emergency alerts or weather alerts. The data-message pulses may include one or more error-correction-message pulses, e.g., an FEC block according to a Reed-Solomon error-correction scheme. For example, each data-message pulse may encode 5 bits of the data message (e.g., each pulse may encode one of the 32 symbols described with regard to FIG. 1D and Table 1). Further, some of the bits encoded in the data-message pulses may be error-correction bits.

As a non-limiting example, FIG. 2 illustrates ten pulse groups 202, each including 13 pulse time slots 204. Thus, FIG. 2 illustrates one hundred thirty pulse time slots 204 of an epoch. A "pulse time slot" is a relative position (with respect to time) of a ranging pulse, time-message pulse or data-message pulse within an ordered set of pulses of a pulse group.

During each epoch, a transmitter may transmit all of the pulses of the epoch according to a pulse-ordering scheme such as pulse-ordering scheme 200. By arranging the different types of pulses 206 according to pulse-ordering scheme 200, a receiver may be able to determine which pulses are of which type. Thus, for example, a receiver may be able to determine which pulses are ranging pulses, time-message pulses, and data-message pulses based on the pulse order.

Moreover, by arranging the different types of pulses 206 according to pulse-ordering scheme 200, a transmitter may decrease the impact of errors that may result from repetitive or burst interference (e.g., from another transmitter). As a non-limiting example, if a series of two or more adjacent (in time) pulses is received with a high degree of interference, e.g., as a result of a nearby transmitter or lightning, the impact on the total information encoded in the pulse groups of the epoch may be decreased because different types of pulses 206 may be impacted as a result of the variability introduced by the pulse-ordering scheme. By decreasing the impact of burst errors on any particular type of pulse, error correction (e.g., Reed-Solomon error correction) may be enabled to function more effectively. Accordingly, one aspect of a pulse-ordering scheme is that groups of pulses of the same types may be separated by pulses of different types, e.g., to decrease a number of pulses of the same type that are broadcast in series, for example data-message PPM pulses may be separated one from another and/or time-message PPM pulses may be separated one from another.

In various examples, the epoch number in time-message pulses or data in the data-message pulses may be encrypted. For example, the epoch number, encoded into the time-message pulses, may be encrypted prior to encoding. As another example, the data message, encoded into the data-message pulses, may be encrypted prior to encoding. A single encrypted data message may span one or more epochs. Encryption of the epoch number or data message may be such that the epoch number or data message may be indecipherable without an encryption key. Thus, a recipient of all of the pulses of an epoch, and in possession of the pulse-ordering scheme 200, but not in possession of the encryption key, may be able to recover the symbols encoded by the time-message pulses or the data-message pulses, but may not be able to decrypt the epoch number or the data.

Alternatively, in various examples, the timing information may not be encrypted, e.g., the timing information may be transmitted in the clear. Not encrypting the timing information may enable a receiver of the time-message pulses to obtain timing information, e.g., an epoch number, without possessing an encryption key. Allowing a receiver to obtain the epoch number without an encryption key may allow the receiver to obtain information (e.g., more accurate timing information by correcting dither, which will be described in more detail below).

However, transmitting the timing information in the clear may leave the timing information vulnerable to spoofing. In various examples, the timing information may be transmitted in the clear (e.g., in time-message pulses) and second timing information may be transmitted, encrypted, in data-message pulses. The second timing information may be encrypted and thus, less vulnerable to spoofing than the timing information transmitted in the clear.

Further, the second timing information may include additional timing information not included in the timing information, e.g., a leap-second count. Including the additional timing information in the second timing information, transmitted, encrypted, in data-message pulses, may allow receivers in possession of the encryption key to obtain more detailed or more accurate timing information than is obtainable by receivers not in possession of the encryption key. Further, including the additional timing information in the second timing information may allow the timing information of the time-message pulses to not include the additional timing information, which may allow the number of time-message pulses to be reduced or the time-message pulses to include additional error-correction bits.

Additionally, or alternatively, one or more examples relate, generally, to controlling usability of ranging signals to limit accurate use of the ranging signals to certain recipients by adding a time offset (called a "dither offset," "dithering offset," or just "dither") that a specific recipient with a dither correction can correct for prior to using the ranging signals. As a non-limiting example, controlling usability may facilitate privatization of the ranging signals and a navigation system using the same.

Figure 3:
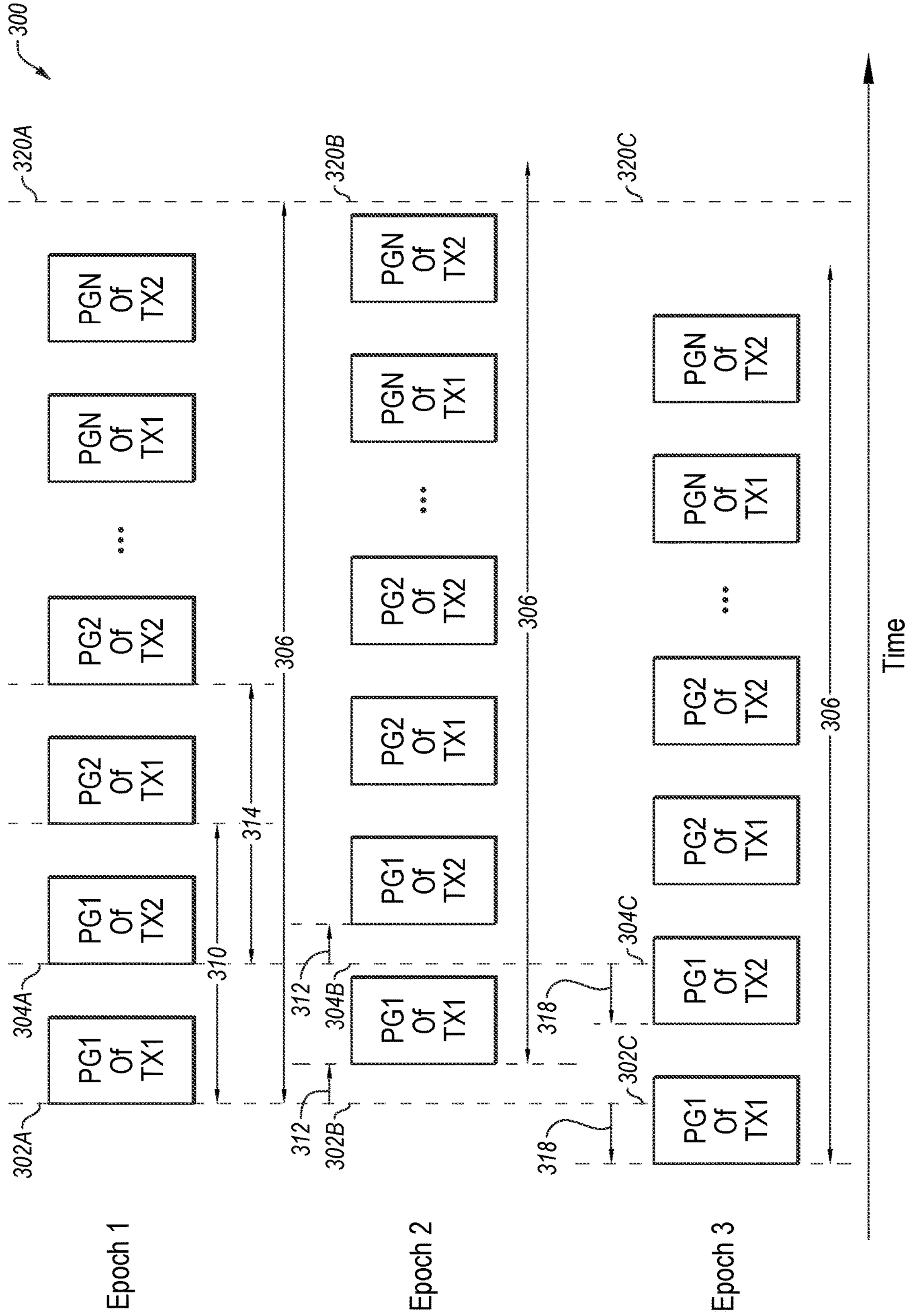
FIG. 3 illustrates example timings of pulse groups within epochs exhibiting chain-level dithering according to one or more examples.

FIG. 3 is a timing diagram 300 that illustrates example timings of pulse groups having dithering, according to one or more examples. For example, FIG. 3 illustrates timings of pulse groups of three epochs (Epoch 1, Epoch 2, and Epoch 3). The pulse groups that occur during Epoch 1 are not dithered e.g., with respect to a nominal epoch start time 302A. (In the present disclosure, pulse groups that occur during an epoch may be referred to as pulse groups "of" the epoch). The pulse groups of Epoch 2 are delayed with respect to a nominal epoch start time 302B and the pulse groups of Epoch 3 are advanced with respect to nominal epoch start time 302C.

FIG. 3 illustrates nominal epoch start times 302 (including nominal epoch start time 302A, which may be the nominal start time of Epoch 1, nominal epoch start time 302B, which may be the nominal start time of Epoch 2, and nominal epoch start time 302C, which may be the nominal start time of Epoch 3). Nominal epoch start time 302A, nominal epoch start time 302B, and nominal epoch start time 302A may be referred to collectively as nominal epoch start times 302. FIG. 3 also illustrates nominal subsequent-epoch start times 320 (including nominal subsequent-epoch start time 320A, which may be the end of Epoch 1 and the start time of a subsequent epoch, nominal subsequent-epoch start time 320B, which may be the end of Epoch 2 and the start time of a subsequent epoch, and nominal subsequent-epoch start time 320C, which may be the end of Epoch 3 and the start time of a subsequent epoch). Nominal subsequent-epoch start time 320A, nominal subsequent-epoch start time 320B, and nominal subsequent-epoch start time 320C may be referred to collectively as nominal subsequent-epoch start times 320. In various examples, Epochs 1, 2, and 3 may be sequential or non-sequential. In other words, Epoch 2 may or may not follow Epoch 1. Nominal subsequent-epoch start times 320 may follow nominal epoch start times 302 by an epoch duration 306 (i.e., the duration of an epoch). A nominal subsequent-epoch start time may be the end of a previous epoch. A nominal start time of an epoch may be the nominal subsequent-epoch start time of the preceding epoch. For example, if Epoch 2 followed Epoch 1, nominal start time 302B would be nominal subsequent-epoch start time 320A.

The pulse groups of Epoch 1 are illustrated without dithering. For example, the first pulse group of the first transmitter ("PG1 of TX1") is illustrated as beginning at nominal epoch start time 302A, i.e., PG1 of TX1 was not dithered (delayed or advanced) from nominal epoch start time 302A. The second pulse group of the first transmitter ("PG2 of TX1") starts at group-repetition interval 310 after nominal epoch start time 302A. Also, the first pulse group of the second transmitter ("PG1 of TX2") starts at nominal second-pulse-group start time 304A, i.e., PG1 of TX2 was not dithered from nominal second-pulse-group start time 304A. Also, PG2 of TX2 starts at group-repetition interval 314 after nominal second-pulse-group start time 304A. In various examples, group-repetition interval 310 may be the same or a different duration as group-repetition interval 314.

The pulse groups of Epoch 2 are delayed by delay offset 312 from nominal epoch start time 302B. For example, PG1 of TX1 of Epoch 2 is delayed from nominal epoch start time 302B by delay offset 312. Similarly, PG1 of TX2 of Epoch 2 is delayed from nominal second-pulse-group start time 304B by delay offset 312. Likewise, all pulse groups of Epoch 2 are delayed by delay offset 312. The timing of pulse groups (e.g., dithered or un-dithered) applies equally to all pulses of the pulse groups. For example, all of the pulses of PG1 of TX1 of Epoch 2 are delayed by delay offset 312. Dithering may be applied to all pulses of all pulse groups of an epoch. Thus, all pulses of a pulse group may be delayed by a delay offset. In contrast, an encoding delay may be applied to some pulses within pulse groups as described with regard to FIGS. 1D, 1E, 1F, and Table 1. Pulses may be delayed (or advanced) by dithering and an encoding delay.

Despite the delay of Epoch 2, a subsequent epoch begins at nominal subsequent-epoch start time 320B and not at nominal subsequent-epoch start time 320B plus delay offset 312. To prevent pulses from different epochs from being transmitted at the same time, in various examples, the delay offset 312 may be selected to be shorter than half of a nominal duration between the end of a last pulse of a last pulse group of an epoch and the beginning of a first pulse of a first pulse group of a subsequent epoch.

The pulse groups of Epoch 3 are advanced by advance offset 318. For example, PG1 of TX1 of Epoch 3 is advanced from nominal epoch start time 302C by advance offset 318. Similarly, PG1 of TX2 of Epoch 3 is advanced from nominal second-pulse-group start time 304C by advance offset 318. Likewise, all pulse groups of Epoch 3 are advanced by advance offset 318. Despite this advance, a subsequent epoch nominally would begin at nominal subsequent-epoch start time 320C and not after nominal subsequent-epoch start time 320C *minus* advance offset 318. To prevent pulses of different epochs from being transmitted at the same time, in various examples, the advance offset 318 may be selected to be shorter than a half of nominal duration between the end of a last pulse of a last pulse group of an epoch and the beginning of a first pulse of a first pulse group of a subsequent epoch.

The term "chain-level-dithering interval" may refer to a time interval by which all pulses of all pulse groups of all transmitters of a group of transmitters (which may be referred to as a chain) are delayed or advanced (relative to a nominal timing). A chain-level-dithering interval (e.g., delay offset 312 or advance offset 318) may apply for the duration of an epoch. In subsequent epochs, the pulse groups of all transmitters of a group of transmitters may be delayed or advanced by a different chain-level-dithering interval, or by none at all. Chain-level dithering is the dithering of a chain of transmitters by a chain-level-dithering interval over an epoch.

Figure 4:
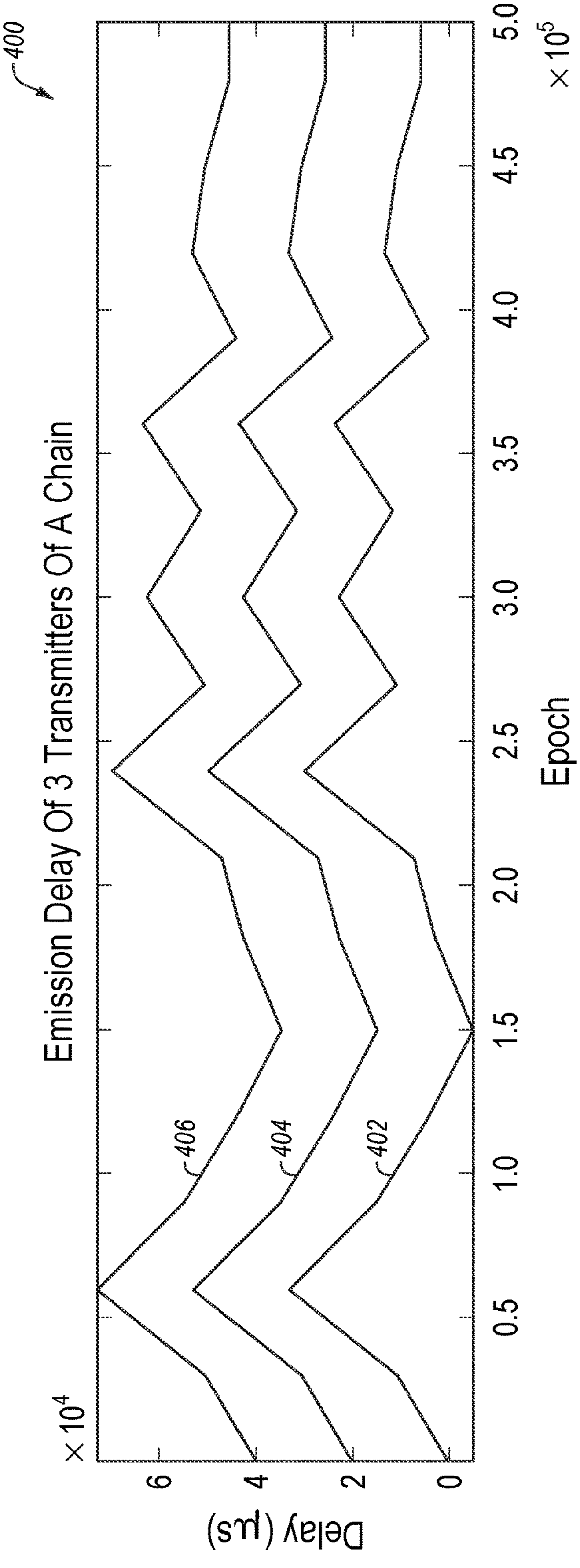
FIG. 4 illustrates an example of chain-level dithering over time according to one or more examples.

As an example of dithering, FIG. 4 illustrates dither offsets 400 of emission delay of 3 transmitters of a chain over time. The term "emission delay" may refer to a duration of a delay or advance from a nominal start time, including e.g., a nominal epoch start time. For example, FIG. 4 illustrates a first emission delay 402 of a first transmitter of a chain, a second emission delay 404 of a second transmitter of the chain, and a third emission delay 406 of a third transmitter of the chain. Dither offsets 400 (including first emission delay 402, second emission delay 404, and third emission delay 406) may include offsets resulting from chain-level dithering, transmitter-level dithering, and masking dithering. However, because of differences in magnitude between chain-level dithering and transmitter-level dithering and between chain-level dithering and masking dithering, in FIG. 4, transmitter-level dithering and masking dithering may not be apparent. Thus, FIG. 4 is scaled to particularly illustrates chain-level dithering. (Transmitter-level dithering and masking dithering are explained more fully below.)

Third emission delay 406 is delayed relative to second emission delay 404 by a nominal emission delay (e.g., 20,000 microseconds). The nominal emission delay may be an example of an inter-pulse-group interval (e.g., inter-pulse-group interval 154 of FIG. 1A). Similarly, second emission delay 404 is delayed relative to first emission delay 402 by the nominal emission delay. FIG. 4 illustrates that each of first emission delay 402, second emission delay 404, and third emission delay 406 are substantially parallel. First emission delay 402, second emission delay 404, and third emission delay 406 are substantially parallel because all of first emission delay 402, second emission delay 404, and third emission delay 406 are delayed by the same chain-level-dithering interval each epoch.

In various examples, a change in dithering of a chain (i.e., a change in dithering of all of the pulses of all of the pulse groups transmitted by a chain of transmitters) over time may follow a trend. For example, FIG. 4 illustrates changes in dithering of the chain following a ramp pattern between several points (e.g., pseudo-randomly selected points). For example, the chain-level dithering exhibited by dither offsets 400 may have several random values and may follow a ramp between the several random values. Thus, in the example illustrated in FIG. 4, between any two epochs, the change in dithering may be small relative to a change over many (e.g., 50,000 epochs). For example, at Epoch 1, the chain-level dithering may be 0 microseconds, at Epoch 2, the chain-level dithering may be slightly longer (e.g., 0.4 microseconds longer), and at Epoch 50,000, the chain-level dithering may be 20,000 microseconds. Thus, the magnitude of the chain-level dithering may be on the order of tens of thousands of microseconds when considered over many epochs while the magnitude of change between any two epochs may be much smaller, (e.g., 1 microsecond or less).

Figure 5:
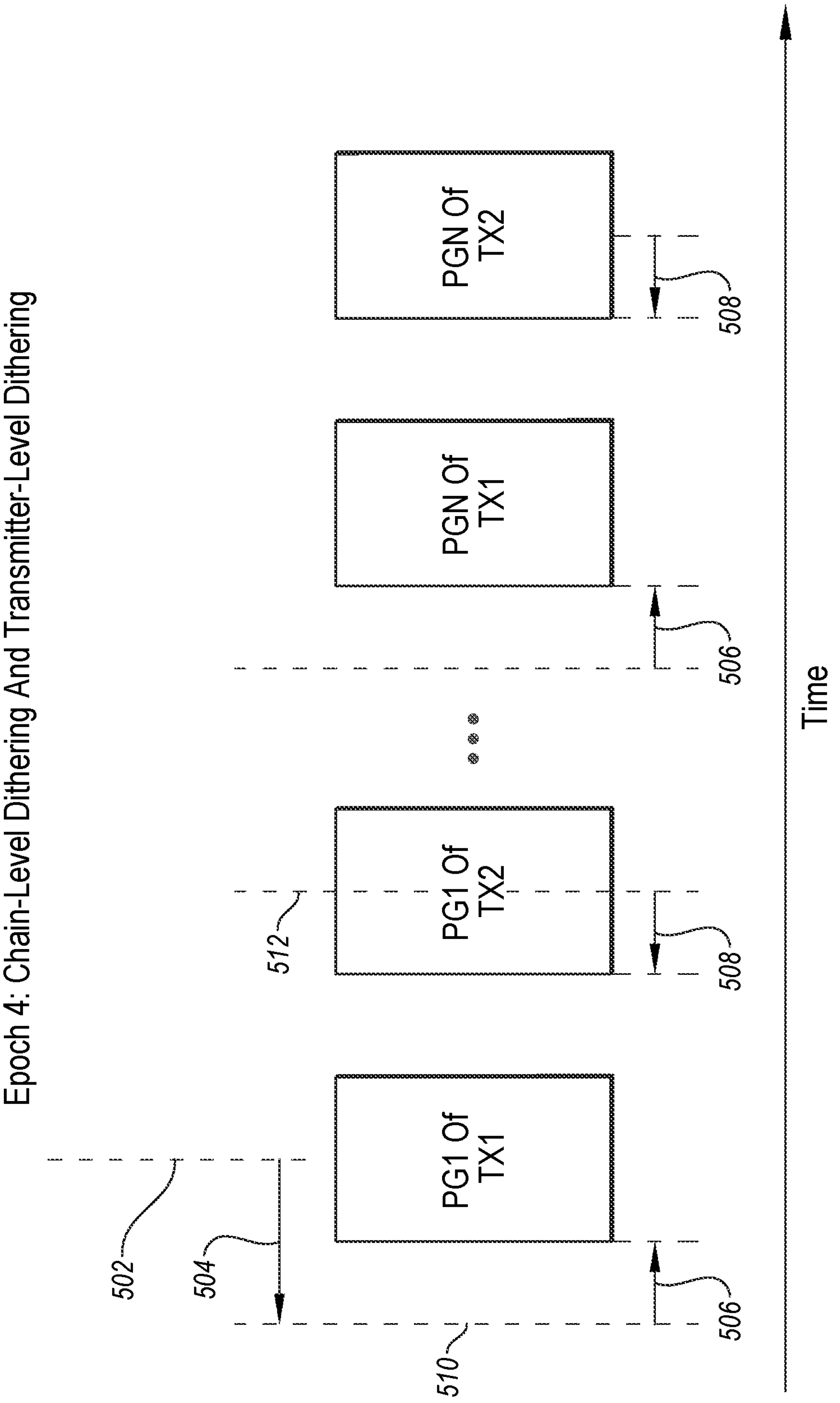
FIG. 5 illustrates example timings of pulse groups within an epoch exhibiting transmitter-level dithering and chain-level dithering according to one or more examples.

In addition to chain-level dithering, individual transmitters may individually dither timing of pulse groups. For example, FIG. 5 illustrates transmitter-level dithering and chain-level dithering. The transmitter-level dithering may be analogous to the chain-level dithering in that transmitter-level dithering may involve dithering all pulses of all pulse groups for an epoch. However, in contrast to chain-level dithering, transmitter-level dithering may be applied by transmitters individually and not by a chain of transmitters together.

FIG. 5 illustrates an Epoch 4 that includes both chain-level dithering and transmitter-level dithering. FIG. 5 illustrates a nominal epoch start time 502. FIG. 5 illustrates a chain-level-dithering interval 504 by which all of the pulse groups (including, e.g., PG1 of TX1, PG1 of TX2, PGN of TX1 and PGN of TX2) of a chain (e.g., TX1 and TX2) are advanced for the duration of Epoch 4. That is, based on the chain-level-dithering interval, the first pulse of Epoch 4 (PG1 of TX1) would begin at chain-level-dithered start time 510, which is advanced by chain-level-dithering interval 504 from nominal epoch start time 502.

However, FIG. 5 illustrates that PG1 of TX1 is, in addition, delayed by transmitter-level delay offset 506. For example, during Epoch 4, TX1 delays all of its pulse groups by transmitter-level delay offset 506.

Also, FIG. 5 illustrates that the pulse groups of TX2 are advanced (e.g., relative to chain-level-dithered second-pulse-group start time 512) by transmitter-level advance offset 508. Transmitter-level delay offset 506 is independent of transmitter-level advance offset 508.

Figure 6:
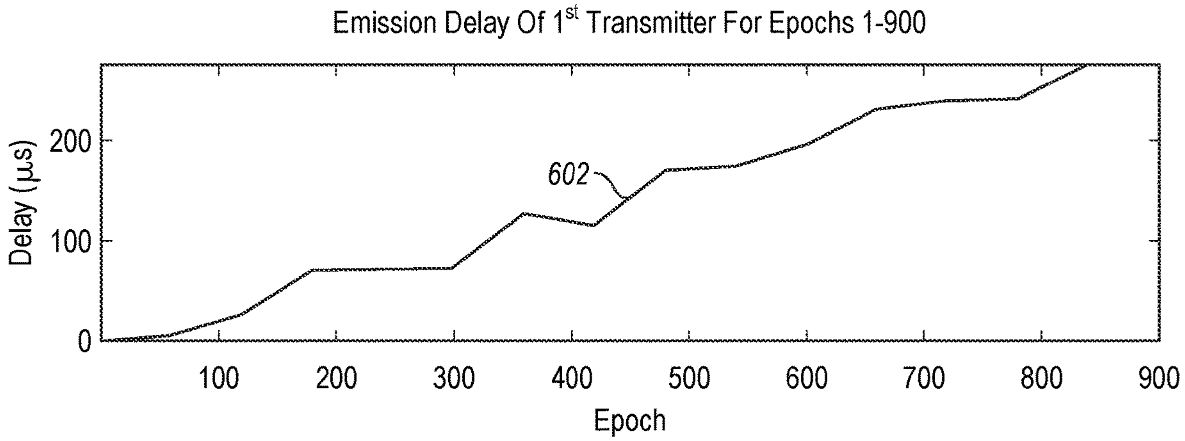
FIG. 6 illustrates an example of transmitter-level dithering over time according to one or more examples.

The term "transmitter-level-dithering interval" may be a time interval by which all pulse groups of a particular transmitter are delayed or advanced (relative to a nominal timing or relative to a nominal timing and a chain-level dither). A transmitter-level-dithering interval may apply for the duration of an epoch. In subsequent epochs, the pulse groups of the particular transmitter may be delayed or advanced by a different transmitter-level-dithering interval. In some cases, all pulse groups of each transmitter of each epoch may be delayed by a different transmitter-level-dithering interval, or by no transmitter-level-dithering interval. As an example of using a different transmitter-level-dithering interval each epoch, FIG. 6 illustrates dither offsets 602 of emission delay of a 1$^{st}$ transmitter for example Epochs 1-900. Transmitter-level dithering is the dithering of a particular transmitter by a transmitter-level-dithering interval over an epoch, i.e., by the dithering of an emission delay or advance from a nominal.

As an example of dithering, FIG. 6 illustrates dither offsets 602 of emission delay of one transmitter over time. Dither offsets 602 may include offsets resulting from chain-level dithering, transmitter-level dithering, and masking dithering. However, because of differences in magnitude between transmitter-level dithering and chain-level dithering, in FIG. 6, chain-level-dithering may appear as a general trend. Further, because of the difference between transmitter-level dithering and masking dithering, masking dithering may not be apparent in FIG. 6. Thus, FIG. 6 is particularly scaled to illustrate transmitter-level dithering. For example, the upward trend from a 0 microsecond delay to over a 200 microsecond delay that occurs between the 0th epoch to the 900th epoch may be a result of chain-level dithering, (e.g., the chain-level dithering particularly illustrated in FIG. 4). In particular, dither offsets 602 as illustrated in FIG. 6 may be a scaled-up view of first emission delay 402 of FIG. 4. (Chain-level dithering is explained more fully above and masking dithering is explained more fully below.) Transmitter-level dithering may be observed in the deviations from what would otherwise be a straight line from the 0 microsecond delay to the over-200 microsecond delay that occurs between the 0th epoch to the 900th epoch.

In various examples, a change in dithering of a transmitter (i.e., a change in dithering of all of the pulses of all of the pulse groups transmitted by a transmitter) over time may follow a trend. For example, the dither offsets 602 may have several random values and may follow a ramp between the several random values. For example, FIG. 6 illustrates changes in dithering of the transmitter following a ramp pattern between several points. Thus, in the example illustrated in FIG. 6, between any two epochs, the change in dithering may be small relative to a change over many (e.g., 50 respective epochs). For example, at the 300th epoch, the transmitter-level dithering may be a delay of 60 microseconds, at the 301st epoch, the transmitter-level dithering may be slightly longer delay (e.g., 1 microsecond longer), and at the 350th epoch, the transmitter-level dithering may be a delay of 110 microseconds. Thus, the magnitude of the transmitter-level dithering may be on the order of tens or hundreds of microseconds when considering many epochs while the magnitude of change between any two adjacent epochs may be much smaller, (e.g., 1 microsecond or less).

Additionally, in various examples, a magnitude of change caused by a chain-level-dithering interval over time may be larger or smaller (e.g., by an order of magnitude or more) than a magnitude of change caused by a transmitter-level-dithering interval over the same time. For example, a magnitude of change caused by the dither offsets 400 of FIG. 4 may be one hundred times greater in magnitude than the magnitude of change caused by dither offsets 602 of FIG. 6. Stated another way, in terms of overall dithering over time, chain-level dithering may impact an instantaneous dither, i.e., the dither between two subsequent epochs, 100 times more than the transmitter-level dithering impacts the instantaneous dither. For example, transmitter-level dithering may account for variations in dither offsets 602 that are on the order of tens of microseconds over the course of Epochs 1 to 900 while chain-level dithering may account for the overall trend of dither offsets 602 (e.g., between zero microseconds to exceeding 200 microseconds) over the course of Epochs 1 to 900.

Additionally, in various examples, the duration of a ramp of chain-level dithering may be different (e.g., by an order of magnitude or more) than a duration of a ramp of transmitter-level-dithering interval. For example, the chain-level-dither offsets (which chain-level dither offsets FIG. 4 is particularly scaled to illustrate) may follow a ramp between two values for a duration of 30,000 epochs while the transmitter-level-dither offsets (which transmitter-level dither offsets FIG. 6 is particularly scaled to illustrate) may follow a ramp between two values for a duration of 60 respective epochs.

The magnitude of the chain-level-dithering interval and/or the transmitter-level-dithering interval may be selected to be smaller than a default duration between pulse groups (or epochs). For example, the chain-level-dithering interval and the transmitter-level-dithering interval may be selected such that even if a chain and transmitter were delayed during a first epoch, and the chain and transmitter were advanced during the next epoch, an overlap of pulse groups would be avoided. As another example, the transmitter-level-dithering interval may be selected such that if pulses of a first transmitter were delayed, and pulses of a second transmitter were advanced, signals from the first and second transmitter would not overlap.

By dithering one or more pulse groups during one or more epochs (e.g., as illustrated by FIG. 3 and FIG. 5) it may be possible to privatize the signals of a system (e.g., a timing-dependent system). As a non-limiting example, receivers may depend on timing (e.g., the time of arrival of signals at the receiver) to calculate positioning, navigation, or timing information. If signals transmitted at one or more transmitters are dithered, the receiver may be unable to accurately calculate positioning, navigation, or timing information. In other words, the dithering may introduce errors in positioning, navigation, or timing information calculable at a receiver.

In various examples, one or more of the transmitters may dither signals according to a dithering schedule. The dithering schedule may include a pre-defined dithering schedule, which is a schedule of dithering intervals (e.g., chain-level-dithering intervals or transmitter-level-dithering intervals) to apply to signals transmitted during a number of epochs. A receiver, in possession of the dithering schedule, may be able to correct for the effects of the dithering on the received signals and thereby accurately calculate positioning, navigation, or timing information. Receivers without the dithering schedule may be unable to accurately calculate positioning, navigation, or timing information from the dithered signals.

Transmitters or chains may privatize their signals, e.g., by making accurate use of the signals dependent on possession of the dithering schedule. An operator of the transmitters may sell the dithering schedule, e.g., on a subscription basis.

In one or more examples, multiple levels of service may be defined to allow for various levels of accuracy calculable at a receiver. As a non-limiting example, transmitters may include two or more instances of dithering and sell the dithering schedules separately. Additionally or alternatively, dithering schedules including different degrees of accuracy may be sold. Specific users receive two keys, and lower level users a single key. The dither could be the sum of two terms, specific users would have access to both terms (via their keys), and lower level users could only access a coarse term (via their key).

The dithering schedule may be encrypted or be usable only with a key such that a receiver must possess a key to utilize the dithering schedule. The dithering at a chain or transmitter may be related to the epoch number. As a non-limiting example, the dithering schedule may include dithering intervals for each epoch number. Thus, the dithering schedule may be indexable by epoch number. As an example, the dithering schedule may include a function (e.g., an encryption algorithm) that may accept as input the key and the epoch number and may return corrections for dithering for one or more transmitters for that epoch. A receiver may use the corrections to correct pulses received during the epoch. Thus, possession of both the epoch number and the key may be critical for the accurate calculation of PNT information.

In various examples, the magnitude of the chain-level dithering and/or the transmitter-level dithering may be selected according to a ramp such that a receiver may be able to decode an epoch number from transmissions without fully correcting the dithering. For example, a magnitude of the chain-level dithering or the transmitter-level dithering may be selected to be great enough to render location calculations inaccurate, yet, at the same time, because of the ramp, and the relatively small difference between dithering of individual pulse groups, a receiver may be able to decode an epoch number from the broadcast cycle. Thus, during initialization of a receiver, the receiver may be able to obtain an epoch number that can then be used with the dithering schedule to correct the pulses. Additionally or alternatively, the ramps in the magnitudes of chain-level dithering or the transmitter-level dithering may prevent or render it difficult to resolve the dithering by averaging over epochs. For example, if the transmitter-level dithering were random, each epoch, with a mean value of zero, a receiver could observe a number of epochs and average out the dithering.

In addition to chain-level dithering and/or transmitter-level dithering, in various examples, masking dithering may be applied. The masking dithering may be used to mask trends in dithering. In particular, in cases where chain-level dithering and/or transmitter-level dithering is applied according to a ramp, masking dithering may obscure the one or more ramps and/or make predicting dithering more difficult or improbable.

Masking dithering may include pseudo-random dithering applied to pulse groups (including to all pulses of the pulse group) independently each epoch. The masking dithering may employ different amounts of dithering each epoch independent of the dithering of prior epochs. For example, in contrast to dithering following a ramp, the masking dithering may be independent each epoch. Thus, the offset imparted by masking dithering may be relatively highly different between one epoch and the next compared with the offset imparted by masking dithering over many epochs. The relatively high degree of difference between offsets of subsequent epochs of masking dithering may mask the effects of chain-level dithering and/or transmitter-level dithering, which may follow a ramp. For example, in the absence of the masking dithering, a receiver, e.g., a receiver that is not in possession of the dithering schedule, may be able, over time to observe a ramp of the chain-level dithering and/or the transmitter-level dithering (assuming the chain-level dithering and/or the transmitter-level dithering are according to the ramp) and predict the dithering of future pulse groups. However, with the masking dithering applied, a receiver is less able to observe the ramp of either the chain-level dithering or the transmitter-level dithering (in other words, it may take longer for a receiver to be able to observe the ramps of the chain-level and/or transmitter-level dithering).

Figure 7:
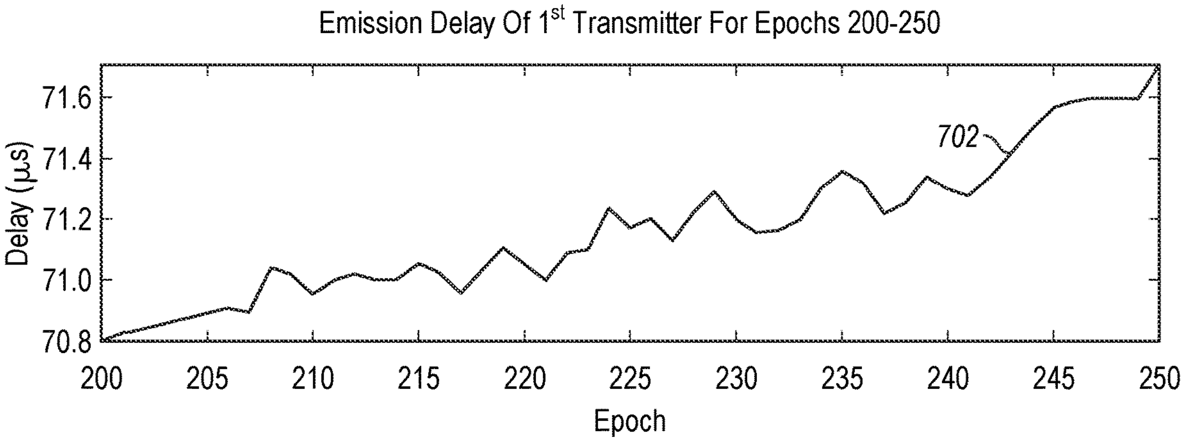
FIG. 7 illustrates an example of masking dithering over time according to one or more examples.

As an example of dithering, FIG. 7 illustrates dither offsets 702 of emission delay of one transmitter over time. Dither offsets 702 may include offsets resulting from chain-level dithering, transmitter-level dithering, and masking dithering. However, because of differences in magnitude between masking dithering and chain-level dithering and between masking dithering and transmitter-level dithering, in FIG. 7, chain-level-dithering and/or transmitter-level dithering may appear as a general trend. Thus, FIG. 7 particularly illustrates masking dithering. For example, from 200th epoch to 250th epoch of FIG. 7, the general upward trend (e.g., from 70.8 microseconds offset to 71.7 microseconds offset after 50 respective epochs) may be a result of chain-level dithering and/or transmitter-level dithering. Thus, dither offsets 702 as illustrated in FIG. 7 may be a scaled-up view of first emission delay 402 of FIG. 4 and a scaled up view of dither offsets 602 of FIG. 6.

In contrast to ramped dithering (e.g., as may be applied in chain-level dithering and/or transmitter-level dithering by utilizing a ramp), the masking dither is applied independently each epoch. The masking dither may be a pseudo-random dither (with a mean value of zero). However because the masking dither is independent each epoch, the masking dither does not cause any trend in the dither over time.

In various examples, masking dithering may change the timing of pulse groups by magnitudes (of timing) that are smaller or larger than (e.g., by an order of magnitude or more) the chain-level-dithering interval or the transmitter-level-dithering interval. For example, as illustrated in FIG. 7, for respective epochs, masking dithering may dither a signal on the order of 0.2 microseconds. However, because the masking dither has a mean value of zero, the masking dither does not cause a trend over time. In other words, the masking dither may account for a 0.2 microsecond swing between the 1st epoch and the 2nd epoch and the masking dither may account for a 0.2 microsecond swing between 1st epoch and the 300th epoch or 50,000th epoch. In other words, the magnitude of the masking dithering may be the same whether considering many epochs or single epochs.

As with the chain-level dithering and the transmitter-level dithering, the masking dithering may be included in the dithering schedule such that the masking dithering may be corrected for (e.g., by a receiver in possession of the dithering schedule) before calculating positioning, navigation, or timing information from the dithered signals.

Additionally or alternatively, one or more examples relate, generally, to providing for validation of pulse groups by encoding a signature in phases of pulses of pulse groups.

Figure 8A:
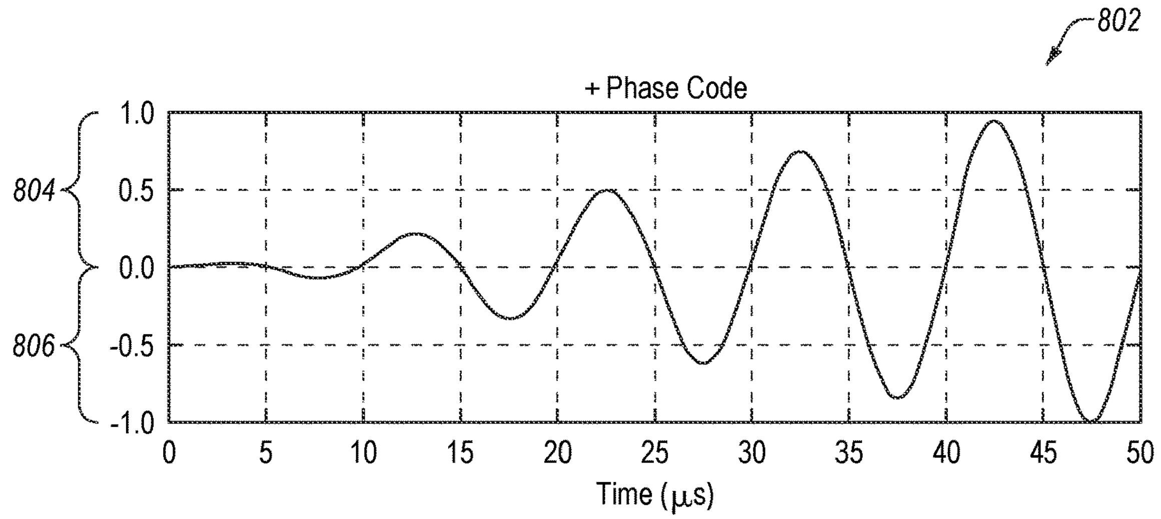
FIG. 8A illustrates a graph that represents a positive-phase-code pulse for an example pulse according to one or more examples.
Figure 8B:
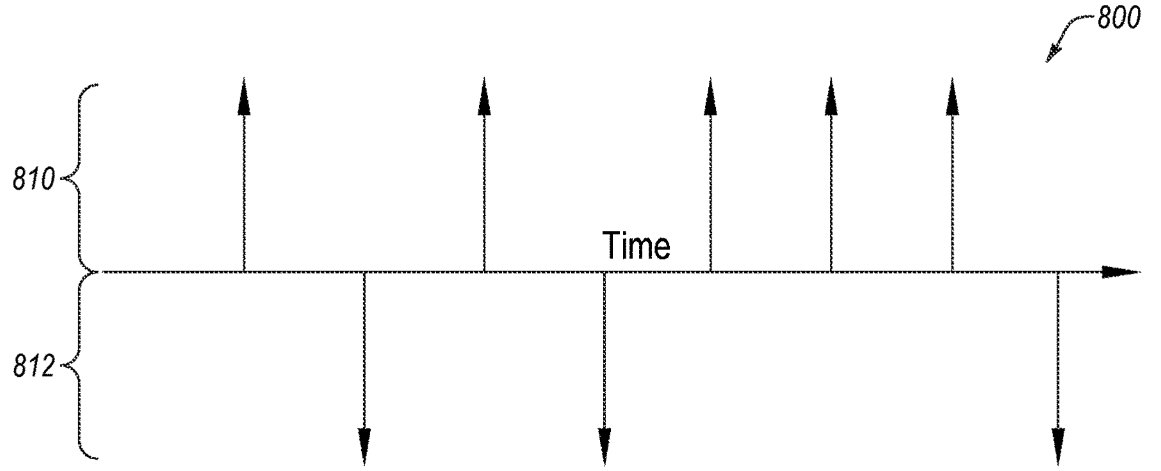
FIG. 8B illustrates a graph that represents the example pulse group that includes positive-phase-code pulses (e.g., of FIG. 8A) and negative-phase-code pulses (e.g., of FIG. 8C) according to one or more examples.
Figure 8C:
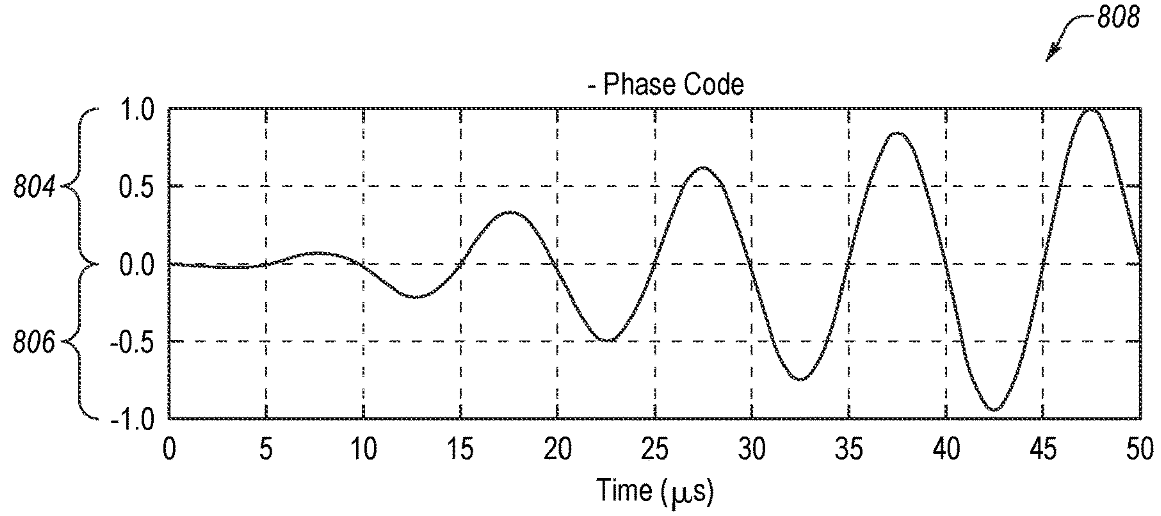
FIG. 8C illustrates a graph that represents a negative-phase-code pulse for the example pulse according to one or more examples.

FIGS. 8A, 8B and 8C illustrate graphs that represent phase encoding of a pulse group 800 by applying pre-specified phase signatures, according to one or more examples.

FIG. 8A illustrates a graph that represents a positive-phase-code pulse for an example pulse group 800. FIG. 8C illustrates a graph that represents a negative-phase-code pulse for the example pulse group 800. A pulse, e.g., positive-phase-code pulse 802 may include multiple positive half cycles 804 and multiple negative half cycles 806. A pulse may have a positive phase code, e.g., as illustrated by positive-phase-code pulse 802 or a negative phase code, e.g., as illustrated by negative-phase-code pulse 808 (FIG. 8C). As a non-limiting example, positive-phase-code pulse 802 may begin with one of positive half cycles 804 and negative-phase-code pulse 808 may begin with one of negative half cycles 806. Negative-phase-code pulse 808 may be 180 degrees out of phase with positive-phase-code pulse 802.

The zero-crossings of positive-phase-code pulse 802 and negative-phase-code pulse 808 may be the same, which may be relevant to timing, e.g., for positioning, navigation, or timing. Further, the frequency (or frequencies) of positive-phase-code pulse 802 and negative-phase-code pulse 808 may be the same. As such, positive-phase-code pulse 802 and negative-phase-code pulse 808 may encode, by pulse-position modulation and timing, the same information and be decoded in the same way.

FIG. 8B illustrates a pulse group 800 that includes positive-phase-code pulses 810 and negative-phase-code pulses 812. Accordingly, the phases of all of the pulses in the pulse group, collectively, may be used to encode information (e.g., a signature of a transmitter). Encoding information in the phases of pulses of a pulse group may not affect timing or other data encoding included in the pulse group.

Phases of pulses of a pulse group may be used to allow for validation of a signal (and consequently data) to increase security of a system. For example, phases of pulses of a pulse group may be encoded to prevent (or increase the difficulty of) spoofing a signal from a transmitter of the system. In other words, a system may use phase-encoding for anti-spoofing purposes.

As a non-limiting example, a transmitter may phase pulses of pulse groups such that the transmitted pulse groups match a pulse phase signature. The transmitter may change pulse phase signatures each epoch according to a pulse-phase-signature schedule. As a non-limiting example, a transmitter may transmit a first pulse group that matches a first pulse phase signature in a first epoch in accordance with the pulse-phase-signature schedule and transmit a second pulse group that matches a second pulse phase signature in a second epoch according to the pulse-phase-signature schedule.

A receiver, in possession of the pulse-phase-signature schedule may be able to verify that the transmitter transmitted the signal, e.g., by comparing phases of the received pulse groups to the pulse-phase-signature schedule. Further the pulse-phase-signature schedule may be related to the epoch number. As a non-limiting example, the pulse-phase-signature schedule may include pulse phase signatures indexable by the epoch number.

The pulse-phase-signature schedule may be encrypted such that a receiver must possess a key to utilize the pulse-phase-signature schedule. As an example, the pulse-phase-signature schedule may include a function that may accept as input the key and the epoch number and may return an expected pulse-phase-signature for the epoch. A receiver may compare received pulse phases to the expected pulse-phase signature to authenticate the received signal.

A number of techniques for encoding data have been described herein. Two or more of the techniques may be employed at the same time (e.g., to pulses of pulse groups of the same epoch).

As an example of two techniques being employed together, a pulse group may include pulses encoding information in an inter-pulse interval e.g., as described with regard to FIG. 1B. One or more of the pulses may additionally encode data positions of the one or more pulses e.g., as described with regard to FIGS. 1D, 1E, 1F, 1G, and 2. The positions of the one or more pulses may be relative to a nominal position as defined with regard to the inter-pulse interval.

As an example of two techniques being employed together, pulse groups of an epoch may be dithered (e.g., by chain-level dithering, transmitter-level dithering and/or masking dithering) e.g., as described with regard to FIGS. 3-7 and pulse positions may be modulated as described with regard to FIGS. 1D, 1E, 1F, 1G, and 2. The dithering may be independent of the modulation. One reason for the independence is because pulse-position modulation may affect pulses within a pulse group while dithering may affect all pulses of all pulse groups of an epoch uniformly.

As an example of two techniques being employed together, pulses of a pulse group may be phase encoded to encode a signature e.g., as described with regard to FIG. 8 independent of pulse-position modulation as described with regard to FIGS. 1D, 1E, 1F, 1G, and 2. One reason for this is because pulse-position modulation affects timing of pulses while phase encoding affects phase of the pulses.

Figure 9:
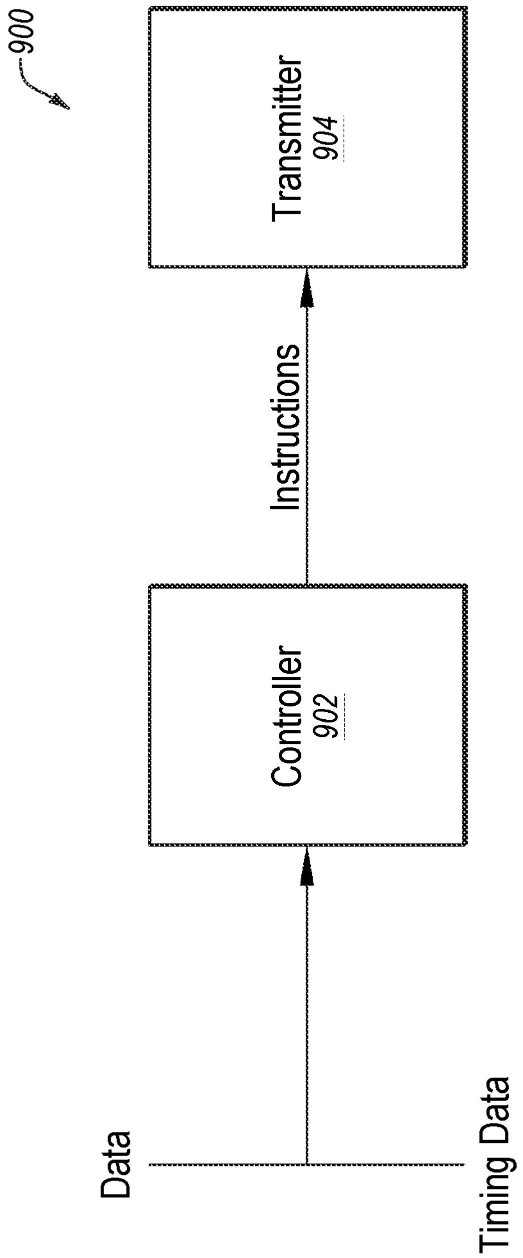
FIG. 9 illustrates an example of system to perform one or more disclosed techniques when generating radio waves (e.g., radio frequency groundwaves) for ranging and data pulses, according to one or more examples.

FIG. 9 is a functional block diagram that illustrates an example of logical blocks of a system 900 configured to perform one or more disclosed techniques when generating radio frequency groundwaves for pulses, according to one or more examples. For example, system 900 includes controller 902 and transmitter 904. System 900 may be configured to transmit signals (e.g., pulses in pulse groups of broadcast cycles) according to one or more examples.

Controller 902 may be configured to receive data from, e.g., a control center. The data may include data for transmission, e.g., in data-message pulses (e.g., as described above with regard to FIG. 2).

Additionally or alternatively, controller 902 may be configured to receive timing data, e.g., from a time standard. The timing data may include a time of day, a pulse-per-second signal, or a frequency reference.

Controller 902 may calculate features (e.g., timing, phase, or pulse shape) of signals (e.g., pulses in pulse groups of broadcast cycles) to be transmitted. Controller 902 may calculate the features such that the signals (in aggregate) are according to one or more examples. Controller 902 may provide instructions to transmitter 904 that may be indicative of the signals to be transmitted at transmitter 904.

As a non-limiting example, in various examples, controller 902 may provide transmitter 904 with an indication of a phase of a pulse to be transmitted. Additionally or alternatively, controller 902 may provide transmitter 904 with an indication of when to transmit a pulse (e.g., a pulse trigger).

Transmitter 904 may transmit signals, e.g., pulses in pulse groups of broadcast cycles. Transmitter 904 may transmit pulses according to the instructions from controller 902. Additionally or alternatively, transmitter 904 may transmit a pulse with a phase according to the indication of phase provided by controller 902. Additionally or alternatively, transmitter 904 may transmit pulses at times indicated by controller 902, e.g., based on receiving a pulse trigger from controller 902.

As a non-limiting example, controller 902 may determine an inter-pulse interval such that system 900 has a unique (or unique within a geographical area) inter-pulse interval for identifying transmitter 904, e.g., as described above with regard to FIG. 1B. Controller 902 may provide instructions (e.g., pulse triggers) such that transmitter 904 transmits pulses of a pulse group having the determined inter-pulse interval.

As another non-limiting example, controller 902 may determine an arrangement of different types of pulses in pulse groups of broadcast cycles, e.g., according to a pulse-ordering scheme, e.g., as described above with regard to FIG. 2. Controller 902 may provide instructions such that transmitter 904 transmits pulses arranged in pulse groups of broadcast cycles according to the determined arrangement.

As another non-limiting example, controller 902 may calculate dither, e.g., according to a dithering schedule, e.g., as described above with regard to FIG. 3-FIG. 7. Controller 902 may provide instructions (e.g., pulse triggers) such that transmitter 904 transmits pulse groups advanced or delayed (e.g., dithered) according to the calculated dither.

As another non-limiting example, controller 902 may determine a phase encoding for phases of pulses of pulse groups of broadcast cycles, e.g., according to a pulse-phase-signature schedule, e.g., as described above with regard to FIGS. 8A-8C. Controller 902 may provide phase instructions such that transmitter 904 transmits pulses having phases according to the determined phase encoding.

Figure 10:
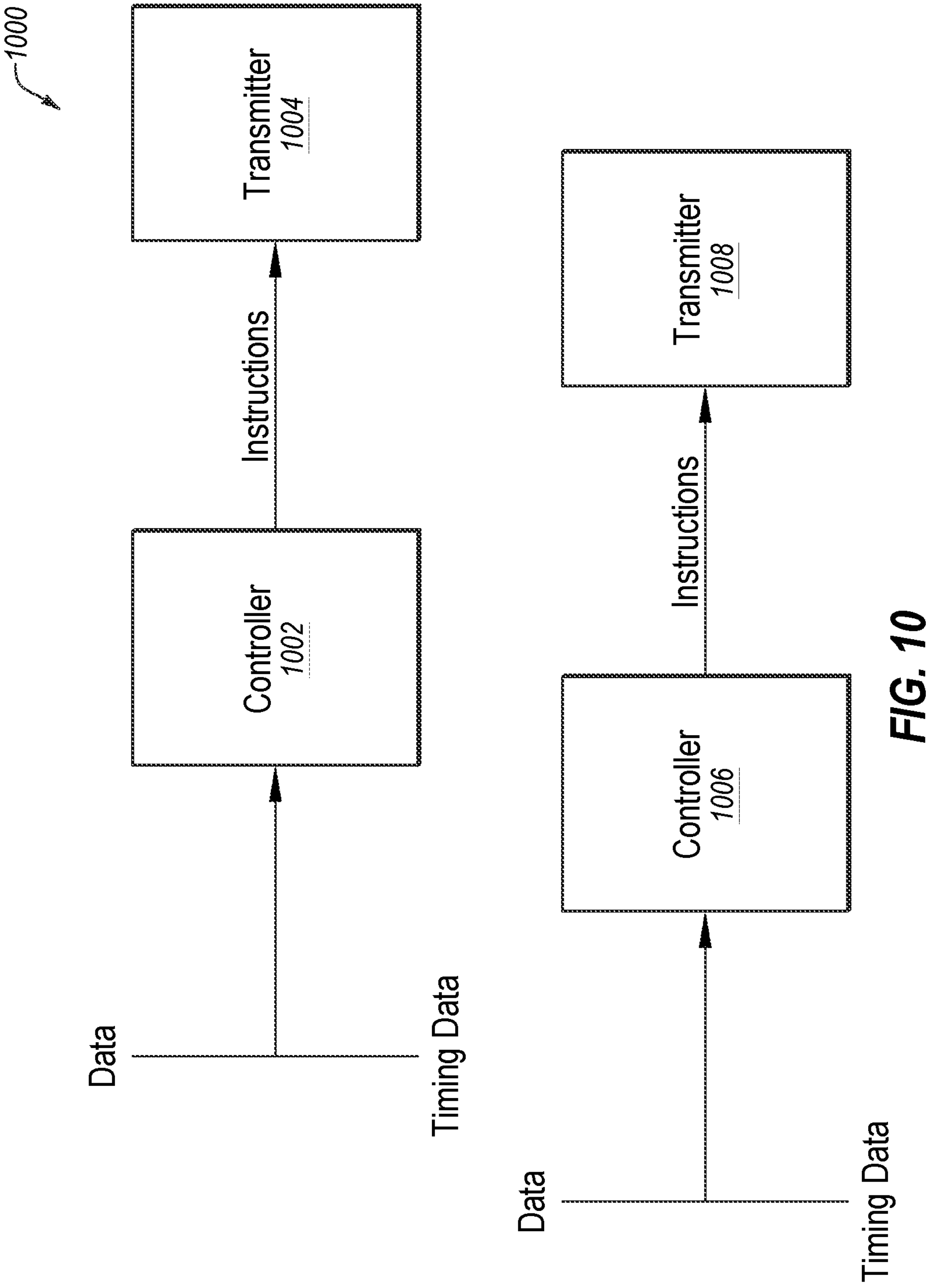
FIG. 10 is a functional block diagram that illustrates an example of logical blocks of a system 1000 configured to perform one or more disclosed techniques when generating radio frequency groundwaves for pulses, according to one or more examples.

FIG. 10 is a functional block diagram that illustrates an example of logical blocks of a system 1000 configured to perform one or more disclosed techniques when generating radio frequency groundwaves for pulses, according to one or more examples. For example, system 1000 includes controller 1002, transmitter 1004, controller 1006, and transmitter 1008. System 1000 may be configured to transmit signals (e.g., pulses in pulse groups of broadcast cycles) according to one or more examples. In particular, controller 1002 may provide instructions for transmitter 1004 to transmit signals and controller 1006 may provide instructions for controller 1006 to transmit signals.

Each of controller 1002 and controller 1006 may be the same as, substantially similar to, and/or perform the same operations as controller 902 of FIG. 9. Each of transmitter 1004 and transmitter 1008 may be the same as, substantially similar to, and/or perform the same operations as transmitter 904 of FIG. 4.

In some examples, controller 1002 and transmitter 1004 may be at a first location and controller 1006 and transmitter 1008 may be at a second location remote from the first location. Controller 1002 and transmitter 1004 may be a first transmitter (e.g., TX1 referenced with regard to FIG. 1A) that may generate first signals (e.g., PG1 of TX1 102 and PG2 of TX1 108). Controller 1006 and transmitter 1008 may be a second transmitter (e.g., TX2 referenced with regard to FIG. 1A) that may generate second signals (e.g., PG1 of Tx2 104 and PG2 of Tx1 108).

In some examples, controller 1002 and transmitter 1004 may be of the same chain as controller 1006 and transmitter 1008. For example, controller 1002 and transmitter 1004 may generate pulses offset according to first emission delay 402 of FIG. 4 and controller 1006 and transmitter 1008 may generate pulses offset according to second emission delay 404.

Figure 11:
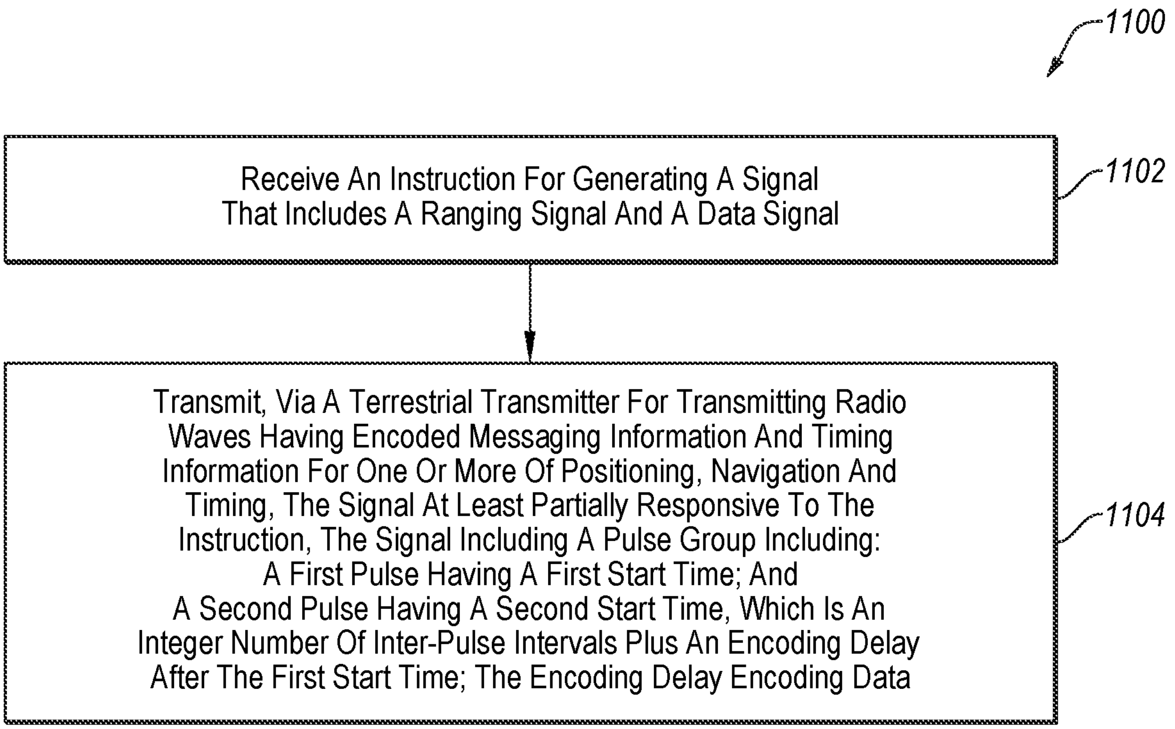
FIG. 11 is a flowchart of an example method in accordance with various examples of the disclosure.

FIG. 11 is a flowchart of an example method 1100, in accordance with various examples of the disclosure. At least a portion of method 1100 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

At block 1102, an instruction for generating a signal that includes a ranging signal and a data signal may be received. For example, instructions may be received by transmitter 904 e.g., from controller 902.

At block 1104, the signal may be transmitted. The signal may be transmitted via a terrestrial transmitter (e.g., transmitter 904). The terrestrial transmitter may be for transmitting radio waves having encoded messaging information and timing information for one or more of positioning, navigation and timing. The signal may be at least partially responsive to the instruction of block 1102. The signal may include a pulse group. The pulse group may include a first pulse having a first start time and a second pulse having a second start time. The second start time may be an integer number of inter-pulse intervals plus an encoding delay after the first start time. The encoding delay may encode data, i.e., the duration of encoding delay may be decoded as data.

Figure 12:
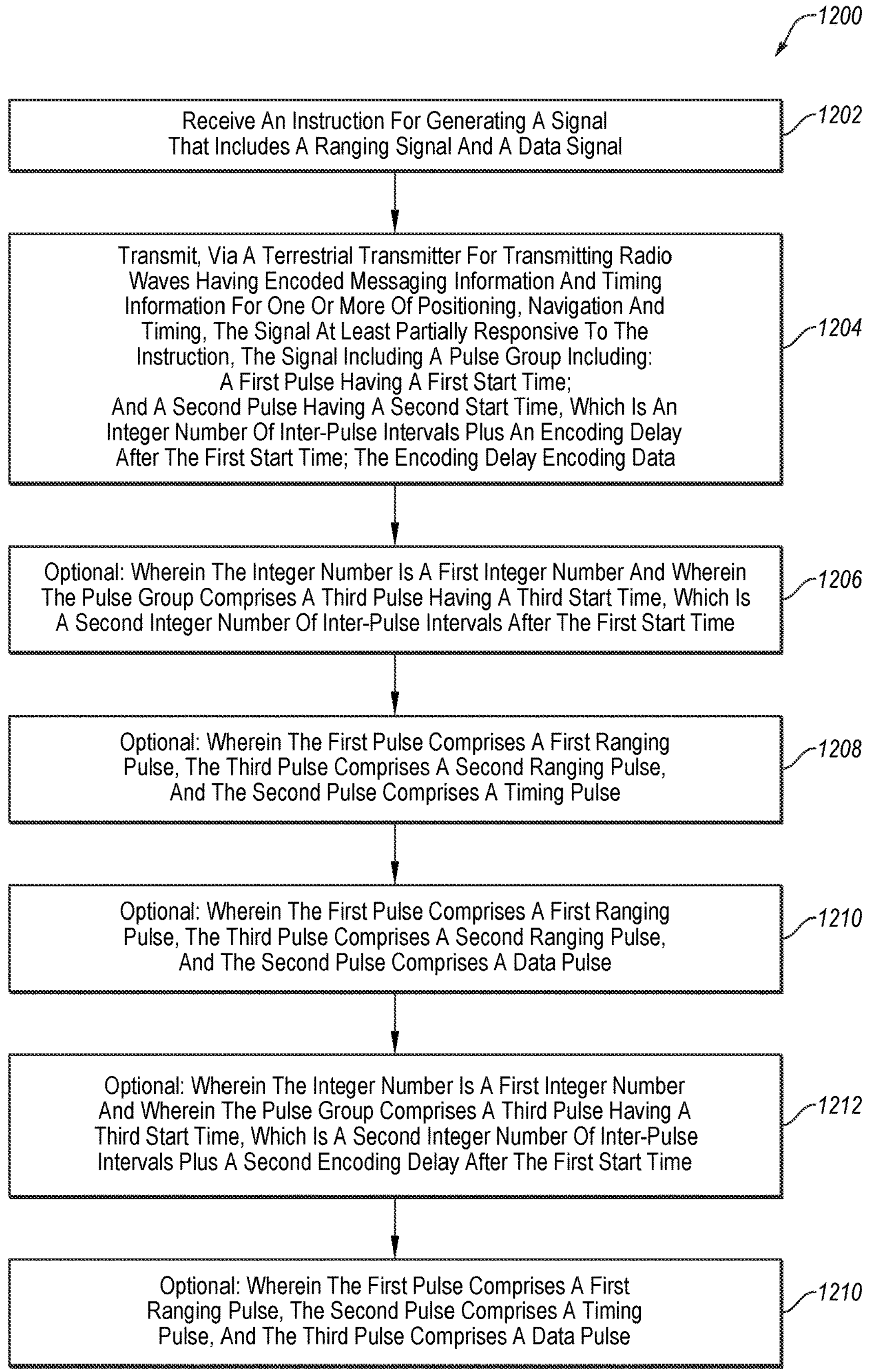
FIG. 12 is a flowchart of an example another method in accordance with various examples of the disclosure.

FIG. 12 is a flowchart of an example method 1200, in accordance with various examples of the disclosure. At least a portion of method 1200 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1202 may be the same as block 1102 of FIG. 11. Block 1204 may be the same as block 1104 of FIG. 11.

According to block 1206, which is optional, the integer number is a first integer number and the pulse group comprises a third pulse having a third start time that is a second integer number of inter-pulse intervals after the first start time.

According to block 1208, which is optional, the first pulse is a first ranging pulse, the third pulse (e.g., the third pulse of block 1206) is a second ranging pulse, and the second pulse is a timing pulse. For example, a time of arrival of the first pulse and of the third may be used to calculate position, navigation, and/or timing data. Further, the encoding delay of the second pulse may encode a symbol (e.g., as described relative to Table 1). The symbol may be encode timing information or a portion of timing information.

According to block 1210, which is optional, the first pulse is a first ranging pulse, the third pulse (e.g., the third pulse of block 1206) is a second ranging pulse, and the second pulse is a data pulse. For example, a time of arrival of the first pulse and of the third may be used to calculate position, navigation, and/or timing data. Further, the encoding delay of the second pulse may encode a symbol (e.g., as described relative to Table 1). The symbol may be encode a data message or a portion of a data message.

According to block 1212, which is optional, the encoding delay of block 1204 is a first encoding delay and the pulse group includes a third pulse having a start time that is a second integer number of inter-pulse intervals plus a second encoding delay after the first start time. The second encoding delay may encode data. For example, the second encoding delay may be the same as the first encoding delay (which would mean that the second encoding delay encodes the same symbol) or the second encoding delay may be different from the first encoding delay (i.e., encoding a different symbol).

According to block 1214, which is optional, the first pulse is a first ranging pulse, the second pulse is a timing pulse, the third pulse is a data pulse.

Figure 13:
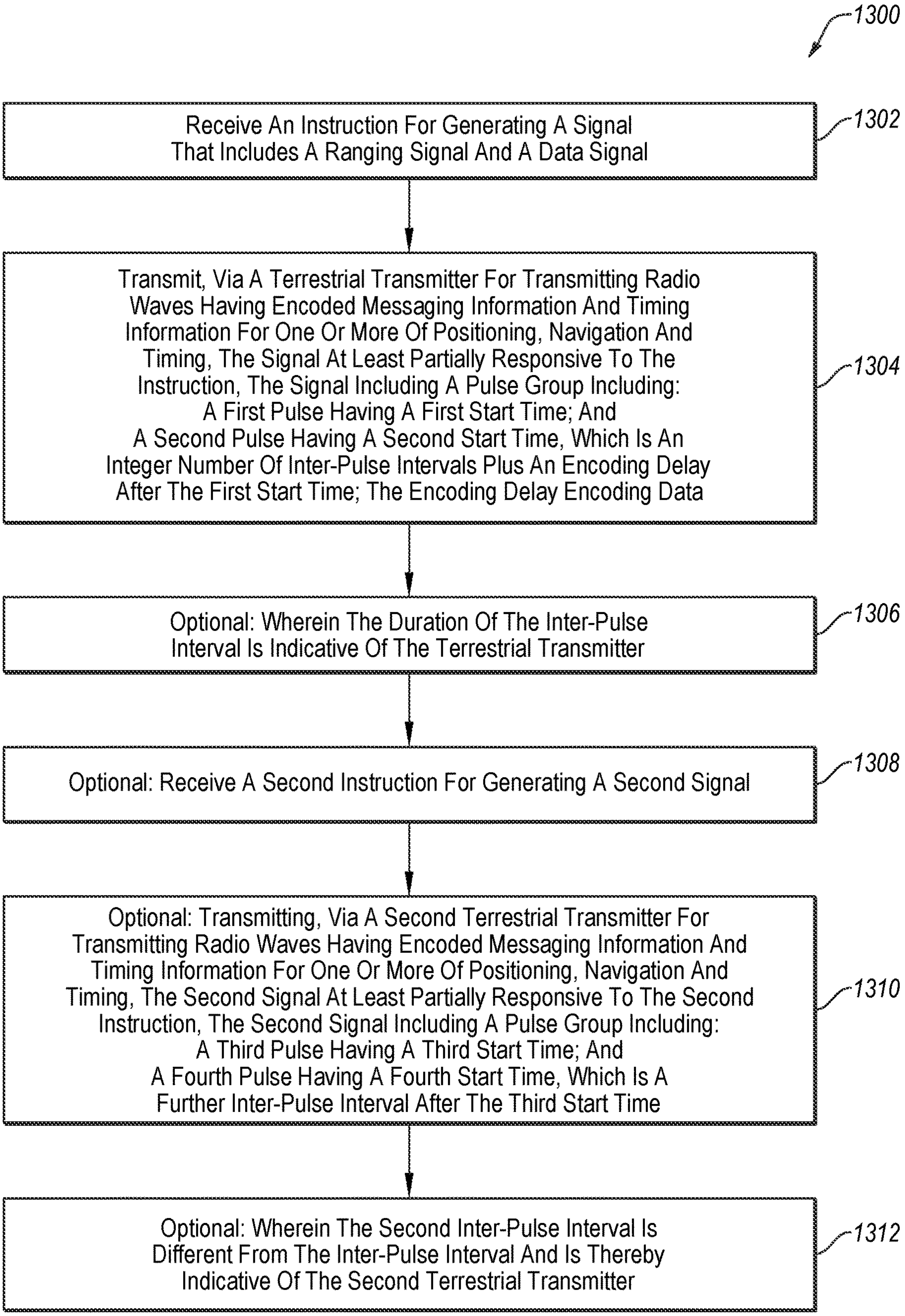
FIG. 13 is a flowchart of an example yet another method in accordance with various examples of the disclosure.

FIG. 13 is a flowchart of an example method 1300, in accordance with various examples of the disclosure. At least a portion of method 1300 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1302 may be the same as block 1102 of FIG. 11. For example, transmitter 1004 may receive instructions from controller 1002. Block 1304 may be the same as block 1104 of FIG. 11.

According to block 1306, which is optional, the duration of the inter-pulse interval is indicative of the terrestrial transmitter.

At block 1308, which is optional, a second instruction for generating a second signal may be received. For example, transmitter 1008 may receive instructions from controller 1006.

At block 1310, which is optional, a second signal may be transmitted. The second signal may be transmitted via a second terrestrial transmitter for transmitting radio waves having encoded messaging information and timing information for one or more of positioning, navigation and timing. The second signal may be at least partially responsive to the second instruction. The second signal may include a pulse group including: a third pulse having a third start time; and a fourth pulse having a fourth start time. The fourth start time may be a further inter-pulse interval after the third start time. For example, transmitter 1008 may transmit the second signal.

According to block 1312, which is optional, the second inter-pulse interval is different from the inter-pulse interval and is thereby indicative of the second terrestrial transmitter.

Figure 14:
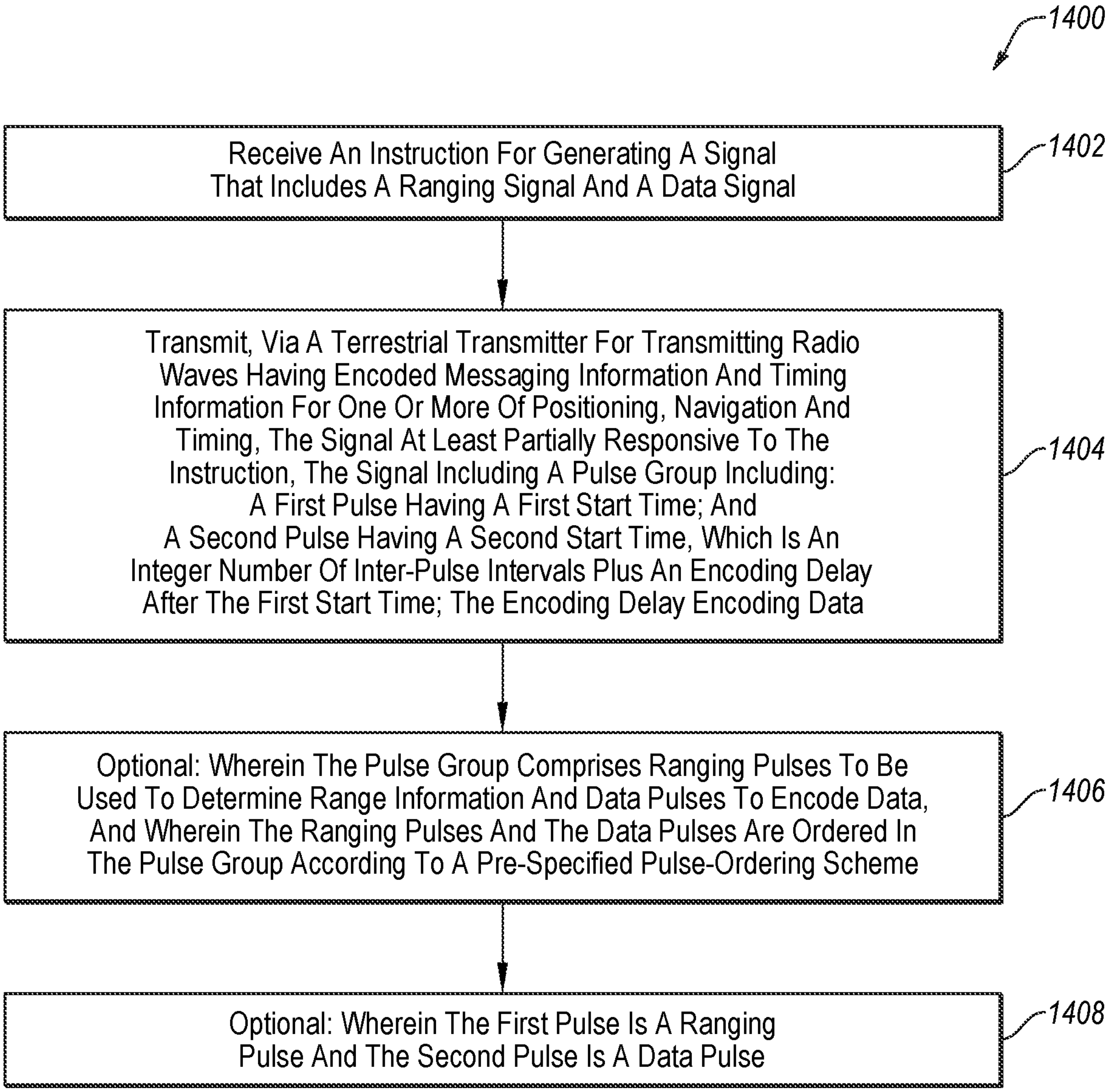
FIG. 14 is a flowchart of an example yet another method in accordance with various examples of the disclosure.

FIG. 14 is a flowchart of an example method 1400, in accordance with various examples of the disclosure. At least a portion of method 1400 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1402 may be the same as block 1102 of FIG. 11. Block 1404 may be the same as block 1104 of FIG. 11.

According to block 1406, which is optional, the pulse group comprises ranging pulses to be used to determine range information and data pulses to encode data, and wherein the ranging pulses and the data pulses are ordered in the pulse group according to a pre-specified pulse-ordering scheme.

According to block 1408, which is optional, the first pulse is a ranging pulse and the second pulse is a data pulse.

Figure 15:
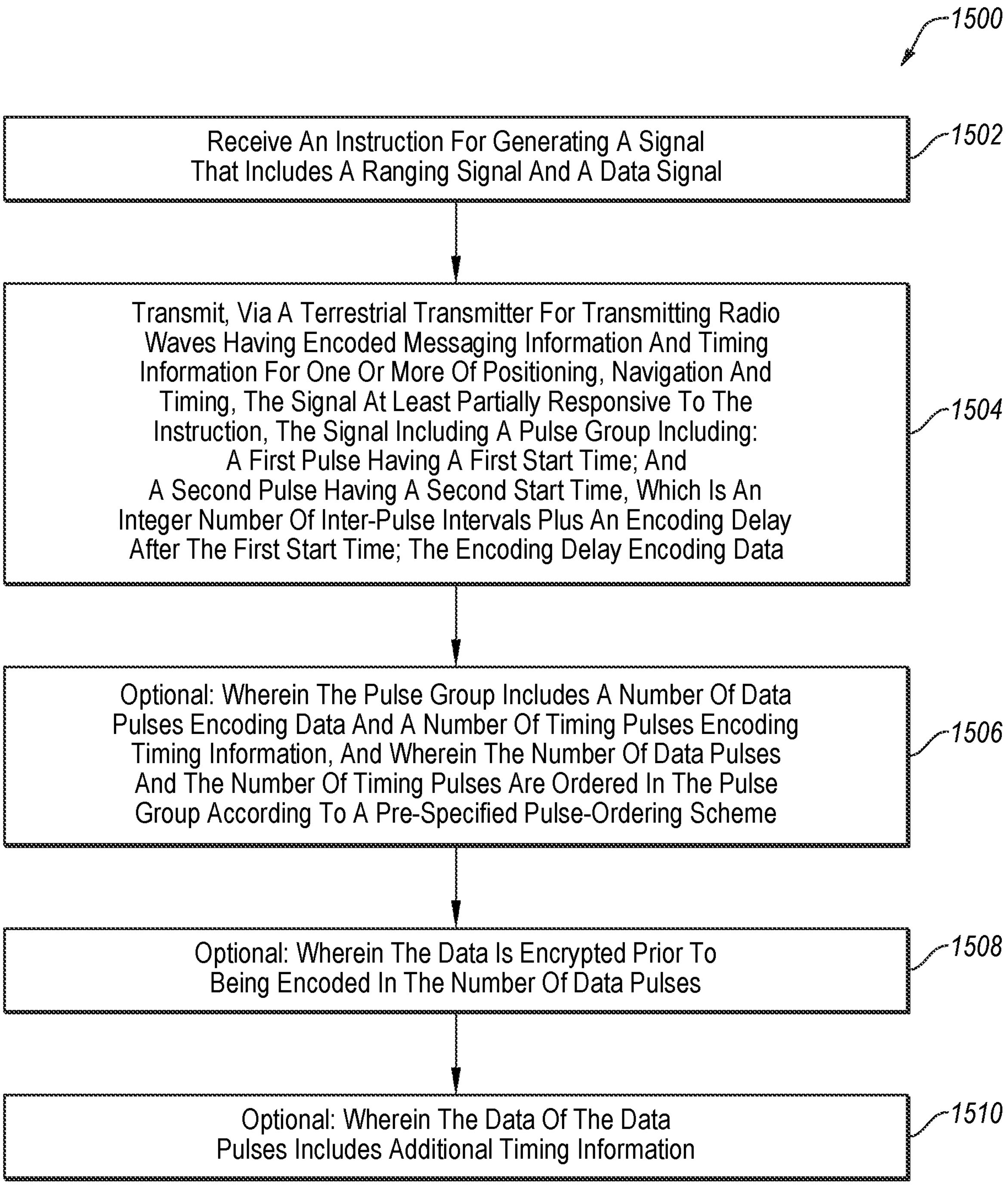
FIG. 15 is a flowchart of an example yet another method in accordance with various examples of the disclosure.

FIG. 15 is a flowchart of an example method 1500, in accordance with various examples of the disclosure. At least a portion of method 1500 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1502 may be the same as block 1102 of FIG. 11. Block 1504 may be the same as block 1104 of FIG. 11.

According to block 1506, which is optional, the pulse group includes a number of data pulses encoding data and a number of timing pulses encoding timing information. Further, the number of data pulses and the number of timing pulses are ordered in the pulse group according to a pre-specified pulse-ordering scheme.

According to block 1508, which is optional, the data is encrypted prior to being encoded in the number of data pulses.

According to block 1510, which is optional, the data of the data pulses include additional timing information.

Figure 16:
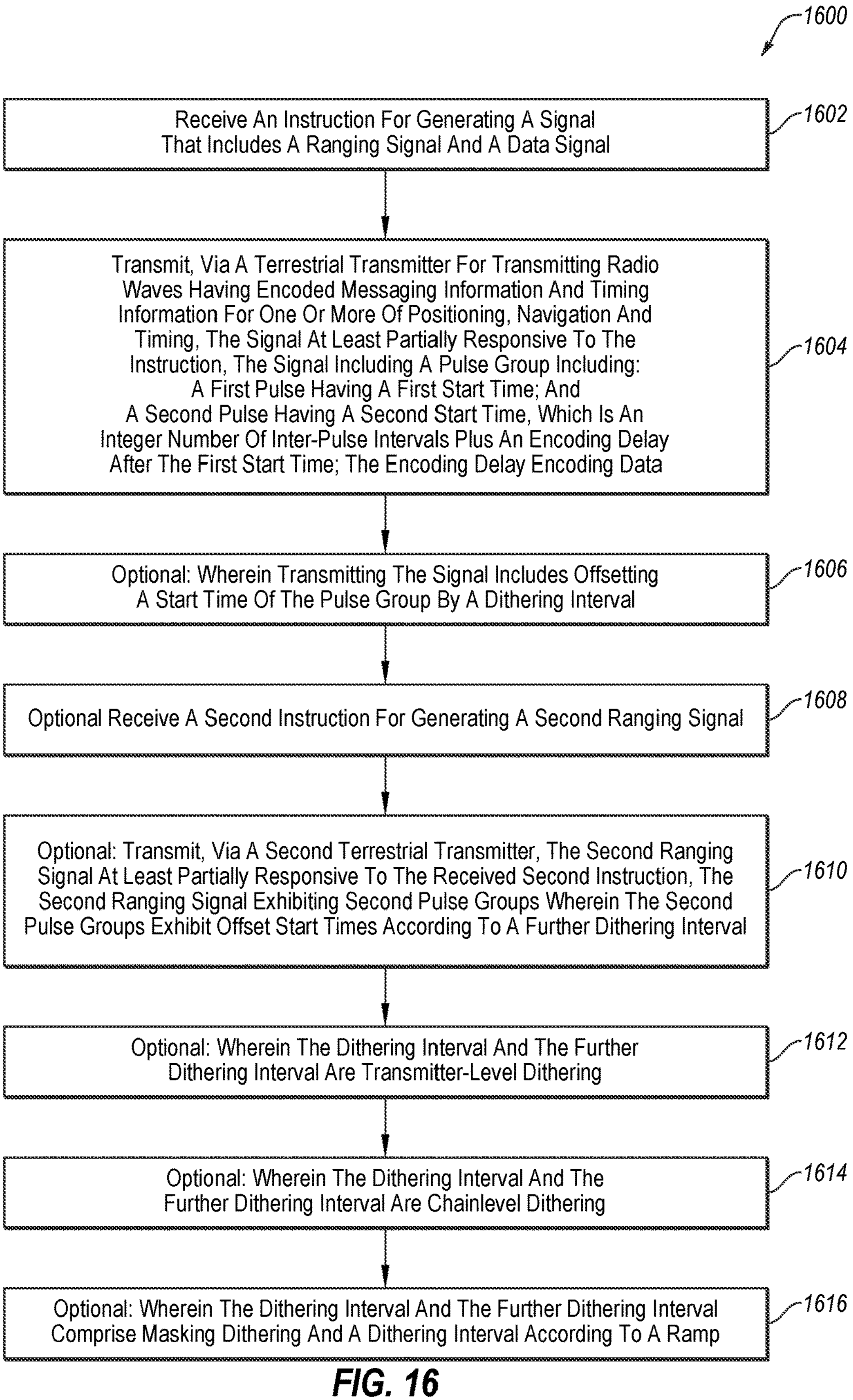
FIG. 16 is a flowchart of an example yet another method in accordance with various examples of the disclosure.

FIG. 16 is a flowchart of an example method 1600, in accordance with various examples of the disclosure. At least a portion of method 1600 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1602 may be the same as block 1102 of FIG. 11. For example, transmitter 1004 may receive instructions from controller 1002. Block 1604 may be the same as block 1104 of FIG. 11.

According to block 1606, which is optional, transmitting the signal includes offsetting a start time of the pulse group by a dithering interval.

At block 1608, which is optional, a second instruction for generating a second ranging signal is received. For example, transmitter 1008 may receive instructions from controller 1006.

At block 1610, which is optional, a second ranging signal may be transmitted. The second ranging signal may be transmitted via a second terrestrial transmitter. The second ranging signal may be at least partially responsive to the received second instruction. The second ranging signal may exhibit second pulse groups wherein the second pulse groups exhibit offset start times according to a further dithering interval. For example, transmitter 1008 may transmit the second ranging signal.

According to block 1612, which is optional, wherein the dithering interval and the further dithering interval are transmitter-level dithering.

According to block 1614, which is optional, the dithering interval and the further dithering interval are chain-level dithering.

According to block 1616, which is optional, the dithering interval and the further dithering interval comprise masking dithering and a dithering interval according to a ramp.

Figure 17:
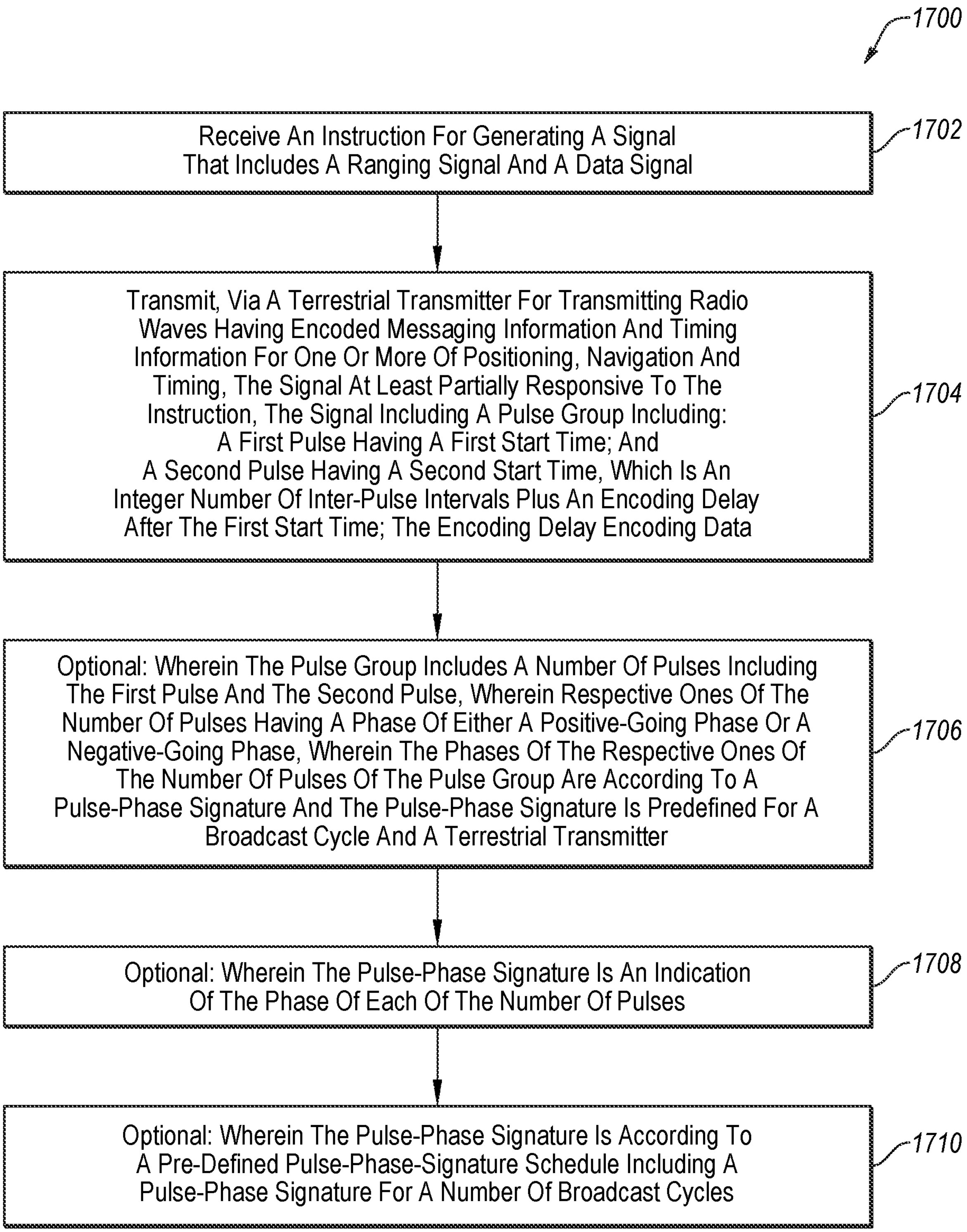
FIG. 17 is a flowchart of an example yet another method in accordance with various examples of the disclosure.

FIG. 17 is a flowchart of an example method 1700, in accordance with various examples of the disclosure. At least a portion of method 1700 may be performed, in some examples, by a device or system, such as system 900 of FIG. 9, controller 902, of FIG. 9, transmitter 904, of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1702 may be the same as block 1102 of FIG. 11. Block 1704 may be the same as block 1104 of FIG. 11.

According to block 1706, which is optional, the pulse group includes a number of pulses including the first pulse and the second pulse. Further, respective ones of the number of pulses have a phase of either a positive-going phase or a negative-going phase. Further, the phases of the respective ones of the number of pulses of the pulse group are according to a pulse-phase signature and the pulse-phase signature is predefined for a broadcast cycle and a terrestrial transmitter.

According to block 1708, which is optional, wherein the pulse-phase signature is an indication of the phase of each of the number of pulses.

According to block 1710, which is optional, the pulse-phase signature is according to a pre-defined pulse-phase-signature schedule including a pulse-phase signature for a number of broadcast cycles.

Modifications, additions, or omissions may be made to any of method 1100, method 1200, method 1300, method 1400, method 1500, method 1600, and method 1700 without departing from the scope of the present disclosure. For example, the operations of any of method 1100, method 1200, method 1300, method 1400, method 1500, method 1600, and method 1700 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 18:
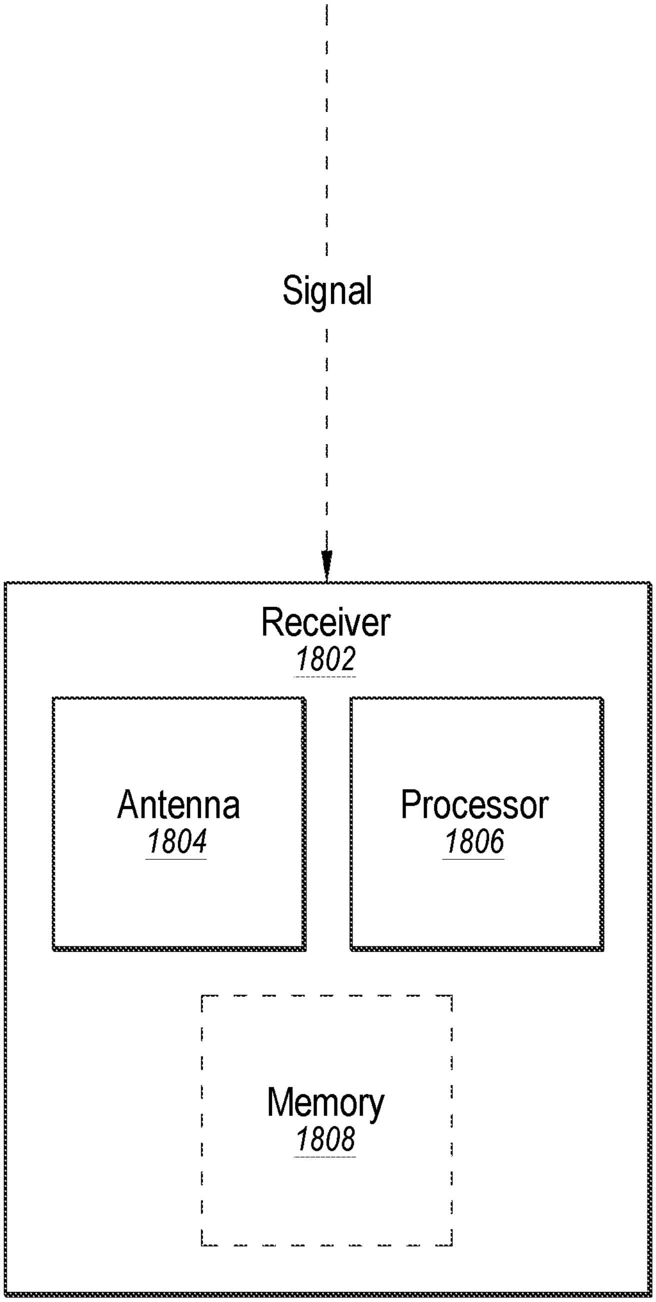
FIG. 18 is a functional block diagram that illustrates a receiver according to one or more examples.

FIG. 18 is a functional block diagram that illustrates a receiver 1802 according to one or more examples. Receiver 1802 includes an antenna 1804 and a processor 1806. Receiver 1802 may include a memory 1808. Memory 1808 is optional in receiver 1802. The optionality of memory 1808 is illustrated by memory 1808 being illustrated using dashed lines. Receiver 1802 may determine PNT information of receiver 1802 based on received signals (e.g., signals transmitted according to any of the examples described herein). Additionally or alternatively, receiver 1802 may decode data encoded in the received signals.

As an example, processor 1806 of receiver 1802 may determine timing information based on one or more pulses of a received signal. For example, receiver 1802 may detect and interpret a zero crossing of a pulse as an indication of a timing event, e.g., for positioning, navigation, and/or timing for a positioning technique (including, as non-limiting examples, multilateration or hyperbolic position estimation calculations). Processor 1806 may determine the position information based on a subset of pulses received, e.g., processor 1806 may determine the timing information based on ranging pulses e.g., as identified according to a pulse-ordering scheme 200 of FIG. 2.

Processor 1806 may decode one or more symbols of one or more pulses. For example, processor 1806 may decode encoding delays of pulses e.g., according to FIG. 1D, FIG. 1E, FIG. 1F, and FIG. 1G, and Table 1.

As a non-limiting example, antenna 1804 may receive a signal comprising a ranging signal and a data signal. The signal may encode timing information for one or more of positioning, navigation, and timing. The signal may include a first pulse having a first start time; and a second pulse having a second start time, which is an integer number of inter-pulse intervals plus an encoding delay after the first start time. The encoding delay may encode data. Processor 1806 may obtain the data responsive to the encoding delay.

Processor 1806 may identify and/or validate a transmitter of the received signal based on the received signal. For example, processor 1806 may measure one or more inter-pulse intervals (e.g., nominal inter-pulse intervals) (e.g., inter-pulse interval 128 of FIG. 1B) of the signal and compare the measured one or more inter-pulse intervals to a list relating values of inter-pulse intervals to transmitter identifiers, which list may be stored in memory 1808 at receiver 1802 and/or securely accessible to receiver 1802, e.g., retrieved by receiver 1802 over a secure link. Processor 1806 may identify or verify a transmitter that transmitted the signal based on a match between a value of the inter-pulse interval of the signal and a value of an inter-pulse interval in the list.

As a non-limiting example, antenna 1804 may receive a ranging signal encoding timing information for one or more of positioning, navigation, and timing. The ranging signal may include a first pulse of a pulse group, a second pulse of the pulse group, and an inter-pulse interval between a start of the first pulse and a start of the second pulse. Processor 1806 may identify a transmitter of the ranging signal at least partially responsive to the inter-pulse interval. Memory 1808 may store a correlation between the inter-pulse interval and the transmitter. Processor 1806 may identify the transmitter responsive to the correlation.

Additionally or alternatively, receiver 1802 may possess (e.g., stored at memory 1808 of receiver 1802, without limitation) a pulse-ordering-scheme definition e.g., according to pulse-ordering scheme 200 of FIG. 2. Additionally or alternatively, the pulse-ordering-scheme definition may be securely accessible to receiver 1802, e.g., retrieved by receiver 1802 over a secure link. Using the pulse-ordering-scheme, receiver 1802 may determine which pulses of a pulse group are ranging pulses, which are time-message pulses, and which are data-message pulses according to the pulse-ordering scheme.

Receiver 1802 may possess an encryption key (e.g., stored in memory 1808, without limitation) and may utilize the encryption key to decrypt data that was encrypted in data pulses and/or timing pulses. Decrypting timing information in timing pulses may give receiver 1802 access to additional timing information that receiver 1802 may use to increase accuracy of determined position information. Additionally or alternatively, the encryption key may be securely accessible to receiver 1802, e.g., retrieved by receiver 1802 over a secure link.

As a non-limiting example, antenna 1804 may receive a ranging signal encoding messaging information and timing information for one or more of positioning, navigation, and timing. The ranging signal may include a pulse group comprising a number of pulses, wherein first pulses of the number of pulses encode a first type of data and second pulses of the number of pulses encode a second type of data. Processor 1806 may identify the first pulses and the second pulses at least partially responsive to an order of the first pulses and the second pulses in the pulse group and a pre-specified pulse-ordering scheme. Memory 1808 may store the pre-specified pulse-ordering scheme.

Receiver 1802 may possess a dithering schedule (e.g., stored in memory 1808, without limitation). Additionally or alternatively, the dithering schedule may be securely accessible to receiver 1802, e.g., retrieved by receiver 1802 over a secure link. Using the dithering schedule, receiver 1802 may correct for the effects of dithering on the received signals. By correcting for the effects of dithering, receiver 1802 may increase accuracy of calculated positioning, navigation, or timing information. Receiver 1802 may correct for the effects of chain-level dithering, transmitter-level dithering, and/or masking dithering, e.g., chain-level dithering, transmitter-level dithering, and/or masking dithering as described with regard to FIGS. 3-7.

As a non-limiting example, antenna 1804 may receive a ranging signal encoding timing information for one or more of positioning, navigation, and timing. The ranging signal may include a pulse group, the pulse group delayed from a nominal-pulse-group-start time by a dithering interval. Processor 1806 may calculate a time of transmission of the pulse group. Processor 1806 may adjust the calculated time of transmission to account for the dithering interval. Memory 1808 may store a dithering schedule and processor 1806 may determine the dithering interval at least partially responsive to the dithering schedule.

As an example, receiver 1802 may identify or verify a transmitter of a signal based, at least in part, on a pulse-phase signature of a pulse group. For example, receiver 1802 may determine a phase of one or more pulses of a pulse group. Receiver 1802 may compare the determined phases of the pulses to a pulse-phase-signature schedule, which pulse-phase-signature schedule may be stored in memory 1808 at receiver 1802 and/or securely accessible to receiver 1802, e.g., retrieved by receiver 1802 over a secure link. Receiver 1802 may identify a transmitter that transmitted the signal based on a match between the measured phases of the pulses and pulse-phase signature in the pulse-phase-signature schedule. In such examples, the signal may have been transmitted according to the description above with regard to 8A-8C.

As a non-limiting example, antenna 1804 may receive a ranging signal encoding timing information for one or more of positioning, navigation, and timing. The ranging signal may include a pulse group including a number of pulses, each of the number of pulses exhibiting either a positive-going phase or a negative-going phase. Processor 1806 may validate a transmitter of the ranging signal by comparing phases of the number of pulses with a pulse-phase signature of the transmitter. Memory 1808 may store the pulse-phase signature.

Figure 19:
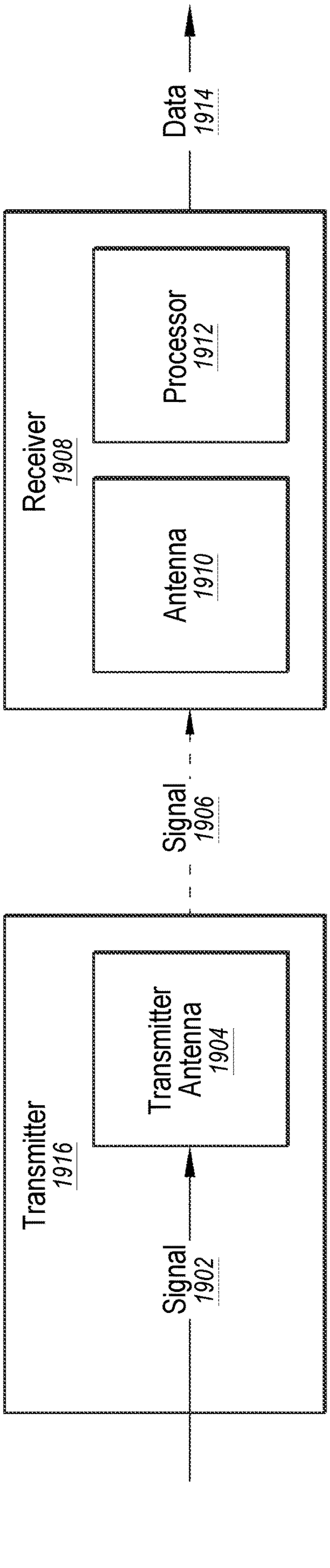
FIG. 19 is a functional block diagram illustrating a system including a transmitter and a receiver according to one or more examples.

FIG. 19 is a functional block diagram illustrating a system including a transmitter 1916 and a receiver 1908 according to one or more examples. Transmitter 1916 may be an example of any of transmitter 904 of FIG. 9, transmitter 1004 of FIG. 10, and transmitter 1008 of FIG. 10. Receiver 1908 may be an example of receiver 1802 of FIG. 18.

As a non-limiting example, a signal 1902 may be a ranging signal to be transmitted at a transmitter antenna 1904 of a transmitter 1916. A signal 1906 may be the ranging signal, having been transmitted as a radio-frequency transmission, at transmitter antenna 1904. Signal 1906 may be received at an antenna 1910 of a receiver 1908. Receiver 1908, using a processor 1912, may generate data 1914 based on signal 1906. Data 1914 may include position, navigation, and/or timing information. Data 1914 may further include a message.

Figure 20:
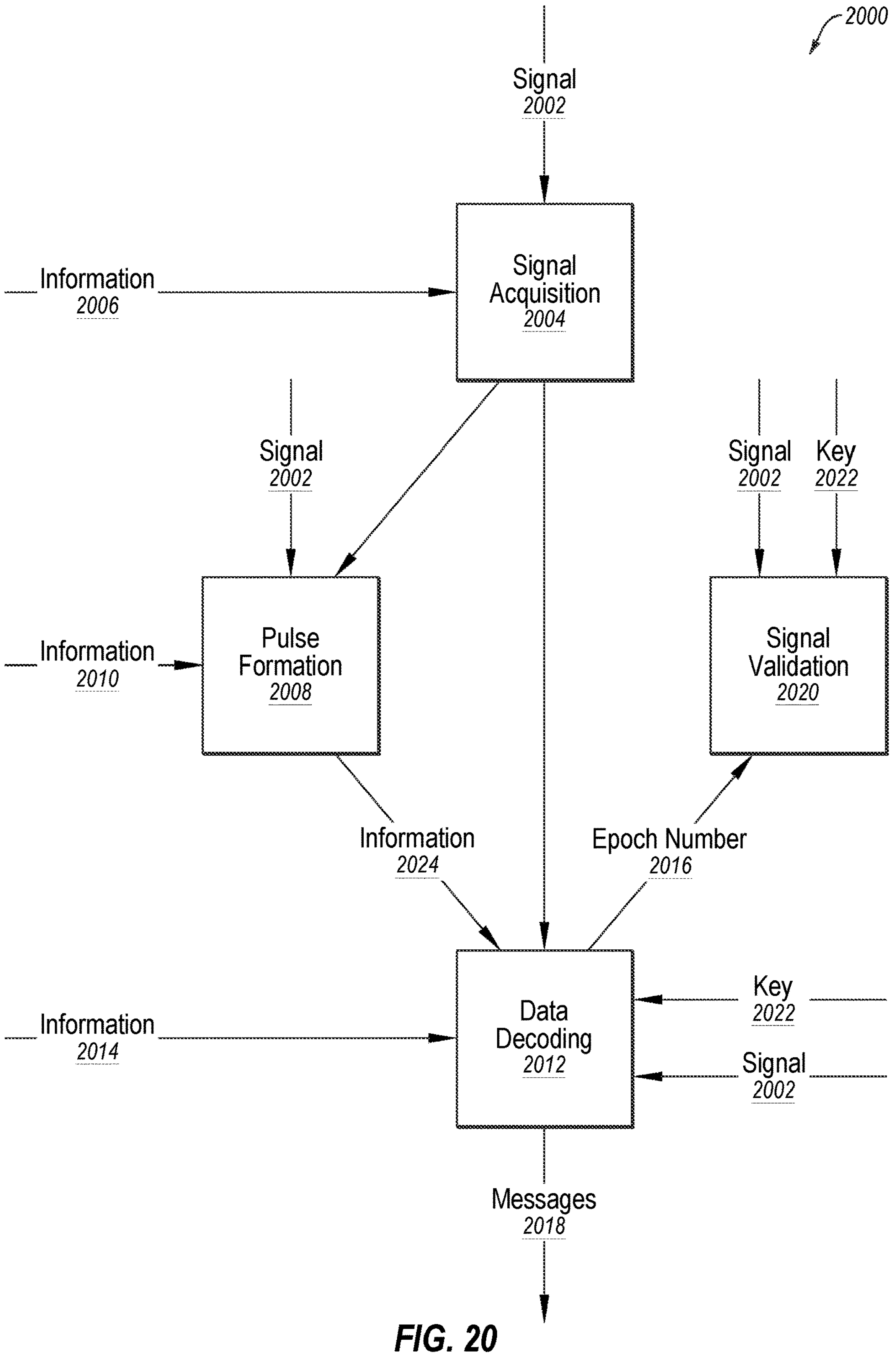
FIG. 20 is a functional block diagram illustrating one or more operations that may occur at a receiver according to one or more examples.

FIG. 20 is a functional block diagram illustrating one or more operations 2000 that may occur at a receiver according to one or more examples. Operations 2000 may occur at and/or be performed by receiver 1802 of FIG. 18, and/or receiver 1908 of FIG. 19. Operations 2000 may be part of an acquisition phase of operations of a receiver.

Signal 2002 may be a received signal including one or more blocks of data at one or more respective times. As a non-limiting example, signal 2002 may be a ranging signal including one or more pulses or pulse groups of one or more epochs. Signal 2002 may be an example of signal 1906 of FIG. 19 as received at receiver 1908 of FIG. 19.

At signal acquisition 2004, signal 2002 may be acquired using a matched filter. As a non-limiting example, received signals at one or more frequencies may be compared to predetermined patterns of one or more matched filters to acquire digital samples representative of signal 2002. At signal acquisition 2004 a start time of an epoch may be determined. Further, because a duration of an epoch may be known, at signal acquisition 2004, a nominal start time of following epochs may also be determined. The epoch start time may be provided to pulse formation 2008 and/or data decoding 2012 either directly from signal acquisition 2004 or the epoch start time may be included in information 2010 and/or information 2014.

Information 2006, provided to signal acquisition 2004, may be, or may include, information used to acquire the signal at signal acquisition 2004. Information 2006 may include one or more signal replicas, e.g., replicas of a portion of signal 2002 less unknown data (e.g., a message encoded by the signal and/or noise). The signal replicas may include replicas of one or more pulses and/or one or more pulse groups. In some examples, the signal replicas may include an epoch's worth of pulses. The signal replicas may be pre-calculated for the receiver to use to correlate with signal 2002 in order to acquire signal 2002. The signal replicas may be based at least in part on an inter-pulse interval, which inter-pulse interval may be unique with regard to a transmitter (e.g., as described with regard to FIG. 1B). The inter-pulse interval may also be unique to the signal being acquired. Additionally or alternatively, the signal replica may be based at least in part on an unencrypted pulse-phase signature (e.g., as described with regard to FIG. 8A, FIG. 8B, and FIG. 8C). The pulse-phase signature may also be unique to the signal being acquired.

At pulse formation 2008, a composite pulse may be formed. The composite pulse may be based on an average of two or more pulses. For example, in some situations, because of noise or other variances, it may be difficult or inaccurate to calculate a time of arrival of a pulse based on a single pulse. Thus, averaging several pulses to form a composite pulse may allow for more accurate calculation of a time of arrival of the composite pulse. With regard to the pulses described with regard to FIG. 1C, averaging may include averaging a leading edge of multiple pulses. The averaging interval may be selected based on platform dynamics (e.g., the motion of a platform of the receiver). The two or more pulses to be averaged may be selected to be pulses that are not subject to an encoding delay. For example, according to a pulse-ordering scheme (e.g., pulse-ordering scheme 200 of FIG. 2), ranging pulses, that are not delayed by an encoding delay, may be selected to be averaged at pulse formation 2008.

At pulse formation 2008, the one or more pulses formed at pulse formation 2008 may be analyzed. As a non-limiting example, a pulse envelope (e.g., pulse envelope 144 of FIG. 1C) may be identified. Additionally or alternatively, phase tracking points (e.g., points in the pulse at which a phase of the pulse may be determined) may be identified. Additionally or alternatively, at pulse formation 2008, a time of arrival of one of more of the pulses may be determined. Information 2024 may include one or more pieces of information regarding one or more pulses, e.g., including the composite pulses formed at pulse formation 2008. Information 2024 may include, for example, start times of pulses (e.g., start times of ranging pulses) and/or inter-pulse intervals (e.g., nominal inter-pulse intervals). Pulse formation 2008 may provide information 2024 to data decoding 2012.

Information 2010 may be, or may include, information used to form the composite pulses at pulse formation 2008. Information 2010 may include epoch start times. Epoch start times may be, or may include, an index into a data vector. The data vector may relate to time.

At data decoding 2012, an epoch number 2016 and messages 2018 (including e.g., time messages, and/or data messages) may be decoded from the signal 2002. As a non-limiting example, encoding delays (e.g., as described with regard to FIG. 1D, FIG. 1E, FIG. 1F and Table 1) may be identified and/or decoded into data. For example, encoding delays between pulses may be identified, quantified, and/or decoded by comparing the quantified encoding delays to a table (e.g., Table 1) relating symbols or bits of data to durations of encoding delays.

Additionally or alternatively, according to a nominal inter-pulse interval, unique inter-pulse intervals (e.g., as described with regard to FIG. 1B), and/or a nominal group repetition interval, pulse groups and/or individual pulses may be identified within the acquired signal. As a non-limiting example, start and/or end times (e.g., as illustrated by FIG. 1C) of individual pulses may be identified. Based on the start and/or end times, the acquired signal may be parsed into pulses.

According to a pulse-ordering scheme (e.g., pulse-ordering scheme 200 of FIG. 2), ranging pulses, data pulses, and/or timing pulses may be identified from among the received pulses. According to a pulse-phase signature (e.g., as described with regard to FIG. 8A, FIG. 8B, and FIG. 8C) phases of each pulse may be corrected (e.g., phase codes may be wiped from the pulses).

The determined symbols or bits of data decoded at data decoding 2012 may be input into an error-correction algorithm, e.g., a Reed Solomon Forward Error Correction (FEC) algorithm, without limitation. If a number of errors is such that the error-correction algorithm is able correct the errors, the error-correction algorithm may return the correct message as messages 2018. If the error-correction algorithm rejects the time message during the acquisition phase, the receiver may not have successfully acquired the signal (e.g., at signal acquisition 2004). If the receiver did not successfully acquire the signal, subsequent data blocks of the signal may be acquired and the process may begin again.

One or more time-message pulses may be decoded into symbols and time-message bits. If the error-correction algorithm determines that the message does not have errors, or the error-correction algorithm determines has corrected the errors, the time-message bits may be parsed into an epoch number 2016 to be forwarded to signal validation 2020 and/or other associated time data.

At data decoding 2012, the epoch number 2016 may be combined with a cryptographic key 2022 (alternatively referred to herein as "key 2022") to decrypt the data message. The data message may be parsed into information, such as but not limited to, differential corrections and/or a data message.

Information 2014 may include information used at data decoding 2012 to decode data from the acquired signal. Information 2014 may include a cryptographic key (e.g., used to decode the data message at data decoding 2012). Additionally or alternatively, information 2014 may include the pulse-ordering scheme. Additionally or alternatively, information 2014 may include the epoch start time.

At signal validation 2020, signal 2002 may be validated, e.g., based on a correspondence between phases of pulses of signal 2002 and a pulse-phase signature. In some examples, signal validation 2020 may provide phase codes and/or epoch start time to pulse formation 2008.

As a non-limiting example, epoch number 2016 and key 2022 may be inputs to signal validation 2020. At signal validation 2020, an index of a look-up table of pulse-phase signatures may be determined (e.g., based at least in part on epoch number 2016). As a non-limiting example, epoch number 2016 and key 2022 may be used as input to a cryptographic algorithm (not shown) that returns an index of a look-up table of pulse-phase signatures. The look-up table may return a pulse-phase signature (responsive to epoch number 2016 and key 2022). If the phases of signal 2002 match the pulse-phase signature, signal 2002 may be validated.

In some examples, epoch number 2016, having been obtained (at data decoding 2012) by decoding a time message during an epoch when the unencrypted pulse-phase signature was transmitted, may be incremented, and used to return the pulse-phase signature of the next epoch of signal 2002. If this sequence was encrypted, the encrypted pulse-phase signature is correlated with the received signal 2002. If the correlation is sufficiently positive (e.g., meets or exceeds a predetermined threshold, without limitation), signal 2002 is authenticated, the receiver has successfully acquired, and transitions to the tracking phase.

Figure 21:
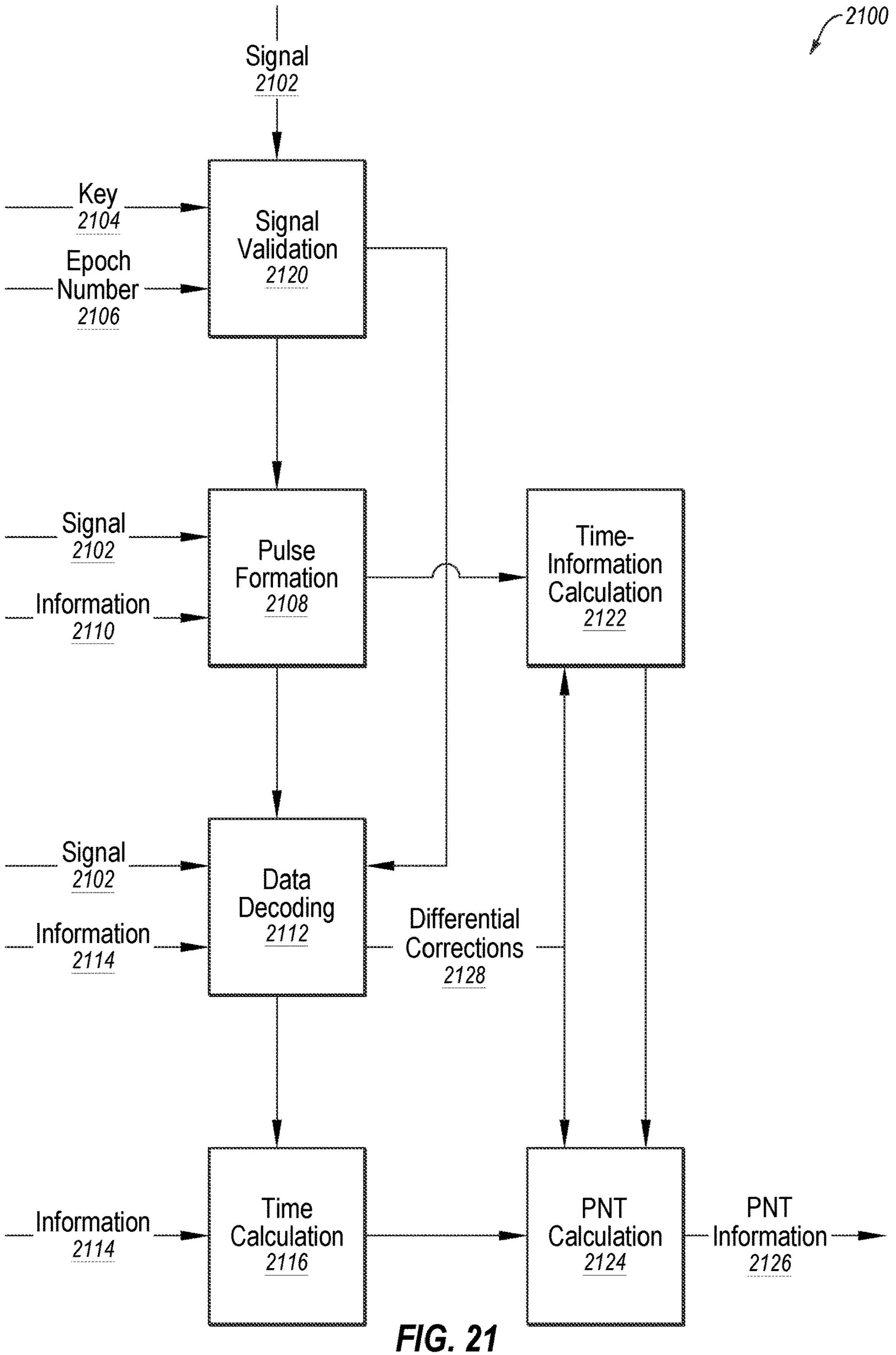
FIG. 21 is a functional block diagram illustrating one or more operations that may occur at a receiver according to one or more examples.

FIG. 21 is a functional block diagram illustrating one or more operations 2100 that may occur at a receiver according to one or more examples. Operations 2100 may occur at and/or be performed by receiver 1802 of FIG. 18, and/or receiver 1908 of FIG. 19. Operations 2100 may be part of a tracking phase of operation of a receiver. Operation 2100 may follow successful completion of one or more of operations 2000.

Signal 2102 may be the same as, or substantially similar to, signal 2002 of FIG. 20. Signal validation 2120 may be the same as, or substantially similar to, signal validation 2020 of FIG. 20, key 2104 may be the same as, or substantially similar to key 2022 of FIG. 20 and epoch number 2106 may be the same as, or substantially similar to epoch number 2016 of FIG. 20.

In addition to the operations described with regard to signal validation 2020, signal validation 2120 may provide phase codes to pulse formation 2108, and/or data decoding 2112. As a non-limiting example, at signal validation 2120, signal validation 2120 may validate signal 2102 at least partially responsive to a match between phases of signal 2102 and a pulse-phase signature of a table of valid pulse-phase signatures. Additionally or alternatively, the pulse-phase signature may be used at data decoding 2112 to wipe off the phase code prior to the demodulation process. Additionally or alternatively, pulse-phase signature may also be used at pulse formation 2108 to wipe off the phase code prior to generating the composite or average pulse.

Pulse formation 2108 may be the same as, or substantially similar to, pulse formation 2008 of FIG. 20. Information 2110 may be the same as, or substantially similar to, information 2010 of FIG. 20. Data decoding 2112 may be the same as, or substantially similar to, data decoding 2012 of FIG. 20. Information 2114 may be the same as, or substantially similar to, information 2014 of FIG. 20. Epoch number 2106, key 2104, and/or an epoch start time may be included in information 2114. In addition to the operations described with regard to data decoding 2012, data decoding 2112 may generate differential corrections 2128. Differential corrections 2128 may be based, at least in part, on a decoded data message.

At time calculation 2116 a nominal time of transmission (TOT) of an epoch (e.g., a current epoch) of signal 2102 may be calculated. The nominal TOT may be the epoch number multiplied by the epoch duration plus the nominal emission delay for the particular station.

Additionally or alternatively, at time calculation 2116, dither may be corrected. As a non-limiting example, at time calculation 2116, dither may be accounted for and/or corrected when determining a TOT of signal 2102 for the relevant epoch. At time calculation 2116, one or more dithering offsets may be determined e.g., by indexing into a dithering schedule using epoch number 2106 (e.g., as described with regard to FIGS. 3-7). The dithering offsets may be added to, or subtracted from, the TOT to obtain a TOT not distorted by dithering.

At time-information calculation 2122, timing information may be calculated. As a non-limiting example, an offset between a local clock and coordinated universal time (UTC) may be determined. The timing information may be calculated based on signal 2102, (e.g., as analyzed at pulse formation 2108). As a non-limiting example, at time-information calculation 2122, timing information may be calculated at least partially responsive to a time of arrival of one or more of pulses of signal 2102 e.g., as identified at pulse formation 2108. In some cases, the time of arrival of one or more pulses may be refined or updated responsive to a determined offset between the local clock and UTC. Additionally or alternatively, the timing information may be calculated at time-information calculation 2122 based at least in part on differential corrections 2128, which differential corrections 2128 may have been determined at data decoding 2112. As a non-limiting example, at data decoding 2112, timing information may be decoded from time-message pulses. The timing information may include differential corrections. At time-information calculation 2122, the differential corrections may be applied. Additionally or alternatively, the time of transmission, e.g., after the effects of dithering have been corrected (which corrections may have occurred at time calculation 2116) may be used to calculate the timing information at time-information calculation 2122.

At PNT calculation 2124, PNT information 2126 may be calculated. PNT information 2126 may include a position of the receiver e.g., relative to one or more transmitters. PNT information 2126 may include a latitude and longitude of the receiver. PNT information 2126 may be calculated, at PNT calculation 2124, based at least in part on differences between times of transmissions of signals (including e.g., signal 2102) from two or more transmitters (which times of transmissions may have been calculated at time calculation 2116) and times of arrivals of the signals (which times of arrivals may have been calculated at pulse formation 2108 and/or which times of arrival may have been adjusted or refined at time-information calculation 2122). The PNT information 2126 may be calculated, at PNT calculation 2124, using a positioning technique (including, as non-limiting examples, multilateration position estimation, or hyperbolic position estimation calculations).

Additionally or alternatively, at PNT calculation 2124, the receiver may be used for monitoring, survey, or timing purposes. For example, the receiver may compare the received time of arrival to a predicted received time according to a standard model. The difference between the received time and the predicted received time can be used for signal monitoring, surveying, and/or for calculating differential correction information.

Figure 22:
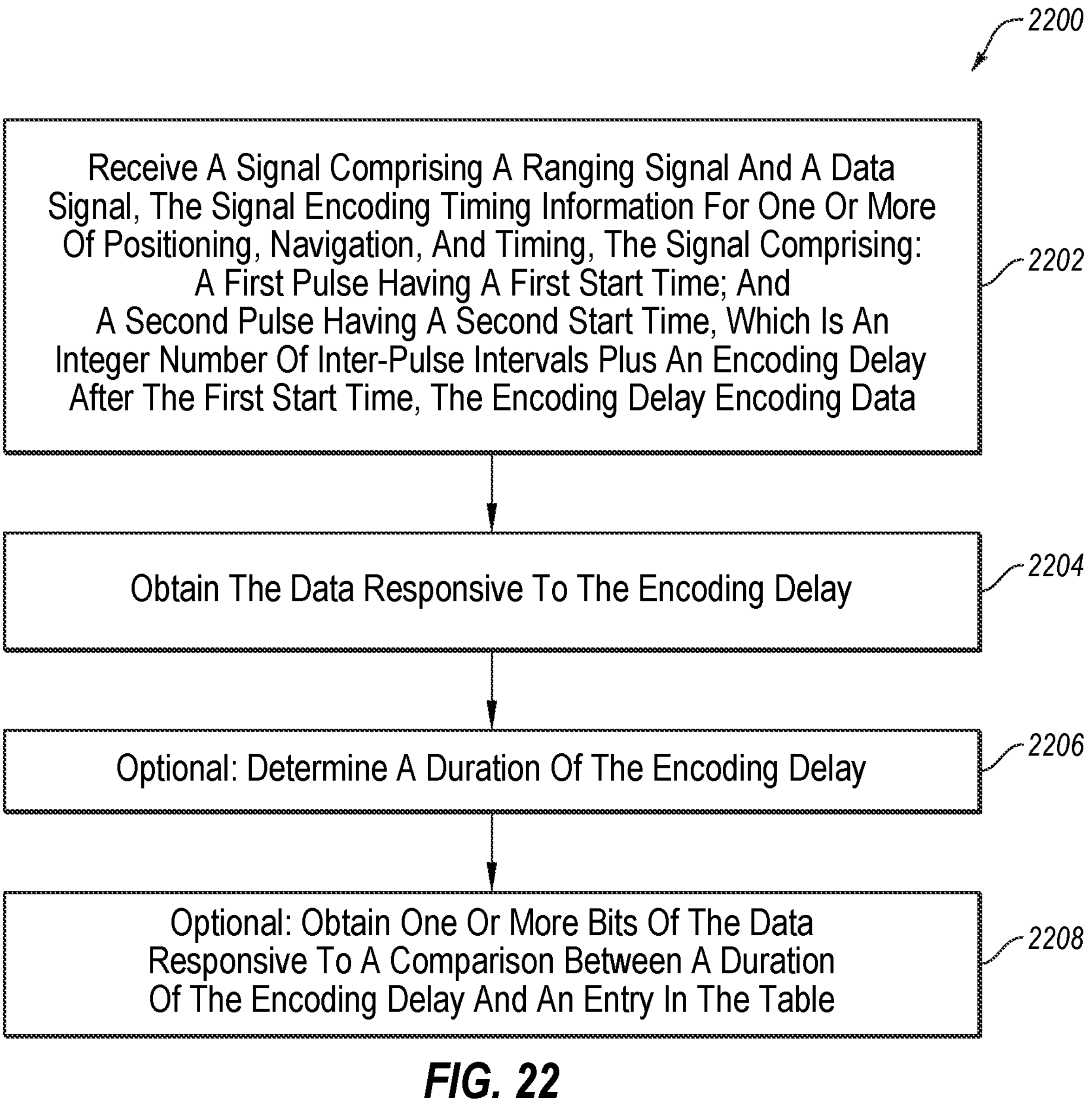
FIG. 22 is a flowchart illustrating a method for receiving radio waves and for decoding data encoded by the radio waves according to one or more examples.

FIG. 22 is a flowchart illustrating a method 2200 for receiving radio waves and for decoding data encoded by the radio waves according to one or more examples. In particular, method 2200 may be for receiving radio waves broadcast by a terrestrial transmitter, the radio waves encoding messaging information and timing information for one or more of positioning, navigation, and timing and for decoding data encoded in a signal of the radio waves. Method 2200 may be performed by a receiver, such as, for example, receiver 1802 of FIG. 18 or receiver 1908 of FIG. 19.

At operation 2202, a signal comprising a ranging signal and a data signal may be received. The signal may encode timing information for one or more of positioning, navigation, and timing. The signal may include a first pulse having a first start time and a second pulse having a second start time, which is an integer number of inter-pulse intervals plus an encoding delay after the first start time. The encoding delay may encode data. The signal transmitted at block 1104 of FIG. 11 may be an example of the signal received at operation 2202.

At operation 2204, the data (e.g., the data encoded by the encoding delay) may be obtained responsive to the encoding delay. For example, a duration of the encoding delay may be compared to an entry in a table (e.g., Table 1) that correlates encoding delays with bits of data.

At operation 2206, which is optional, a duration of the encoding delay may be determined.

At operation 2208, which is optional, one or more bits of the data may be obtained responsive to a comparison between a duration of the encoding delay and an entry in the table.

Figure 23:
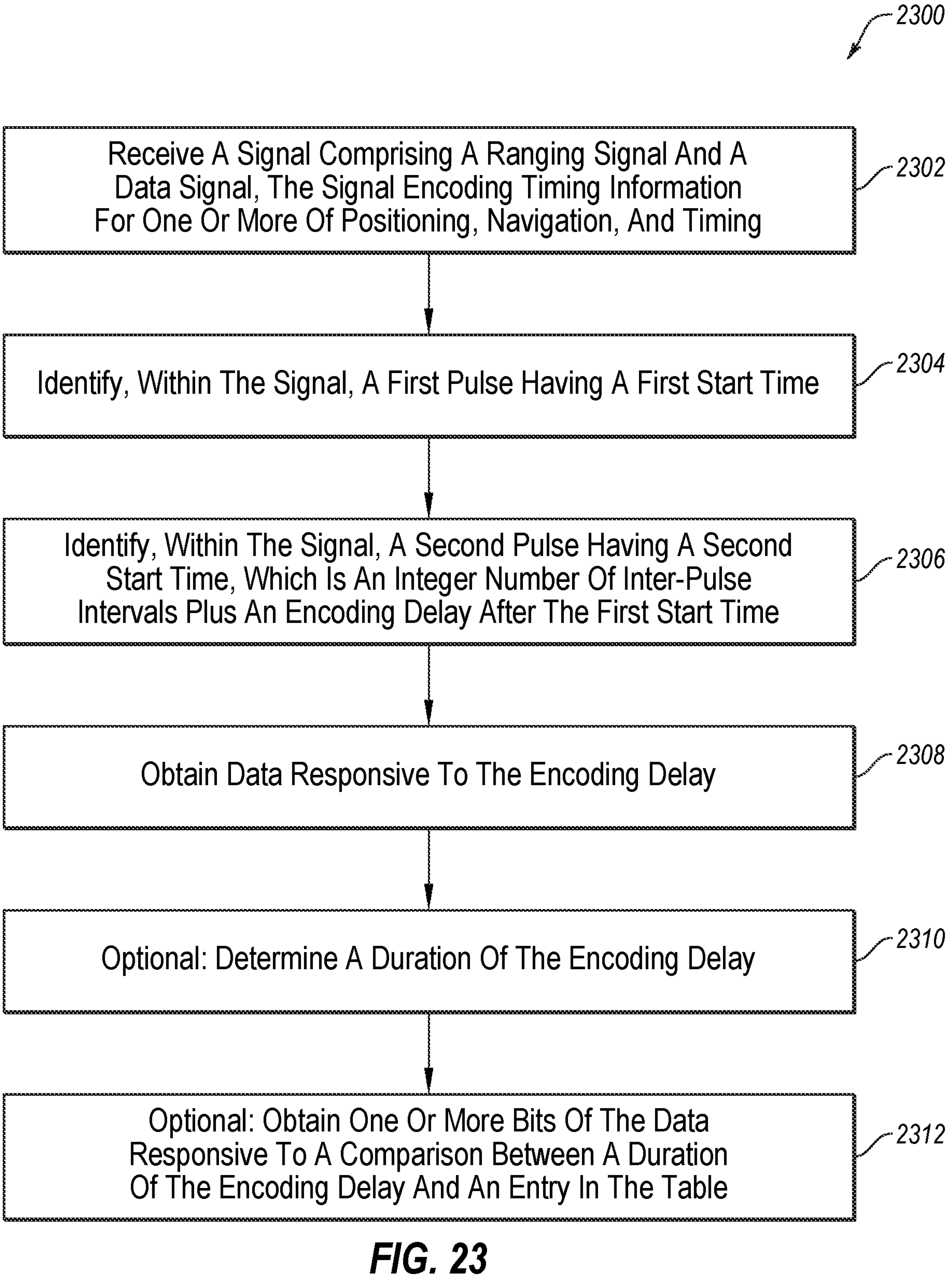
FIG. 23 is a flowchart illustrating a method for receiving radio waves and for decoding data encoded by the radio waves according to one or more examples.

FIG. 23 is a flowchart illustrating a method 2300 for receiving radio waves and for decoding data encoded by the radio waves according to one or more examples. In particular, method 2300 may be for receiving radio waves broadcast by a terrestrial transmitter, the radio waves encoding messaging information and timing information for one or more of positioning, navigation, and timing and for decoding data encoded in a signal of the radio waves. Method 2400 may be performed by a receiver, such as, for example, receiver 1802 of FIG. 18 or receiver 1908 of FIG. 19.

At operation 2302, a signal comprising a ranging signal and a data signal may be obtained. The signal may encode timing information for one or more of positioning, navigation, and timing. The signal transmitted at block 1104 of FIG. 11 may be an example of the signal received at operation 2302.

At operation 2304, within the signal, a first pulse having a first start time may be identified.

At operation 2306, within the signal, a second pulse may be identified. The second pulse may have a second start time, which is an integer number of inter-pulse intervals plus an encoding delay after the first start time.

At operation 2308, data may be obtained responsive to the encoding delay.

At operation 2310, which is optional, a duration of the encoding delay may be determined.

At operation 2312, which is optional, one or more bits of the data may be obtained responsive to a comparison between a duration of the encoding delay and an entry in the table.

Figure 24:
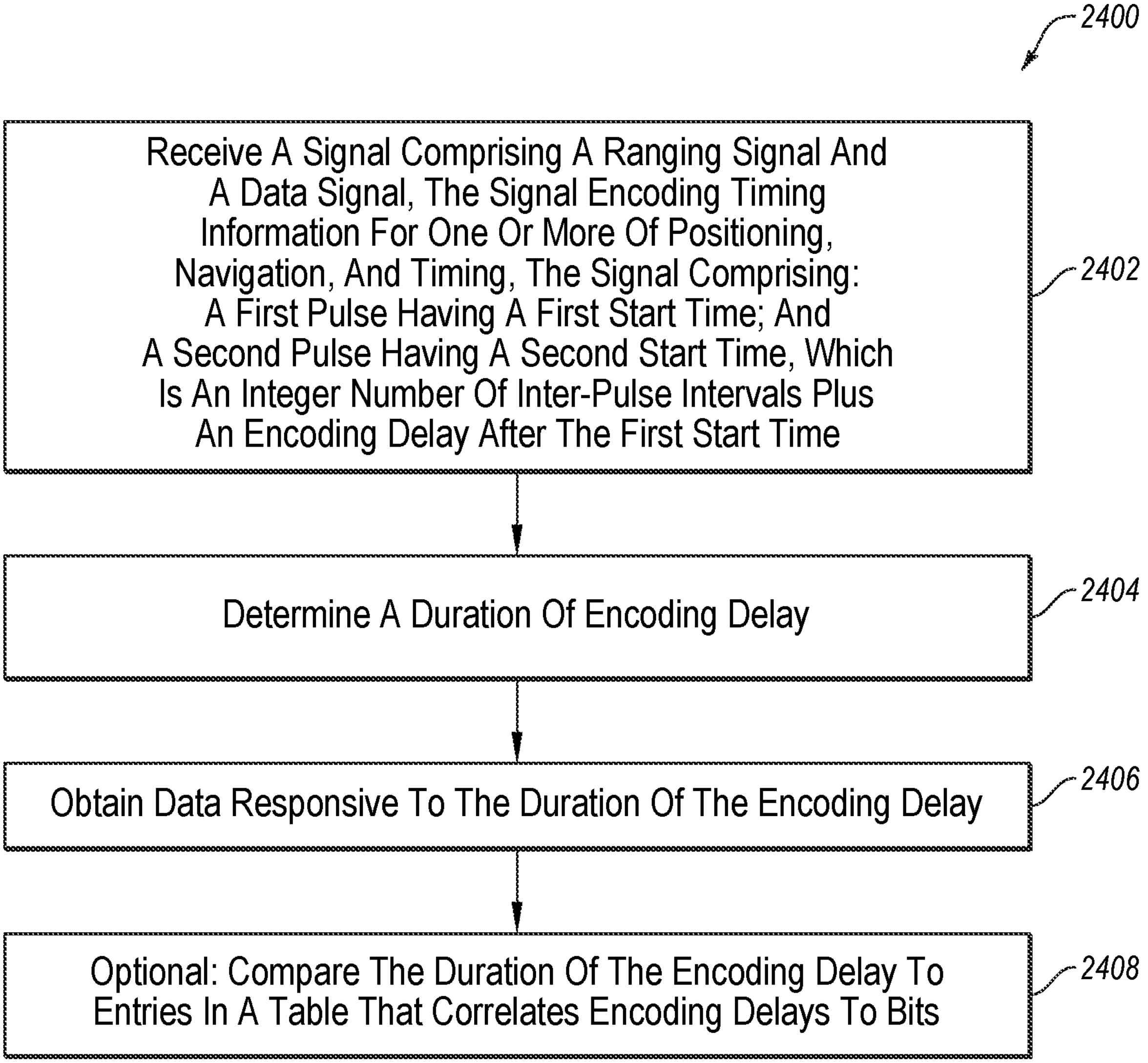
FIG. 24 is a flowchart illustrating a method for receiving radio waves and for decoding data encoded by the radio waves according to one or more examples.

FIG. 24 is a flowchart illustrating a method 2400 for receiving radio waves and for decoding data encoded by the radio waves according to one or more examples. In particular, method 2400 may be for receiving radio waves broadcast by a terrestrial transmitter, the radio waves encoding messaging information and timing information for one or more of positioning, navigation, and timing and for decoding data encoded in a signal of the radio waves. Method 2400 may be performed by a receiver, such as, for example, receiver 1802 of FIG. 18 or receiver 1908 of FIG. 19.

At operation 2402, a signal may be received. The signal may include a ranging signal and a data signal. The signal may encode timing information for one or more of positioning, navigation, and timing. The signal may include a first pulse having a first start time and a second pulse having a second start time. The second start time may be an integer number of inter-pulse intervals plus an encoding delay after the first start time. The signal transmitted at block 1104 of FIG. 11 may be an example of the signal received at operation 2402.

At operation 2404, a duration of encoding delay may be determined.

At operation 2406, which is optional, data may be obtained responsive to the duration of the encoding delay.

At operation 2408, which is optional, the duration of the encoding delay may be compared to entries in a table that correlates encoding delays to bits.

Modifications, additions, or omissions may be made to any of method 2200 of FIG. 22, method 2300 of FIG. 23, and/or method 2400 of FIG. 24 without departing from the scope of the present disclosure. For example, the operations of any of method 2200 of FIG. 22, method 2300 of FIG. 23, and/or method 2400 of FIG. 24 may be implemented in differing order. Furthermore, the outlined operations and actions are only provided as examples, and some of the operations and actions may be optional, combined into fewer operations and actions, or expanded into additional operations and actions without detracting from the essence of the disclosed example.

As used in the present disclosure, the terms "module" or "component" may refer to specific hardware implementations configured to perform the actions of the module or component or software objects or software routines that may be stored on or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means some or a totality. As used herein, "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: A method, comprising: receiving an instruction for generating a signal that comprises a ranging signal and a data signal; and transmitting, via a terrestrial transmitter for transmitting radio waves having encoded messaging information and timing information for one or more of positioning, navigation and timing, the signal at least partially responsive to the instruction, the signal comprising a pulse group comprising: a first pulse having a first start time; and a second pulse having a second start time, which is an integer number of inter-pulse intervals plus an encoding delay after the first start time; the encoding delay encoding data.

Example 2: The method according to Example 1, wherein the integer number is a first integer number and wherein the pulse group comprises a third pulse having a third start time, which is a second integer number of inter-pulse intervals after the first start time.

Example 3: The method according to any of Examples 1 and 2, wherein the first pulse comprises a first ranging pulse, the third pulse comprises a second ranging pulse, and the second pulse comprises a timing pulse.

Example 4: The method according to Examples 1 through 3, wherein the first pulse comprises a first ranging pulse, the third pulse comprises a second ranging pulse, and the second pulse comprises a data pulse.

Example 5: The method according to any of Examples 1 through 4, wherein the integer number is a first integer number, wherein the encoding delay is a first encoding delay, and wherein the pulse group comprises a third pulse having a third start time, which is a second integer number of inter-pulse intervals plus a second encoding delay after the first start time.

Example 6: The method according to any of Examples 1 through 5, wherein the first pulse comprises a first ranging pulse, the second pulse comprises a timing pulse, and the third pulse comprises a data pulse.

Example 7: The method according to any of Examples 1 through 6, wherein a duration of the inter-pulse intervals is indicative of the terrestrial transmitter.

Example 8: The method according to any of Examples 1 through 7, comprising: receiving a second instruction for generating a second signal; and transmitting, via a second terrestrial transmitter for transmitting radio waves having encoded messaging information and timing information for one or more of positioning, navigation and timing, the second signal at least partially responsive to the second instruction, the second signal comprising a pulse group comprising: a third pulse having a third start time; and a fourth pulse having a fourth start time, which is a further inter-pulse interval after the third start time.

Example 9: The method according to any of Examples 1 through 8, wherein the further inter-pulse interval is different from the inter-pulse intervals and is thereby indicative of the second terrestrial transmitter.

Example 10: The method according to any of Examples 1 through 9, wherein the pulse group comprises ranging pulses to be used to determine range information and data pulses to encode data, and wherein the ranging pulses and the data pulses are ordered in the pulse group according to a pre-specified pulse-ordering scheme.

Example 11: The method according to any of Examples 1 through 10, wherein the first pulse is a ranging pulse and the second pulse is a data pulse.

Example 12: The method according to any of Examples 1 through 11, wherein the pulse group comprises a number of data pulses encoding data and a number of timing pulses encoding timing information, and wherein the number of data pulses and the number of timing pulses are ordered in the pulse group according to a pre-specified pulse-ordering scheme.

Example 13: The method according to any of Examples 1 through 12, wherein the data is encrypted prior to being encoded in the number of data pulses.

Example 14: The method according to any of Examples 1 through 13, wherein the data of the number of data pulses includes additional timing information.

Example 15: The method according to any of Examples 1 through 14, wherein transmitting the signal comprises offsetting a start time of the pulse group by a dithering interval.

Example 16: The method according to any of Examples 1 through 15, comprising: receiving a second instruction for generating a second signal; and transmitting, via a second terrestrial transmitter, the second signal at least partially responsive to the received second instruction, the second signal exhibiting second pulse groups wherein the second pulse groups exhibit offset start times according to a further dithering interval.

Example 17: The method according to any of Examples 1 through 16, wherein the dithering interval and the further dithering interval are transmitter-level dithering.

Example 18: The method according to any of Examples 1 through 17, wherein the dithering interval and the further dithering interval are chain-level dithering.

Example 19: The method according to any of Examples 1 through 18, wherein the dithering interval and the further dithering interval comprise masking dithering and a dithering interval according to a ramp.

Example 20: The method according to any of Examples 1 through 19, wherein the pulse group comprises a number of pulses comprising the first pulse and the second pulse wherein respective ones of the number of pulses having either a positive-going phase or a negative-going phase, wherein phases of the respective ones of the number of pulses of the pulse group are according to a pulse-phase signature and the pulse-phase signature is predefined for a broadcast cycle and a terrestrial transmitter.

Example 21: The method according to any of Examples 1 through 20, wherein the pulse-phase signature comprises an indication of a phase of each of the number of pulses.

Example 22: The method according to any of Examples 1 through 21, wherein the pulse-phase signature is according to a pre-defined pulse-phase-signature schedule comprising a pulse-phase signature for a number of broadcast cycles.

Example 23: An apparatus, comprising: a controller is to: generate an instruction for generating a signal comprising a ranging signal and a data signal, the signal comprising a pulse group comprising: a first pulse having a first start time; and a second pulse having a second start time, which is an integer number of inter-pulse intervals plus an encoding delay after the first start time; the encoding delay encoding data; and provide the instruction to a terrestrial transmitter for transmitting radio waves having encoded messaging information and timing information for one or more of positioning, navigation and timing.

Example 24: An apparatus comprising: an antenna is to receive a signal comprising a ranging signal and a data signal, the signal encoding timing information for one or more of positioning, navigation, and timing, the signal comprising: a first pulse having a first start time; and a second pulse having a second start time, which is an integer number of inter-pulse intervals plus an encoding delay after the first start time, the encoding delay encoding data; and a processor is to obtain the data responsive to the encoding delay.

Example 25: The apparatus according to Example 24, wherein the processor is to determine a duration of the encoding delay.

Example 26: The apparatus according to any of Examples 24 and 25, wherein the processor is to obtain one or more bits of the data responsive to a duration of the encoding delay.

Example 27: The apparatus according to any of Examples 24 through 26, wherein the apparatus comprises a memory, wherein the memory stores a table, and wherein the processor is to obtain one or more bits of the data responsive to a comparison between a duration of the encoding delay and an entry in the table.

Example 28: The apparatus according to any of Examples 24 through 27, wherein the processor is to identify a transmitter of the ranging signal at least partially responsive to the inter-pulse intervals.

Example 29: The apparatus according to any of Examples 24 through 28, wherein the first pulse encodes a first type of data and second pulse encodes a second type of data; and wherein the processor is to: correlate the first pulse with the first type of data and to correlate the second pulse with the second type of data at least partially responsive to an order of the first pulse and the second pulse in the signal and a pre-specified pulse-ordering scheme.

Example 30: The apparatus according to any of Examples 24 through 29, wherein the processor is to: calculate a time of transmission of the first pulse; and adjust the calculated time of transmission to account for a pre-specified dithering interval.

Example 31: The apparatus according to any of Examples 24 through 30, wherein the processor is to determine a location of the apparatus at least partially responsive to the adjusted calculated time of transmission.

Example 32: The apparatus according to any of Examples 24 through 31, wherein each of the first pulse and the second pulse exhibits either a positive-going phase or a negative-going phase; wherein the processor is to validating a transmitter of the signal by comparing phases of the first pulse and the second pulse with a pre-specified pulse-phase signature.

Example 33: The apparatus according to any of Examples 24 through 32, wherein the processor is to determine a location of the apparatus at least partially responsive to the ranging signal.

Example 34: An apparatus comprising: an antenna is to receive a signal comprising a ranging signal and a data signal, the signal encoding timing information for one or more of positioning, navigation, and timing; and a processor is to: identify, within the signal, a first pulse having a first start time; identify, within the signal, a second pulse having a second start time, which is an integer number of inter-pulse intervals plus an encoding delay after the first start time; and obtain data responsive to the encoding delay.

Example 35: The apparatus according to Example 34, wherein the processor is to determine a duration of the encoding delay.

Example 36: The apparatus according to any of Examples 34 and 35, wherein the apparatus comprises a memory, wherein the memory stores a table, and wherein the processor is to obtain one or more bits of the data responsive to a comparison between a duration of the encoding delay and an entry in the table.

Example 37: The apparatus according to any of Examples 34 through 36, wherein the processor is to identify a transmitter of the ranging signal at least partially responsive to the inter-pulse interval.

Example 38: The apparatus according to any of Examples 34 through 37, wherein the first pulse encodes a first type of data and second pulse encodes a second type of data; and wherein the processor is to: correlate the first pulse with the first type of data; and to correlate the second pulse with the second type of data at least partially responsive to an order of the first pulse and the second pulse in the signal and a pre-specified pulse-ordering scheme.

Example 39: The apparatus according to any of Examples 34 through 38, wherein the processor is to: calculate a time of transmission of the first pulse; and adjust the calculated time of transmission to account for a pre-specified dithering interval.

Example 40: The apparatus according to any of Examples 34 through 39, wherein the processor is to determine a location of the apparatus at least partially responsive to the adjusted calculated time of transmission.

Example 41: The apparatus according to any of Examples 34 through 40, wherein each of the first pulse and the second pulse exhibits either a positive-going phase or a negative-going phase; wherein the processor to validating a transmitter of the signal by comparing phases of the first pulse and the second pulse with a pre-specified pulse-phase signature.

Example 42: The apparatus according to any of Examples 34 through 41, wherein the processor is to determine a location of the apparatus at least partially responsive to the ranging signal.

Example 43: A method comprising: receiving a signal comprising a ranging signal and a data signal, the signal encoding timing information for one or more of positioning, navigation, and timing, the signal comprising: a first pulse having a first start time; and a second pulse having a second start time, which is an integer number of inter-pulse intervals plus an encoding delay after the first start time; determining a duration of encoding delay; and obtaining data responsive to the duration of the encoding delay.

Example 44: The method according to Example 43, wherein obtaining data responsive to the duration of the encoding delay comprises comparing the duration of the encoding delay to entries in a table that correlates encoding delays to bits.

Example 45: The method according to any of Examples 43 and 44, comprising determining a location at least partially responsive to the ranging signal.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:

an antenna to receive a signal including a ranging signal and a data signal, the ranging signal and the data signal arranged in a same pulse group, the ranging signal encoding timing information for one or more of positioning, navigation, and timing, the pulse group comprising:

a first pulse having a first start time; and second pulses subsequent to the first pulse, the second pulses respectively having a second start time, wherein the second start time is an integer number of inter-pulse intervals plus an encoding delay after the first start time, the encoding delay is encoding data associated with the data signal; and a processor to obtain the data responsive to the encoding delay, wherein the same pulse group comprises ranging pulses, time-message pulses, and data-message pulses arranged in pulse time slots of the same pulse group according to a pre-specified pulse-ordering scheme, the ranging pulses exhibiting no encoding delay, the time-message pulses exhibiting respective encoding delays collectively encoding a time message, and the data-message pulses exhibiting respective encoding delays collectively encoding a data message, the second pulses comprising at least one of the time-message pulses and at least one of the data-message pulses, and wherein the processor is further to identify, at least partially responsive to an order of pulses within the same pulse group and the pre-specified pulse-ordering scheme, which pulses of the same pulse group are the ranging pulses, which pulses of the same pulse group are the time-message pulses, and which pulses of the same pulse group are the data-message pulses.

2. The apparatus of claim 1, wherein the processor to determine a duration of the encoding delay.

3. The apparatus of claim 1, wherein the processor to obtain one or more bits of the data responsive to a duration of the encoding delay.

4. The apparatus of claim 1, wherein the apparatus comprises a memory to store a table, the table to correlate encoding delays with bits of the data, and, wherein the processor to obtain one or more bits of the data responsive to a comparison between a duration of the encoding delay and an entry in the table.

5. The apparatus of claim 1, wherein the processor to identify a transmitter of the ranging signal at least partially responsive to the inter-pulse intervals.

6. The apparatus of claim 1, wherein the first pulse encodes a first type of data and the second pulse encodes a second type of data; and, wherein the processor, at least partially responsive to an order of the first pulse and the second pulse in the pulse group and a the pre-specified pulse-ordering scheme to:

identify the first pulse of the pulse group with the first type of data; and identify the second pulse of the pulse group with the second type of data.

7. The apparatus of claim 1, wherein the processor to:

calculate a time of transmission of the first pulse; and adjust the calculated time of transmission to account for a pre-specified dithering interval.

8. The apparatus of claim 7, wherein the processor to determine a location of the apparatus at least partially responsive to the adjusted calculated time of transmission.

9. The apparatus of claim 1, wherein the first pulse and the second pulse respectively exhibit at least one of a positive-going phase or a negative-going phase; and wherein the processor to validate a transmitter of the signal by comparing phases of the first pulse and the second pulse with a pre-specified pulse-phase signature.

10. The apparatus of claim 1, wherein the processor to determine a location of the apparatus at least partially responsive to the ranging signal.

11. An apparatus comprising:

an antenna to receive a signal including a ranging signal and a data signal, the ranging signal and the data signal arranged in a same pulse group, the pulse group encoding timing information for one or more of positioning, navigation, and timing; and a processor to:

identify, within the signal, a first pulse having a first start time;

identify, within the signal, second pulses subsequent to the first pulse, the second pulses respectively having a second start time, wherein the second start time is an integer number of inter-pulse intervals plus an encoding delay after the first start time; and obtain data responsive to the encoding delay, wherein the same pulse group comprises ranging pulses, time-message pulses, and data-message pulses arranged in pulse time slots of the same pulse group according to a pre-specified pulse-ordering scheme, the ranging pulses exhibiting no encoding delay, the time-message pulses exhibiting respective encoding delays collectively encoding a time message, and the data-message pulses exhibiting respective encoding delays collectively encoding a data message, the second pulses comprising at least one of the time-message pulses and at least one of the data-message pulses, and wherein the processor is further to identify, at least partially responsive to an order of pulses within the same pulse group and the pre-specified pulse-ordering scheme, which pulses of the same pulse group are the ranging pulses, which pulses of the same pulse group are the time-message pulses, and which pulses of the same pulse group are the data-message pulses.

12. The apparatus of claim 11, wherein the processor to determine a duration of the encoding delay.

13. The apparatus of claim 11, wherein the apparatus comprises a memory to store a table, the table to correlate encoding delays of pulses with bits of the data, and wherein the processor to obtain one or more bits of the data responsive to a comparison between a duration of the encoding delay and an entry in the table.

14. The apparatus of claim 11, wherein the processor to identify a transmitter of the ranging signal at least partially responsive to the inter-pulse interval.

15. The apparatus of claim 11, wherein the first pulse of the pulse group encodes a first type of data and the second pulse of the pulse group encodes a second type of data; and, wherein the processor, at least partially responsive to an order of the first pulse and the second pulse in the pulse group and the pre-specified pulse-ordering scheme, to:

identify the first pulse with the first type of data; and identify the second pulse with the second type of data.

16. The apparatus of claim 11, wherein the processor to:

calculate a time of transmission of the first pulse; and adjust the calculated time of transmission to account for a pre-specified dithering interval.

17. The apparatus of claim 16, wherein the processor to determine a location of the apparatus at least partially responsive to the adjusted calculated time of transmission.

18. The apparatus of claim 11, wherein the first pulse and the second pulse respectively exhibit at least one of a positive-going phase or a negative-going phase; and wherein the processor to validate a transmitter of the signal by comparing phases of the first pulse and the second pulse with a pre-specified pulse-phase signature.

19. The apparatus of claim 11, wherein the processor to determine a location of the apparatus at least partially responsive to the ranging signal.

20. A method comprising:

receiving a signal comprising a ranging signal and a data signal, the ranging signal and the data signal arranged in a same pulse group, the signal encoding timing information for one or more of positioning, navigation, and timing, the signal comprising:

a first pulse of the pulse group having a first start time; and second pulses subsequent to the first pulse, the second pulses of the pulse group respectively having a second start time, the second start time an integer number of inter-pulse intervals plus an encoding delay after the first start time;

determining a duration of encoding delay; and obtaining data responsive to the duration of the encoding delay, wherein the same pulse group comprises ranging pulses, time-message pulses, and data-message pulses arranged in pulse time slots of the same pulse group according to a pre-specified pulse-ordering scheme, the ranging pulses exhibiting no encoding delay, the time-message pulses exhibiting respective encoding delays collectively encoding a time message, and the data-message pulses exhibiting respective encoding delays collectively encoding a data message, the second pulses comprising at least one of the time-message pulses and at least one of the data-message pulses, and wherein the method further comprises identifying, at least partially responsive to an order of pulses within the same pulse group and the pre-specified pulse-ordering scheme, which pulses of the same pulse group are the ranging pulses, which pulses of the same pulse group are the time-message pulses, and which pulses of the same pulse group are the data-message pulses.

21. The method of claim 20, wherein obtaining data responsive to the duration of the encoding delay comprises comparing the duration of the encoding delay to entries in a table that correlates encoding delays to bits of the data.

22. The method of claim 20, comprising determining a location at least partially responsive to the ranging signal.

* * * * *